(12) United States Patent
Ishizaki

(10) Patent No.: US 10,817,359 B2
(45) Date of Patent: Oct. 27, 2020

(54) RING NETWORK AND ROBOT INCLUDING THE SAME

(71) Applicant: HONDA MOTOR CO., LTD., Minato-ku, Tokyo (JP)

(72) Inventor: Ryusuke Ishizaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 99 days.

(21) Appl. No.: 16/238,793

(22) Filed: Jan. 3, 2019

(65) Prior Publication Data
US 2019/0220337 A1    Jul. 18, 2019

(30) Foreign Application Priority Data

Jan. 18, 2018 (JP) .................................. 2018006663

(51) Int. Cl.
  *G06F 11/07* (2006.01)
  *B25J 9/16* (2006.01)
  *G06F 13/40* (2006.01)

(52) U.S. Cl.
  CPC ......... *G06F 11/0709* (2013.01); *B25J 9/1653* (2013.01); *B25J 9/1674* (2013.01);
  (Continued)

(58) Field of Classification Search
  CPC . H04L 12/427; H04L 12/433; H04L 41/0677; H04L 49/102; H04L 69/22;
  (Continued)

(56) References Cited

U.S. PATENT DOCUMENTS

| 2001/0048687 | A1* | 12/2001 | Coden | ................... H04L 49/351 |
| | | | | 370/403 |
| 2003/0172189 | A1* | 9/2003 | Greenblat | ............... H04L 12/42 |
| | | | | 709/251 |

(Continued)

FOREIGN PATENT DOCUMENTS

| JP | H05130034 A | 5/1993 |
| JP | H05219084 A | 8/1993 |

(Continued)

OTHER PUBLICATIONS

Notice of Reasons for Refusal for JP application No. 2018006663, dated Jul. 16, 2019, 4 pages.

*Primary Examiner* — Mewale A Ambaye
(74) *Attorney, Agent, or Firm* — Armstrong Teasdale LLP

(57) ABSTRACT

In a ring network including multiple nodes connected in a ring via communication lines, each node includes: a packet send-out unit configured to generate transmission packets each containing at least a number of relays and a source node ID and send out the transmission packets according to a predetermined repeating pattern; and a packet relay unit configured to receive input packets, and when a node indicated by the source node ID of each input packet is other than an own node, send out the input packet as a relay packet after adding one unit to the number of relays. At least one of the nodes is provided with a communication error detector for detecting a communication error in the ring network. The communication error detector identifies a location of the communication error by referring to the source node IDs of the input packets received by a corresponding node.

12 Claims, 45 Drawing Sheets

(52) U.S. Cl.
 CPC ...... *G06F 11/0751* (2013.01); *G06F 11/0793* (2013.01); *G06F 13/4022* (2013.01)

(58) Field of Classification Search
 CPC ............ G06F 11/0709; G06F 11/0751; G06F 11/0793; G06F 11/1004; G06F 13/4022
 See application file for complete search history.

(56) References Cited

U.S. PATENT DOCUMENTS

| | | | |
|---|---|---|---|
| 2008/0170495 A1* | 7/2008 | Monse | G05B 19/0428 370/223 |
| 2009/0182868 A1* | 7/2009 | McFate | G06F 11/0751 709/224 |
| 2012/0063325 A1* | 3/2012 | Zhao | H04L 45/50 370/241.1 |
| 2014/0134970 A1* | 5/2014 | Pazos | H04L 65/4069 455/404.1 |
| 2016/0380835 A1 | 12/2016 | Ishizaki | |
| 2017/0243485 A1* | 8/2017 | Rubin | H04L 67/12 |
| 2017/0272272 A1 | 9/2017 | Ishizaki | |
| 2017/0309169 A1 | 10/2017 | Ishizaki et al. | |
| 2018/0083827 A1* | 3/2018 | Ishizaki | H04L 12/433 |

FOREIGN PATENT DOCUMENTS

| | | |
|---|---|---|
| JP | 3431310 B2 | 7/2003 |
| JP | 2016192597 A | 11/2016 |
| JP | 2017011519 A | 1/2017 |
| JP | 2017175231 A | 9/2017 |
| JP | 2017196677 A | 11/2017 |

\* cited by examiner second communication error pattern: failure of node B, break between nodes B and C third communication error pattern: failure of node C, break between nodes C and D fourth communication error pattern: failure of node D, break between nodes D and A

Fig.15

| HOP pattern | | | | identifi-ability | P1 | P2 | | P3 | | P4 | |
|---|---|---|---|---|---|---|---|---|---|---|---|
| 0 | 1 | 2 | 3 | | break between A and B | failure of B | break between B and C | failure of C | break between C and D | failure of D | break between D and A |
| D | C | B | × | ○ | ○ | × | × | × | × | × | × |
| D | C | × | × | × | × | ○ | ○ | × | × | × | × |
| D | × | × | × | × | × | × | × | ○ | ○ | × | × |
| × | × | × | × | × | × | × | × | × | × | ○ | ○ |

(possible) failure location

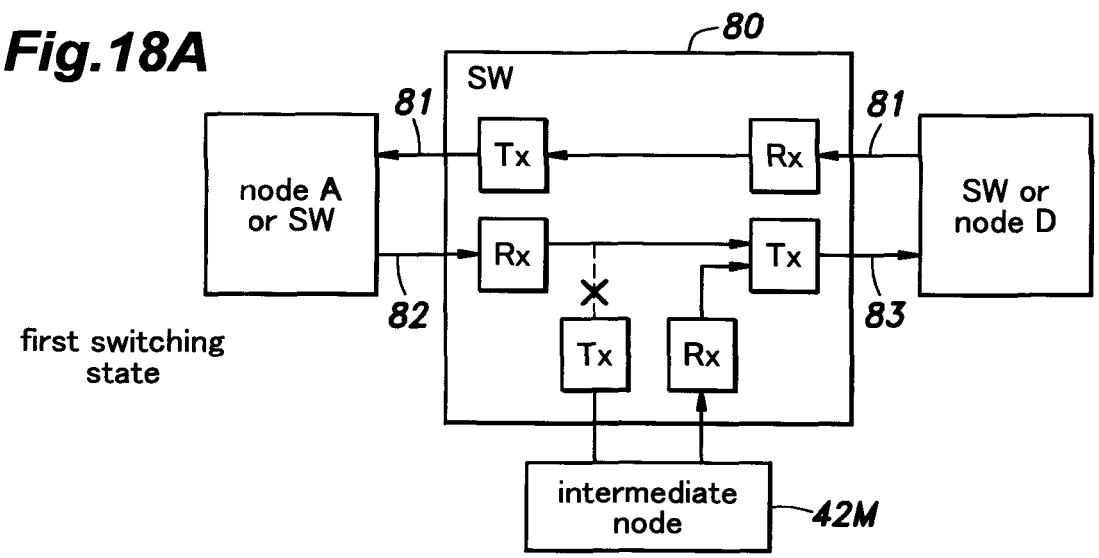
Fig.18A  first switching state
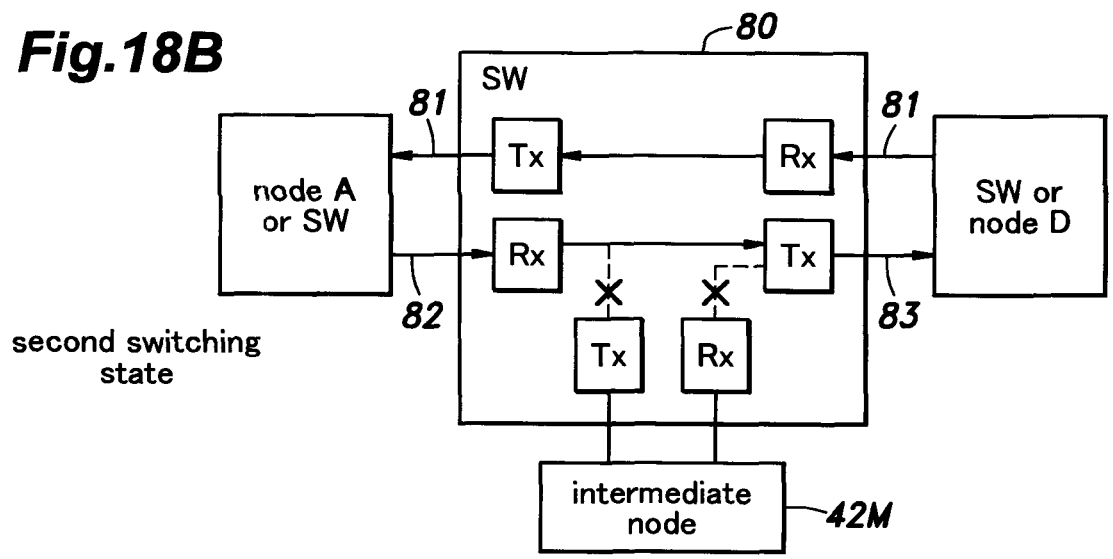
Fig.18B  second switching state
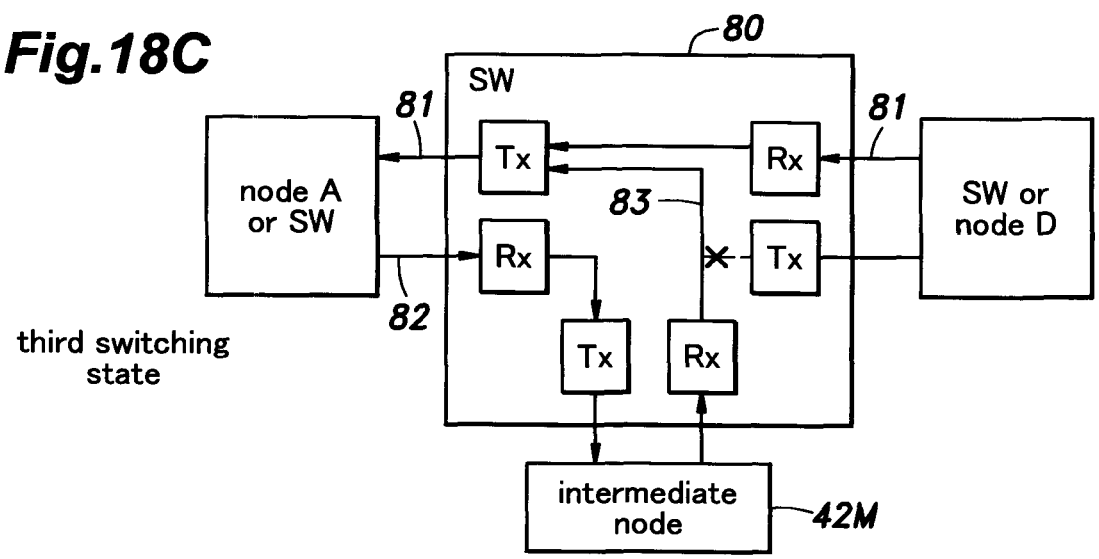
Fig.18C  third switching state Fig.23
second communication error pattern
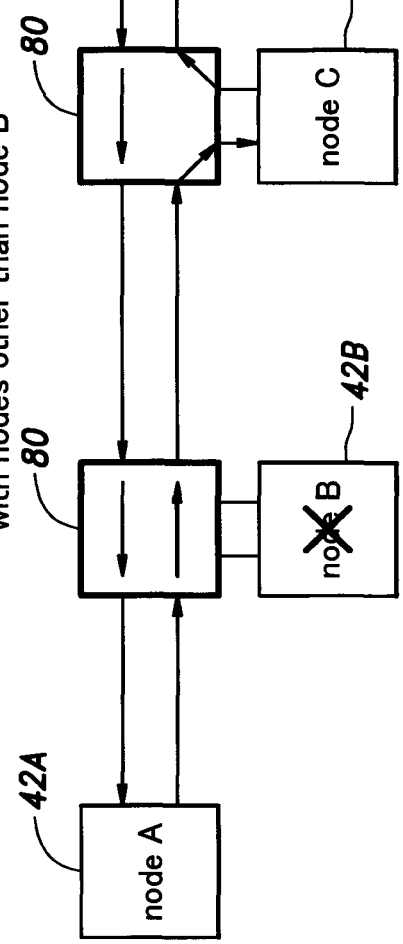
in case of failure of node B: Communication is possible with nodes other than node B
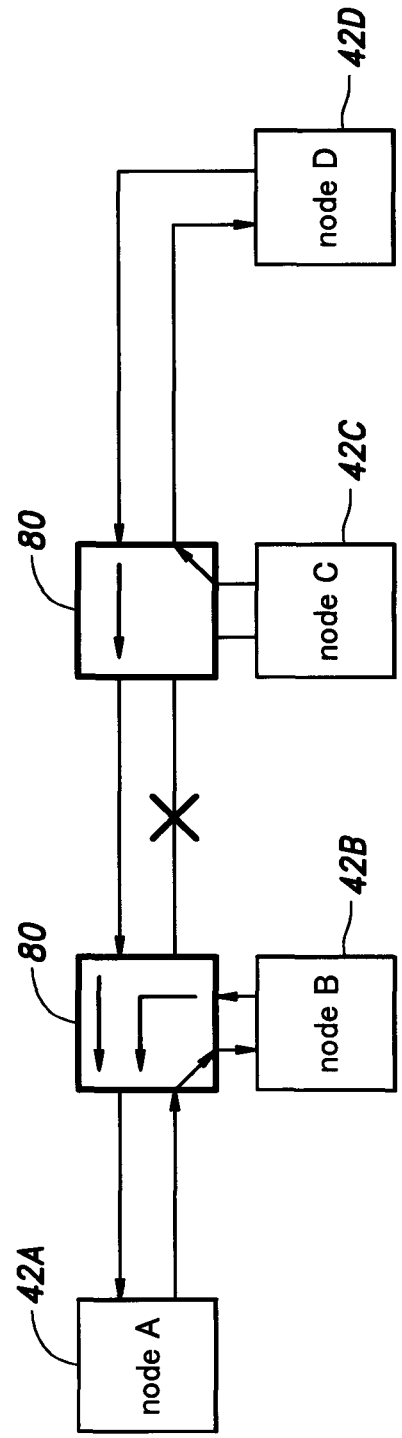
in case of break between nodes B and C: Packets come from all nodes

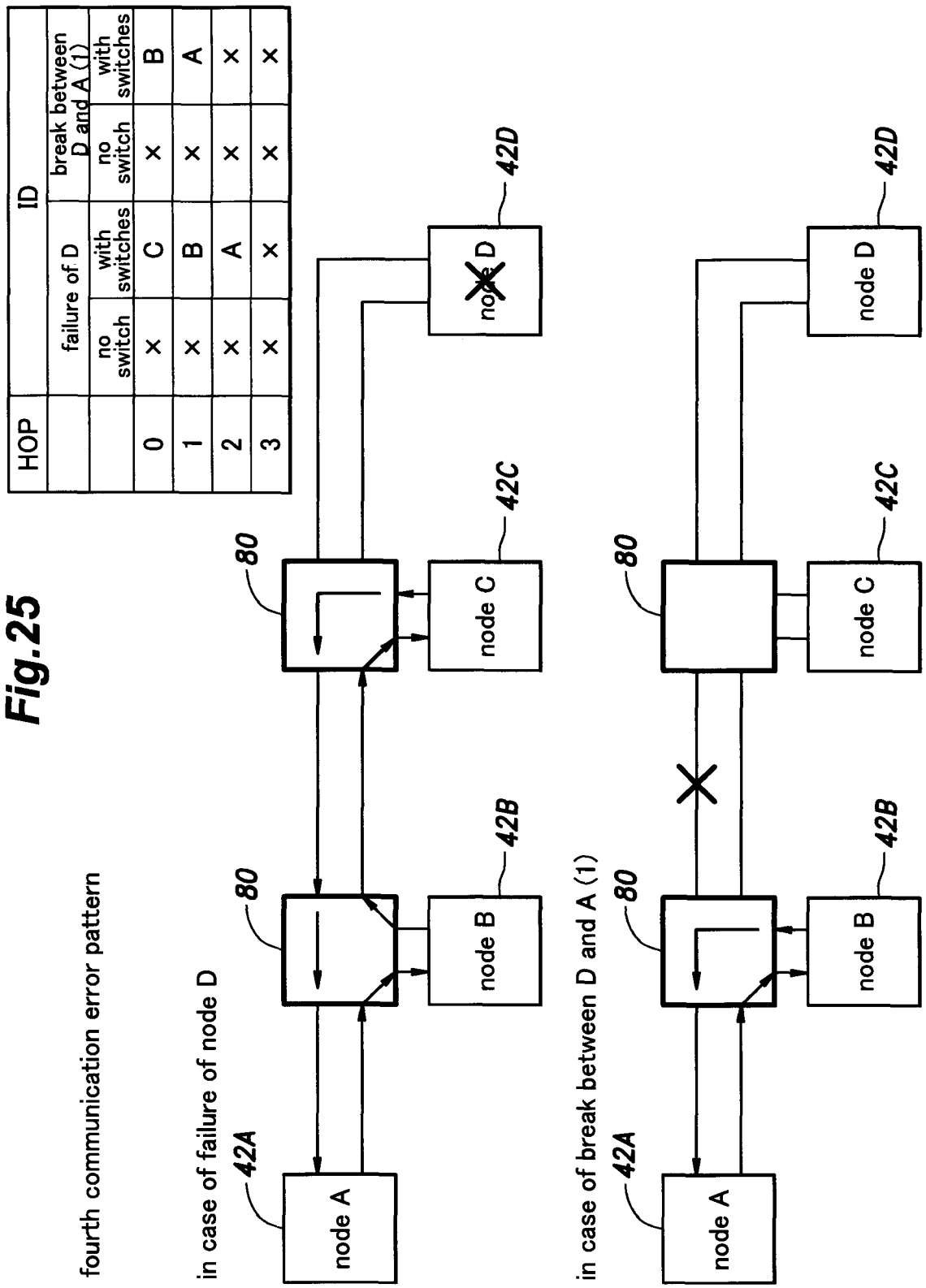
Fig.25 fourth communication error pattern

Fig.26

| | | 0 | 1 | 2 | 3 |
|---|---|---|---|---|---|
| presence/absence of SW | | x | | | |
| HOP pattern | 0 | D | D | D | x |
| | 1 | C | C | x | x |
| | 2 | B | x | x | x |
| | 3 | x | x | x | x |
| identifiability | | O | x | x | x |
| (possible) failure location | break between A and B | O | x | x | x |
| | break between SW and B (Rx) | - | - | - | - |
| | failure of B or break between SW and B (Tx) | x | O | x | x |
| | break between B and C | x | O | x | x |
| | break between SW and C (Rx) | - | - | - | - |
| | failure of C or break between SW and C (Tx) | x | x | O | x |
| | break between C and D | x | x | O | x |
| | failure of D or break between SW and D (Tx) | x | x | x | O |
| | break between D and A | x | x | x | O |
| | break between SW and A (Rx) | - | - | - | - |

Fig. 27 first switching state second switching state third switching state fourth switching state

Fig. 45

| presence/absence of SW | HOP pattern | | | | identifiability | (possible) failure location | | | | | | | |
|---|---|---|---|---|---|---|---|---|---|---|---|---|---|
| | 0 | 1 | 2 | 3 | | break between A (Tx) and SW | break between SW and B (Rx) | failure of B or break between SW and B (Tx) | break between SW and C (Rx) | failure of C or break between SW and C (Tx) | break between SW and D (Rx) | failure of D or break between SW and D (Tx) | break between SW and A (Rx) |
| O | D | C | B | × | O | O | × | × | × | × | × | × | × |
| | D | C | A,B | × | O | × | O | × | × | × | × | × | × |
| | D | C | A | × | O | × | × | O | × | × | × | × | × |
| | D | C,B | A | × | O | × | × | × | O | × | × | × | × |
| | D | B | A | × | O | × | × | × | × | O | × | × | × |
| | D,C | B | A | × | O | × | × | × | × | × | O | × | × |
| | C | B | A | × | O | × | × | × | × | × | × | O | × |
| | × | × | × | × | O | × | × | × | × | × | × | × | O |

RING NETWORK AND ROBOT INCLUDING THE SAME

TECHNICAL FIELD

The present invention relates to a ring network including multiple nodes connected in a ring via communication lines and a robot including the ring network.

BACKGROUND ART

Networks connecting multiple terminals (nodes) such as computers may have various topologies such as bus, star, ring and mesh topologies. An example of a bus network is Ethernet (registered trademark). Ethernet has a physical star topology but has a logical bus topology, in which each node can freely transmit a signal (data). On the other hand, a signal collision may occur in Ethernet, and in such a case, delivery of the signal is delayed (namely, latency is increased).

Like Ethernet, ring-type networks (hereinafter, may be simply referred to as ring networks) often are wired in a physical star topology in which each network node is connected to a central hub. In ring networks, collision of data on the network does not occur, and the data transmitted onto the network is delivered to the destination node by being relayed from node to node. The final recipient of the transmission data may be the destination node or the source node (namely, there are two communication methods). In the communication method in which the transmission data is to be returned to the source node, the source node can confirm that the communication has been performed correctly by receiving the transmission data, and can know that there is a failure in the network when the data is not returned.

In the ring network, irrespective of which of the communication methods is used, if there is a failure in one communication node, it affects the entirety of the network system and may lead to a system failure. JPH5-219084A describes that when such a failure has occurred, in order to cut off the communication node where the failure has occurred, the communication nodes in the ring network is bypassed one by one to determine if the failure is resolved.

However, if there is a large number of communication nodes, the above approach will take a long time, and therefore, JPH5-219084A proposes an invention capable of promptly finding the node where the failure has occurred. In this invention, each node is configured to provide each data generated by it with a transmission number, which is a numeric value incremented each time a data is generated. A monitoring node stores, for each node in the ring network, a number of occasions that the transmission numbers for two items of data received successively from the node are not consecutive numbers, and determines that a failure has occurred around a node for which the stored number of occasions is high.

JP3431310B proposes an invention for detecting a failure, in which a transmitting node is configured to transmit data units to a receiving node sequentially such that each data unit is transmitted after being provided with an order number indicating a transmission order thereof, and the receiving node is configured to compare, each time a data unit is received, the order number of the currently received data unit with the order number of the previously received data unit to thereby find a failure. In this invention, when an occasion that the order indicated by the current order number and the order indicated by the previous order number are the same has occurred twice or more consecutively, or when an occasion that the order indicated by the current order number is twice the order indicated by the previous order number or greater has occurred twice or more consecutively, it is determined that there is a failure in the order number providing function of the transmitting node or in the comparing function of the receiving node.

However, in the approach described in JPH5-219084A or JP3431310B, when a communication error such as a break of a communication line or a failure of relay function of a node occurs, it is not possible to identify the location where the communication error has occurred.

SUMMARY OF THE INVENTION

In view of such a background, an object of the present invention is to provide a ring network in which, for various types of failure, the failure location can be identified promptly.

To achieve such an object, one embodiment of the present invention provides a ring network (40) comprising multiple nodes (42) connected in a ring via communication lines (41), wherein each node comprises: a packet send-out unit (58, 60) configured to generate transmission packets (Pt) each containing at least a number of relays (HOP) and a source node ID (SID) and send out the transmission packets according to a predetermined repeating pattern; and a packet relay unit (57, 59) configured to receive input packets (Pe), and when a node indicated by the source node ID (SID) of each input packet is other than an own node, send out the input packet as a relay packet (Pr) after adding one unit to the number of relays, wherein at least one (42A) of the multiple nodes is provided with a communication error detector (49, 56) configured to detect a communication error in the ring network, and the communication error detector is configured to identify a location where the communication error has occurred by referring to the source node IDs of the input packets (Pe) received by a corresponding node.

According to this arrangement, it is possible to locate the location of the communication error based on the state of transmission of the packets, without need for bypassing the nodes one by one sequentially. Further, when a communication error may include a break of a communication line and a failure of relay function of a node, the location of the communication error can be identified.

In the above arrangement, preferably, the communication lines (41) are divided into an upstream part and a downstream part such that the upstream part extends from a first node (42A) of the multiple nodes to a second node (42D) of the multiple nodes and the downstream part extends from the second node to the first node, and the upstream part and the downstream part are routed next to each other, the first node being provided with the communication error detector, the multiple nodes include at least one third node (42B, 42C) located between the first node and the second node in the ring network, each third node (42B, 42C) is connected to a node on an upstream side thereof via an input-side communication line (82) and to a node on a downstream side thereof via an output-side communication line (83), the ring network further comprises at least one switch (80) each associated with one of the at least one third node (42B, 42C), each switch being provided on the input-side communication line (82) and the output-side communication line (83) for the associated third node and a communication line (81) juxtaposed next to the input-side communication line and the output-side communication line, and configured to switch a packet transfer path based on a transfer state of the relay packet (Pr) to be relayed by the associated third node and the transmission packet (Pt) to be output from the associated third node, and the communication error detector (49, 56) is configured to identify the location where the communication error has occurred based on a relationship between the number of relays (HOP) and the source node ID (SID) of the input packets (Pe).

According to this arrangement, because the switch provided for each third node is configured to switch the packet transfer path based on the packet transfer state in the switch, even if a communication error occurs, a situation in that no packet is transferred to the downstream thereof can be avoided.

In the above arrangement, preferably, each switch (80) is configured to be capable of switching to a first switching state (FIG. 18A) in which the switch makes a short circuit between an upstream section of the input-side communication line (82) for the associated third node (42B, 42C) and the output-side communication line (83) for the same, while maintaining a connection of the output-side communication line (83) of the associated third node (42B, 42C), and the switch is configured to switch to the first switching state when the relay packet (Pr) having passed through the input-side communication line (82) is not transferred to the output-side communication line (83), and the transmission packet (Pt) is transferred to the output-side communication line (83) (part (A) of FIG. 19).

According to this arrangement, when a transmission error of the relay packet to the associated third node has occurred in the input-side communication line therefor, the switch switches to the first switching state to thereby allow the relay packet to be transferred to the output-side communication line by bypassing (or without passing through) the third node, while allowing the transmission packet output from the third node to be transferred to the output-side communication line without being blocked.

In the above arrangement, preferably, the switch (80) is configured to be capable of switching to a second switching state (FIG. 18B) in which the switch disconnects the output-side communication line (83) for the associated third node (42B, 42C) and makes a short circuit between an upstream section of the input-side communication line (82) for the associated third node and the output-side communication line (83) for the same, and the switch is configured to switch to the second switching state when neither the relay packet (Pr) having passed through the input-side communication line (82) nor the transmission packet (Pt) is transmitted to the output-side communication line (83) (part (A) of FIG. 20).

According to this arrangement, when a reception failure of the relay packet and the transmission packet from the associated third node has occurred in the upstream section of the output-side communication line therefor, the switch switches to the second switching state to thereby allow the relay packet to be transferred to the downstream section of the output-side communication line by bypassing (or without passing through) the third node.

In the above arrangement, preferably, the switch (80) associated with the third node (42B, 42C) provided on the upstream part of the communication lines (41) is configured to be capable of switching to a third switching state (FIG. 18C) in which the switch makes a short circuit between an upstream section of the output-side communication line (83) for the associated third node (42B, 42C) and the juxtaposed communication line (81), while maintaining a connection of the juxtaposed communication line (81), and the switch is configured to switch to the third switching state when the relay packet (Pr) passes through the input-side communication line (82), and the transmission packet (Pt) transferred to the output-side communication line (83) does not pass through the input-side communication line (82) (part (A) of FIG. 21).

According to this arrangement, when a failure has occurred in the downstream section of the output-side communication line for the associated third node, the switch switches to the third switching state to allow the relay packet and the transmission packet sent out from the associated third node to be transferred to the juxtaposed communication line by bypassing (or without passing through) the node(s) on the downstream side in the ring network.

In the above arrangement, preferably, the switch (80) associated with the third node (42E) provided on the downstream part of the communication lines (41) is configured to be capable of switching to a fourth switching state (part (B) of FIG. 29) in which the switch makes a short circuit between an upstream section of the juxtaposed communication line (81) for the associated third node and the input-side communication line (82) for the same, while maintaining a connection of the input-side communication line (82), and the switch is configured to switch to the fourth switching state when the relay packet (Pr) passes through the input-side communication line (82), and the transmission packet (Pt) transferred to the output-side communication line (83) does not pass through the input-side communication line (82) (part (A) of FIG. 29).

According to this arrangement, when a failure has occurred in the downstream section of the juxtaposed communication line, the switch switches to the fourth switching state to allow the relay packet and the transmission packet transmitted in the upstream section of the juxtaposed communication line to be input to the associated third node by bypassing (or without passing through) the node(s) on the upstream side in the ring network.

In the above arrangement, preferably, wherein the communication lines (41) are divided into an upstream part and a downstream part such that the upstream part extends from a first node (42A) of the multiple nodes to a second node (42C) of the multiple nodes and the downstream part extends from the second node to the first node, and the upstream part and the downstream part are routed next to each other, the first node being provided with the communication error detector, the multiple nodes include multiple third nodes (42B, 42D) located between the first node and the second node in the ring network, each third node is connected to a node on an upstream side thereof via an input-side communication line (82) and to a node on a downstream side thereof via an output-side communication line (83), the ring network further comprises a switch (90) associated with at least two of the multiple third nodes, the switch being provided on the input-side communication line and the output-side communication line for each of the associated third nodes, and configured to switch a packet transfer path based on a transfer state of the relay packet (Pr) to be relayed by each of the associated third nodes and the transmission packet (Pt) to be output from each of the associated third nodes, and the communication error detector (49, 56) is configured to identify the location where the communication error has occurred based on a relationship between the number of relays (HOP) and the source node ID (SID) of the input packets (Pe).

According to this arrangement, because the switch associated with at least two of the multiple third nodes is configured to switch the packet transfer path based on the packet transfer state in the switch, even if a communication error occurs, a situation in that no packet is transferred to the downstream thereof can be avoided.

In the above arrangement, preferably, the multiple third nodes (42B, 42D) include a pair of third nodes including a third node (42B) provided on the upstream part of the communication lines (41) and a third node (42D) provided on the downstream part of the communication lines (41), and the switch (90) is provided to be associated with the pair of third nodes.

According to this arrangement, the switch associated with the pair of third nodes can switch the packet transfer path based on the packet transfer state in the switch.

In the above arrangement, preferably, the switch (90) is configured to be capable of switching to a first switching state (FIG. 31A) in which the switch makes a short circuit between an upstream section of the input-side communication line (82) for one (42B) of the third nodes of the associated pair of third nodes (42B, 42D) and the output-side communication line (83) for the same, while maintaining a connection of the output-side communication line (83) for the one of the third nodes of the associated pair of third nodes, and the switch is configured to switch to the first switching state when the relay packet (Pr) having passed through the input-side communication line for the one of the third nodes of the associated pair of third nodes is not transferred to the output-side communication line for the one of the third nodes of the associated pair of third nodes, and the transmission packet (Pt) to be output from the one of the third nodes of the associated pair of third nodes is transferred to the output-side communication line (part (A) of FIG. 33).

According to this arrangement, when a transmission failure of the relay packet to one of the associated third nodes has occurred in the input-side communication line therefor, the switch switches to the first switching state to allow the relay packet to be transferred to the output-side communication line by bypassing (or without passing through) the third node, while allowing the transmission packet output from the third node to be transferred to the output-side communication line without being blocked.

In the above arrangement, preferably, the switch (90) is configured to be capable of switching to a second switching state (FIG. 31B) in which the switch disconnects the output-side communication line (83) for one of the third nodes of the associated pair of third nodes (42B, 42D), and makes a short circuit between an upstream section of the input-side communication line (82) for the one of the third nodes of the associated pair of third nodes and the output-side communication line for the same, and the switch is configured to switch to the second switching state when neither the relay packet (Pr) having passed through the input-side communication line for the one (42B) of the third nodes of the associated pair of third nodes nor the transmission packet (Pt) to be output from the one of the associated third nodes is transmitted to the output-side communication line for the one of the associated third nodes (part (A) of FIG. 34).

According to this arrangement, when a reception failure of the relay packet and transmission packet to be output from one of the associated third nodes has occurred in the upstream section of the output-side communication line therefor, the switch switches to the second switching state to allow the relay packet to be transferred to the downstream section of the output-side communication line by bypassing (or without passing through) the third node.

In the above arrangement, preferably, the switch (90) is configured to be capable of switching to a third switching state (FIG. 32C) in which the switch makes a short circuit between an upstream section of the output-side communication line (83) for one (42B) of the third nodes of the associated pair of third nodes to the input-side communication line (82) for the other (42D) of the third nodes of the associated pair of third nodes, while maintaining a connection of the input-side communication line (82) for the other (42D) of the third nodes of the associated pair of third nodes, and the switch is configured to switch to the third switching state when the relay packet (Pr) having passed through the output-side communication line for the one of the third nodes of the associated pair of third nodes is not transferred to the input-side communication line for the other of the third nodes of the associated pair of third nodes, and the transmission packet (Pt) or the relay packet (Pr) output from a node downstream of the one of the third nodes of the associated pair of third nodes and upstream of the other of the third nodes of the associated pair of third nodes is transmitted to the input-side communication line for the other of the third nodes of the associated pair of third nodes (part (A) of FIG. 35).

According to this arrangement, when a transmission failure of the relay packet output from the one of the associated third nodes to the node downstream thereof has occurred in the output-side communication line for the one of the associated third nodes, the switch switches to the third switching state to allow the relay packet to be transferred to the input-side communication line for the other of the associated third nodes by bypassing (or without passing through) the node(s) on the downstream side of the one of the associated third nodes and upstream of the other of the associated third nodes, while allowing the transmission packet or the relay packet output from the node(s) on the downstream side of the one of the associated third nodes and upstream of the other of the associated third nodes to be transferred to the input-side communication line for the other of the associated third nodes without being blocked.

In the above arrangement, preferably, the switch (90) is configured to be capable of switching to a fourth switching state (FIG. 32D) in which the switch makes a short circuit between an upstream section of the output-side communication line (83) for one (42B) of the third nodes of the associated pair of third nodes and the input-side communication line (82) for the other (42D) of the third nodes of the associated pair of third nodes, and disconnects the input-side communication line (82) for the other (42D) of the third nodes of the associated pair of third nodes, and the switch is configured to switch to the fourth switching state when the relay packet (Pr) having passed through the output-side communication line for the one of the third nodes of the associated pair of third nodes is not transferred to the input-side communication line for the other of the third nodes of the associated pair of third nodes, and the transmission packet (Pt) or the relay packet (Pr) output from a node downstream of the one of the third nodes of the associated pair of third nodes and upstream of the other of the third nodes of the associated pair of third nodes is not transmitted to the input-side communication line for the other of the third nodes of the associated pair of third nodes (part (A) of FIG. 36).

According to this arrangement, when a reception failure of the transmission packet or the relay packet output from a node downstream of the one of the associated third nodes and upstream of the other of the associated third nodes to the other of the associated third nodes has occurred in the input-side communication line for the other of the associated third nodes, the switch switches to the fourth switching state to allow the relay packet to be transferred to the input-side communication line for the other of the associated third nodes by bypassing (or without passing through) the node downstream of the one of the associated third nodes and upstream of the other of the associated third nodes.

According to another aspect of the present invention, there is provided a robot (1) including the ring network (40) having the foregoing structure, the robot comprising: a main body (2); and an arm (4) or a leg (5) constituted of multiple links (7-9, 10-12) connected in series via multiple joints (22-24, 25-27) each being configured to be driven by a servo-controlled motor (35), one end of the series-connected links being joined to the main body, wherein the nodes (42) are distributedly arranged on the main body and the links of the arm or the leg, and are each configured to control one or more motors (35) for driving one or more associated joints, each of the multiple nodes is provided with the communication error detector (49, 56), each of the nodes (42C, 42D) provided on the links of the arm or the leg is configured to lock the associated one or more joints by servo-locking the one or more motors when the corresponding communication error detector detects a communication error on an upstream side thereof, and the node (42A) provided on the main body is configured such that, when the corresponding communication error detector identifies a location where the communication error has occurred, the node performs fallback control by regarding the links located on a free end side relative to the location where the communication error has occurred as a rigid unitary body.

According to this arrangement, when a communication error occurs in the ring network, the robot can identify the location of the communication error promptly, and perform fallback control in accordance with the location of the communication error, to thereby continue the operation.

Effect of the Invention

As described above, according to an embodiment of the present invention, it is possible to provide a ring network in which, for various types of failure, the failure location can be identified promptly.

BRIEF DESCRIPTION OF THE DRAWINGS

FIG. 15 is a table summarily showing the patterns of information in the HOP table of the node 42A (node A) of the first embodiment in the four communication error patterns;

FIGS. 18A, 18B, and 18C are explanatory diagrams respectively showing first, second, and third switching states that can be taken by the switch shown in FIG. 17;

FIG. 23 is an explanatory diagram showing the HOP table of the node 42A of the second embodiment in a second communication error pattern;

FIG. 25 is an explanatory diagram showing the HOP table of the node 42A of the second embodiment in a fourth communication error pattern;

FIG. 26 is a table showing the identifiability of the failure location based on the HOP table in the second embodiment of the ring network without switches;

FIG. 27 is a table showing the identifiability of the failure location based on the HOP table in the second embodiment of the ring network;

FIG. 45 is a table showing the identifiability of the failure location based on the HOP table in the third embodiment of the ring network.

DESCRIPTION OF THE PREFERRED EMBODIMENT(S)

In the following, an embodiment of a robot 1 to which the present invention is applied will be described with reference to the appended drawings.

Figure 1:
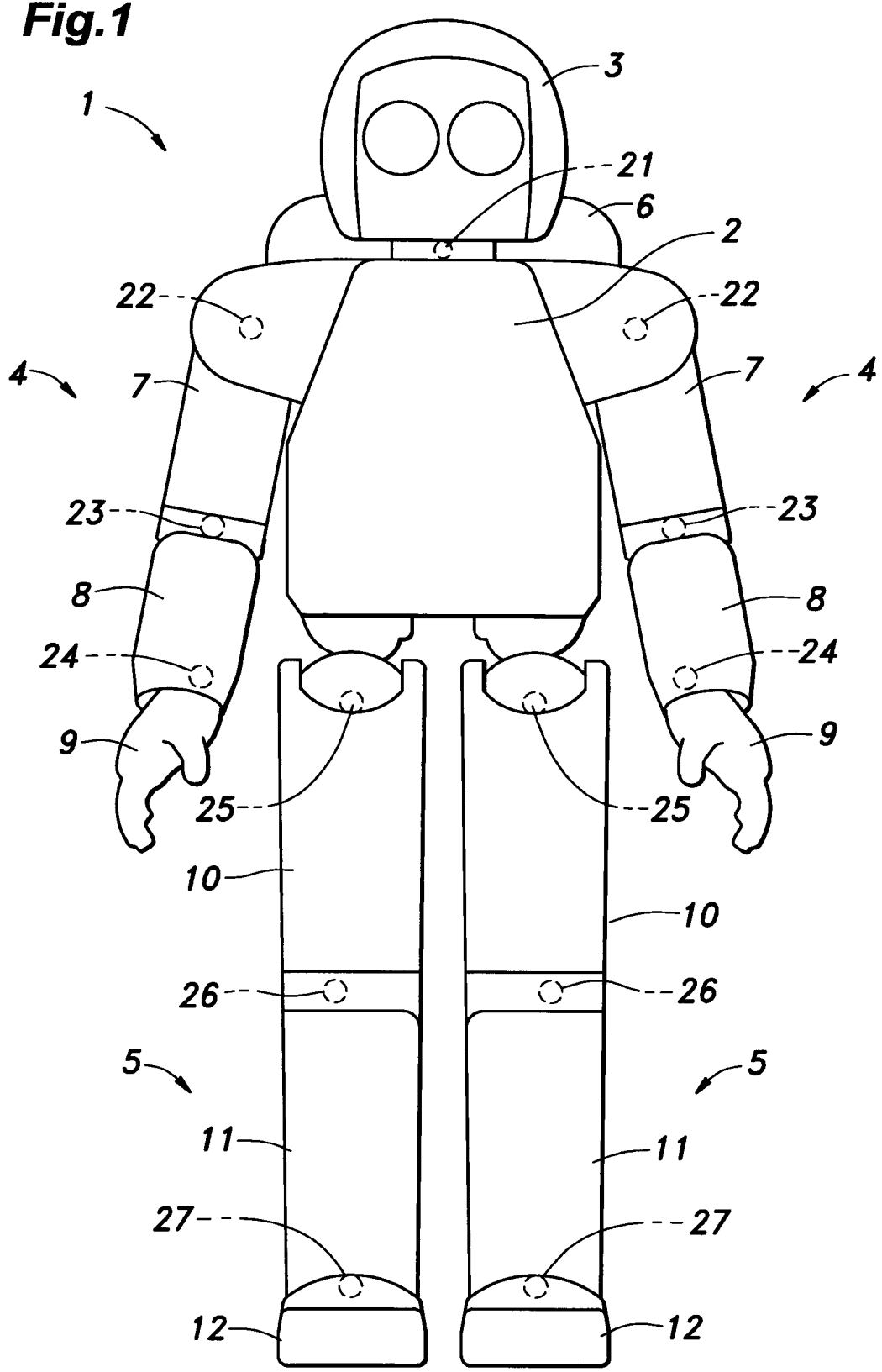
FIG. 1 is a front view of a robot according to an embodiment of the present invention.

As shown in FIG. 1, the robot 1 of the illustrated embodiment consists of a bipedal humanoid robot that can walk and run autonomously, and includes a torso 2, a head 3, left and right arms 4, and left and right legs 5. The torso 2 constitutes a main body. An electrical component box 6 is mounted on the back of the torso 2. Each of the arms 4 is a multi-link mechanism constituted of an upper arm 7, a forearm 8, and a hand 9 each serving as a link. Also, each of the legs 5 is a multi-link mechanism constituted of a thigh 10, a lower leg 11, and a foot 12 each serving as a link. The electrical component box 6 contains a battery, a DC-DC converter, etc. therein.

The torso 2 and the head 3 are connected to each other via a neck joint 21. Further, the upper arm 7 is connected to the torso 2 via a shoulder joint 22, the upper arm 7 and the forearm 8 are connected to each other via an elbow joint 23, and the forearm 8 and the hand 9 are connected to each other via a wrist joint 24. On the other hand, the thigh 10 is connected to the torso 2 via a hip joint 25, the thigh 10 and the lower leg 11 are connected to each other via a knee joint 26, and the lower leg 11 and the foot 12 are connected to each other via an ankle joint 27. Namely, the multiple links constituting the arm 4 or the leg 5 are connected in series and the series-connection of the links is joined to the main body (torso 2) at one end thereof. It is to be noted that in FIG. 1, an approximate center of each joint 21-27 is shown by a circle in broken line.

Figure 2:
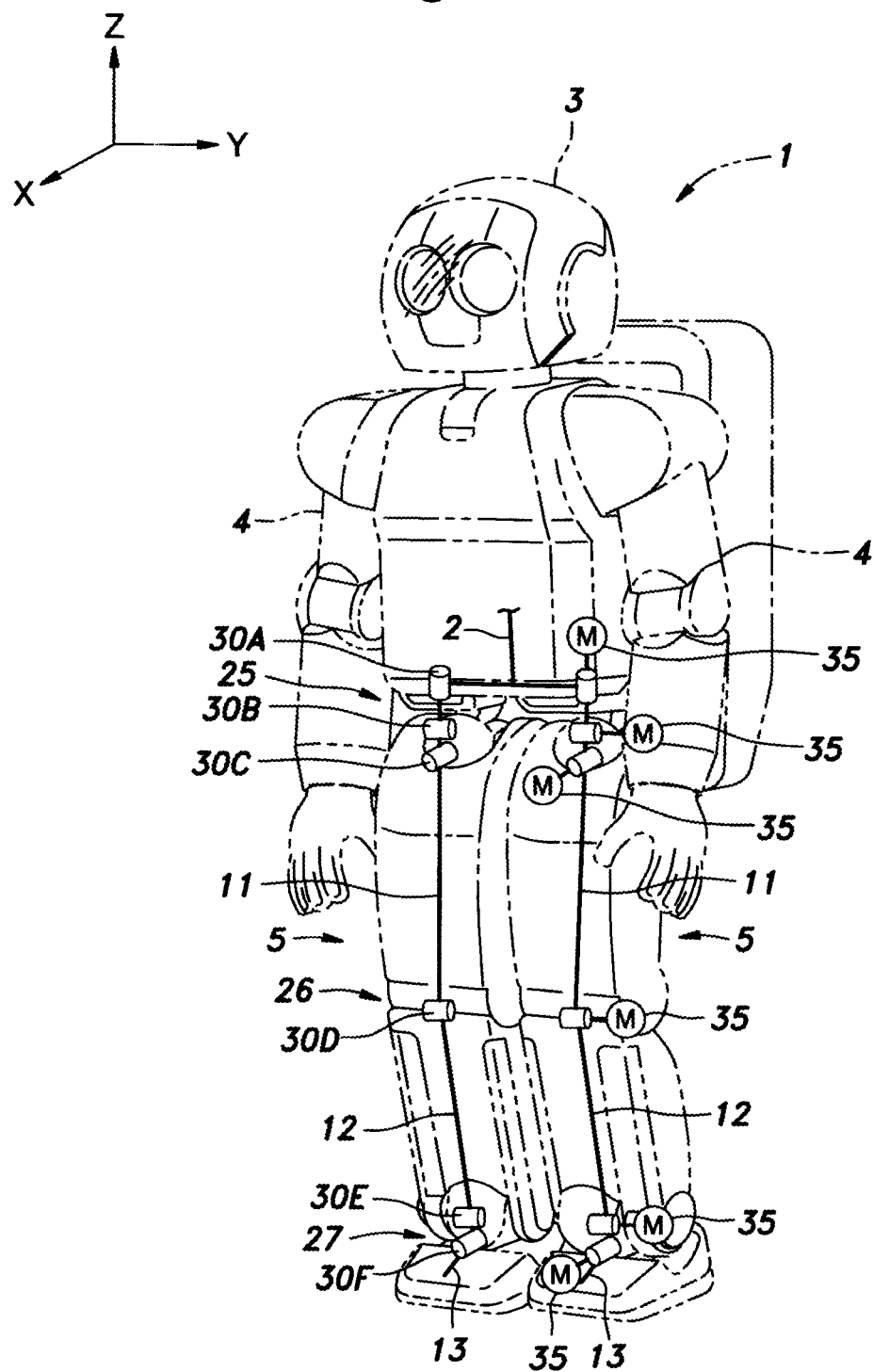
FIG. 2 is an explanatory diagram showing joint structures of legs of the robot shown in FIG. 1.

With reference to FIG. 2, the structure of the joints 25-27 of each leg 5 will be described. It is to be noted that the joints 22-24 of each arm 4 are constituted similarly to the joints of the leg 5, and therefore, description thereof will be omitted. In the following description, from the view point of the robot 1, the fore and aft direction is defined as X-axis, the lateral direction as Y-axis, and the vertical direction as Z-axis. The joints 25-27 of each leg 5 are each constituted of at least one coupling 30 (30A-30F), where each coupling 30 is provided between a pair of links connected to each other. Each coupling 30 connects the associated pair of links such that the links are rotatable relative to each other around one axis. The rotational movement permitted by each coupling 30 is one of a roll movement around the X-axis, a pitch movement around the Y-axis, and a yaw movement around the Z-axis, and by combining these movements, a rotation with multiple degrees of freedom can be achieved at a joint.

The hip joint 25 is constituted of a first hip coupling 30A, a second hip coupling 30B, and a third hip coupling 30C for allowing the thigh 10 to rotate relative to the torso 2 around the Z-axis, the Y-axis, and the X-axis, respectively. The knee joint 26 is constituted of a knee coupling 30D for allowing the lower leg 11 to rotate relative to the thigh 10 around the Y-axis. The ankle joint 27 is constituted of first and second ankle couplings 30E and 30F for allowing the foot 12 to rotate relative to the lower leg 11 around the Y-axis and the X-axis, respectively. Each coupling 30 is provided with an electric servomotor 35 (only the electric servomotors for the left leg 5 are shown in FIG. 2). By drive-controlling the electric servomotors 35, the corresponding couplings 30 are driven to achieve desired motions of the joints.

Figure 3:
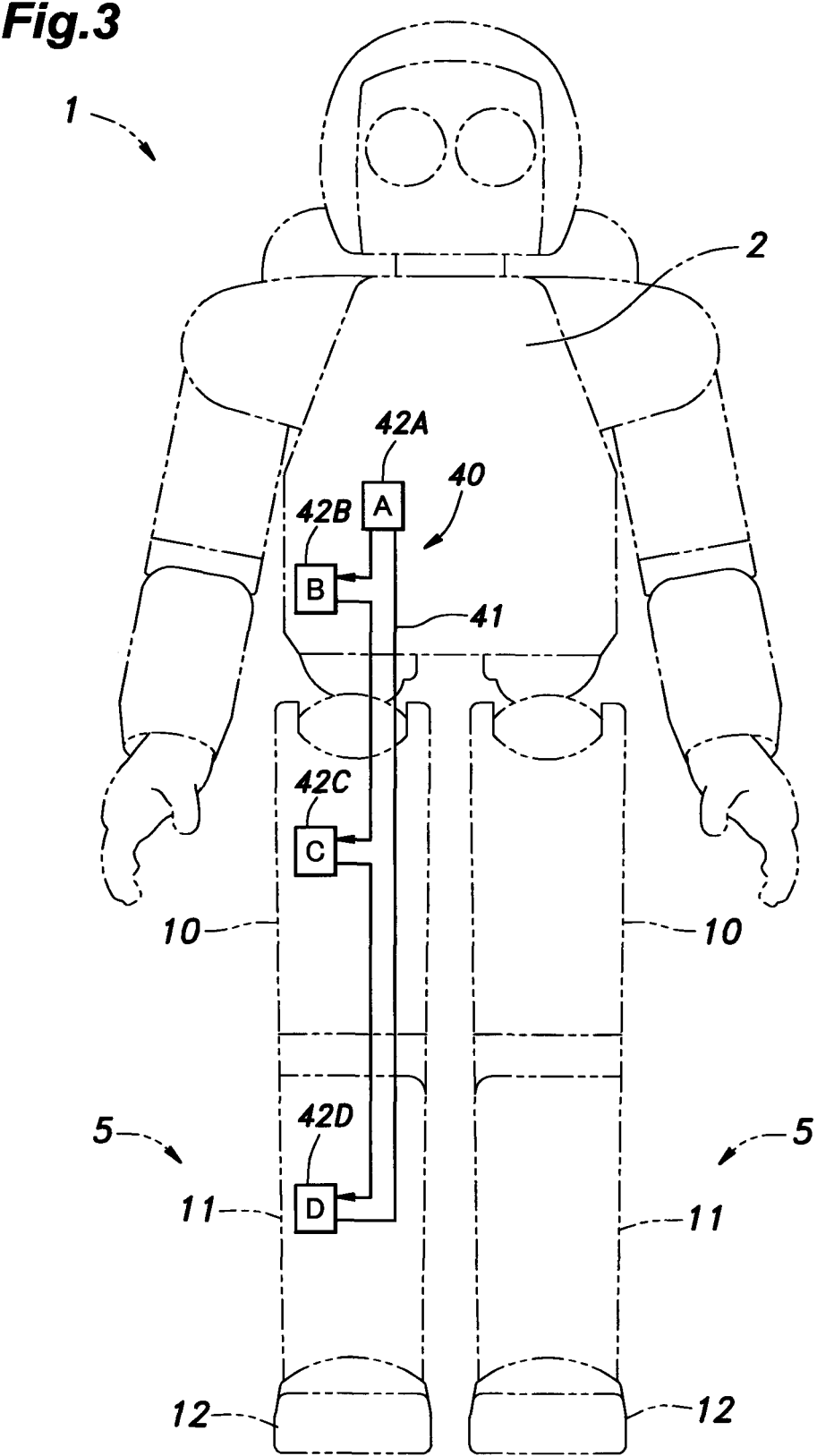
FIG. 3 is a diagram showing an arrangement of a ring network provided in a right leg of the robot shown in FIG. 1.

As shown in FIG. 3, the robot 1 is provided with a ring network 40 for controlling the motion of the right leg 5. The ring network 40 includes multiple nodes 42 (nodes 42A to 42D, which may be also referred to as nodes A to D in the drawings) which are distributedly arranged on the torso 2 and the links 10-12 constituting the right leg 5, and communicably connected to each other by communication lines 41. The nodes 42 each constitute a control device configured to servo-control the one or more electric servomotors 35 associated thereto. The nodes 42 cooperate with each other to control the motion of the right leg 5. At least one (in the illustrated embodiment, the node 42A and the node 42B) of the nodes 42 is provided on the torso 2, while the remaining nodes 42 (in the illustrated embodiment, the node 42C and the node 42D) are provided on the links (in the illustrated embodiment, the thigh 10 and the lower leg 11) of the right leg 5. Though not shown in the drawings, the robot 1 is further provided with additional ring networks 40 having a similar configuration as that shown in FIG. 3 and configured to control the motion of the left leg 5 and the left and right arms 4. Thus, the ring networks 40 constitute a distributed control system in which the nodes 42 for controlling the various parts of the robot 1 are distributedly arranged.

The node 42A provided on the torso 2 is connected to the ring network 40 for the left leg 5, the ring networks 40 for the left and right arms 4, and the ring network 40 for the head 3, and acts as a host node that generates operation commands or the like for the other nodes 42 in the own ring network (namely, the ring network 40 that includes the node 42A). The remaining three nodes 42 (42B, 42C, 42D) in the ring network 40 act as agent nodes that control the motion of the relevant joints following the operation commands generated by the node 42A.

The communication lines 41 are routed in the robot 1 from the torso 2 to the lower leg 11 to pass the joints 25, 26. In the illustrated ring network 40, the signal transfer direction is predetermined. Specifically, in the ring network 40, connection is made such that the signal is transferred from the node 42A, which is provided on the torso 2 and acts as the host node, to the node 42B provided on the torso 2 to the node 42C provided on the thigh 10 to the node 42D provided on the lower leg 11 and back to the node 42A in this order, where the nodes 42B to 42D act as the agent nodes. In the present embodiment, optical fiber cables are used as the communication lines 41. In another embodiment, electric signal lines may be used as the communication lines 41.

In this embodiment, the node 42D is configured to control the operation of the electric servomotors 35 for driving the first and second ankle couplings 30E and 30F, the node 42C is configured to control the operation of the electric servomotor 35 for driving the knee coupling 30D, the node 42B is configured to control the operation of the electric servomotors 35 for driving the second and third hip couplings 30B and 30C, and the node 42A is configured to control the electric servomotor 35 for driving the first hip coupling 30A.

In the following, a first embodiment of the ring network 40 will be described with reference to FIGS. 4 to 15.

Figure 4:
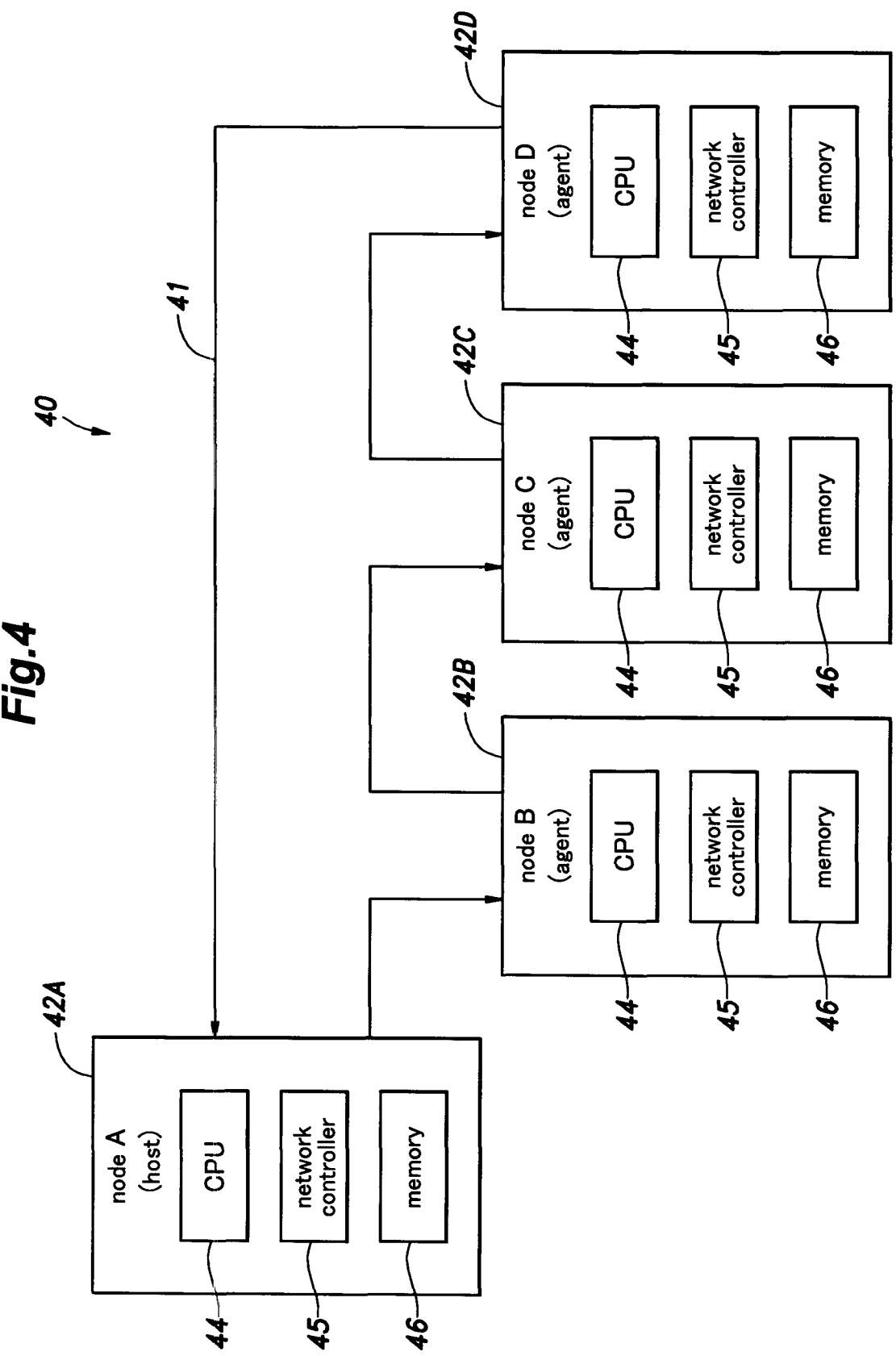
FIG. 4 is a schematic configuration diagram of a first embodiment of the ring network shown in FIG. 3.

FIG. 4 is a schematic configuration diagram of a first embodiment of the ring network 40 shown in FIG. 3. As shown in FIG. 4, each node 42 includes a CPU 44 serving as an arithmetic processing unit, a network controller 45 configured to send data D in one direction along the ring network 40, and a memory 46 storing software. Since optical fiber cables are used as the communication lines 41 in the present embodiment, the network controller 45 includes optical transceiver modules transmitting and receiving optical signals. Thus, the communication lines 41 are constituted of optical fiber cables each extending between the optical transceiver modules provided on a corresponding pair of adjoining nodes 42 such that the optical fiber cables connect the nodes in a ring to transmit signals (data) in one direction in the aforementioned order. It is to be noted that the ring network 40 may not necessarily have a physical ring topology but may have a logical ring topology.

Each node 42 is a control device that executes, with the CPU 44, arithmetic processing using software, and, based on the data output by the arithmetic processing, controls an associated control target 47 (FIG. 9) which consists of hardware. "Hardware" in this embodiment is an electric device electrically connected with a power supply, and may be, for example, an electric servomotor, a solenoid valve, a lighting apparatus, an electric element, or a driver for controlling the supply of power thereto.

The data D transmitted on the ring network 40 include two types of data; ordinary data Dn used in ordinary control (namely, used for control of the hardware conducted by a later-described controller 49) and interrupt data Di that is generated when it is desired to control the hardware without via the controller 49 and is prioritized than the ordinary data Dn. in principle, each data D (ordinary data Dn or interrupt data Di) is transmitted in the form of a packet P having a structure shown in FIG. 5 or FIG. 6 (hereinafter, a packet P containing ordinary data Dn will be referred to as an ordinary packet Pn, and a packet P containing interrupt data Di will be referred to as an interrupt packet Pi). Description of exceptional packets P is omitted here, but if necessary, reference should be made to JP2017-175231A (US2017/0272272A1) filed by the Applicant.

Figure 5:
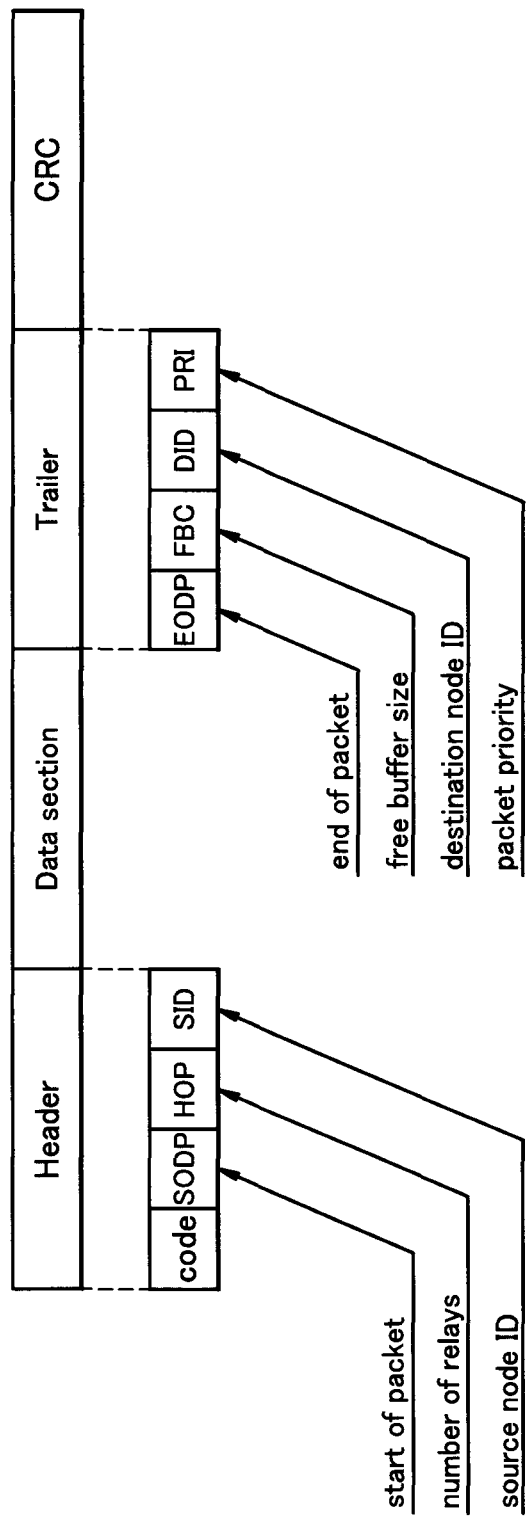
FIG. 5 is a configuration diagram of an ordinary packet.

As shown in FIG. 5, the packet P containing ordinary data Dn, namely, the ordinary packet Pn, is constituted of a frame including, from the top, a header, data section (ordinary data Dn), trailer, and CRC (cyclic redundancy check). The header is constituted of a code, start of packet (SODP), number of relays (hop count) (HOP), and source node ID (SID) identifying the source node of the packet. The trailer is constituted of an end of packet (EODP), free buffer size (FBC), destination node ID (DID) identifying the destination node of the packet, and packet priority (PRI). There may be no limit to the size (bytes) of the data section such that all data D necessary for a series of instructions may be included in a single data section. Alternatively, the size of the data section in each frame may be limited to a predetermined size such that, if the size of all data D necessary for a series of instructions is larger than the predetermined size, the data section of one frame contains only one of the data pieces resulting from dividing of the data D. Namely, the ordinary packet Pn is constituted by adding at least the header and trailer to the ordinary data Dn.

Figure 6:
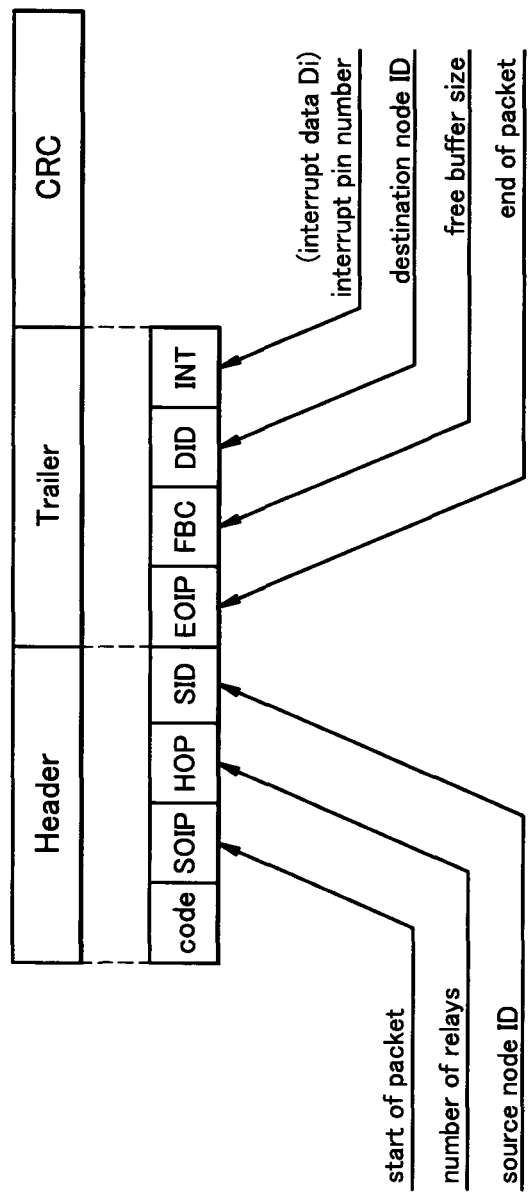
FIG. 6 is a configuration diagram of an interrupt packet.

On the other hand, the packet P containing interrupt data Di, namely, the interrupt packet Pi, is constituted of a frame including a header, trailer, and CRC, as shown in FIG. 6. Namely, the interrupt packet Pi of this embodiment does not include the data section shown in FIG. 5. The header of the interrupt packet Pi is constituted of a code, start of packet (SOIP), number of relays (HOP), and source node ID (SID), similarly to the header of the ordinary packet Pn. On the other hand, the trailer of the interrupt packet Pi is constituted of an end of packet (EOIP), free buffer size (FBC), destination node ID (DID), and interrupt pin number (INT).

It is to be noted here that the start of packet (SOIP) and the end of packet (EOIP) of the interrupt packet Pi are different from the start of packet (SODP) and the end of packet (EODP) of the ordinary packet Pn, respectively, such that the start of packet (SOIP) and the end of packet (EOIP) of the interrupt packet Pi can be distinguished from the start of packet (SODP) and the end of packet (EODP) of the ordinary packet Pn.

Since the interrupt packet Pi is transmitted in preference to the ordinary packet Pn as described above, the trailer of the interrupt packet Pi does not include the packet priority (PRI) shown in FIG. 5, but includes the interrupt pin number (INT) in place therefor. Namely, in the present embodiment, the interrupt pin number (INT) serves as the interrupt data Di and is incorporated in the trailer. Thereby, the interrupt packet Pi containing the interrupt data Di and having a header and a trailer is constituted.

The interrupt pin number (INT) indicates an interrupt pin of hardware of another node 42 to be controlled. It is also to be noted that each node 42 may be associated with multiple items of hardware and each item of hardware may have multiple interrupt pins corresponding to different modes of operation. In such a case, the interrupt pin numbers can be predetermined such that one interrupt pin number specifies a specific interrupt pin of a specific item of hardware.

In another embodiment, data D including more information than the interrupt pin number (INT) may be used as the interrupt data Di, and the interrupt packet Pi may have a structure similar to that of the ordinary packet Pn, namely, a structure having a header added before the interrupt data Di and a trailer and CRC added after the interrupt data Di.

The number of relays (HOP) indicates the number of the nodes 42 that relayed the packet P. The number of relays (HOP) is set to 0 (zero) by the node 42 that creates the packet P, and is incremented by one unit (in the present embodiment, 1 (one)) each time the packet is relayed by a node 42. More concrete explanation will be provided below.

Figure 7:
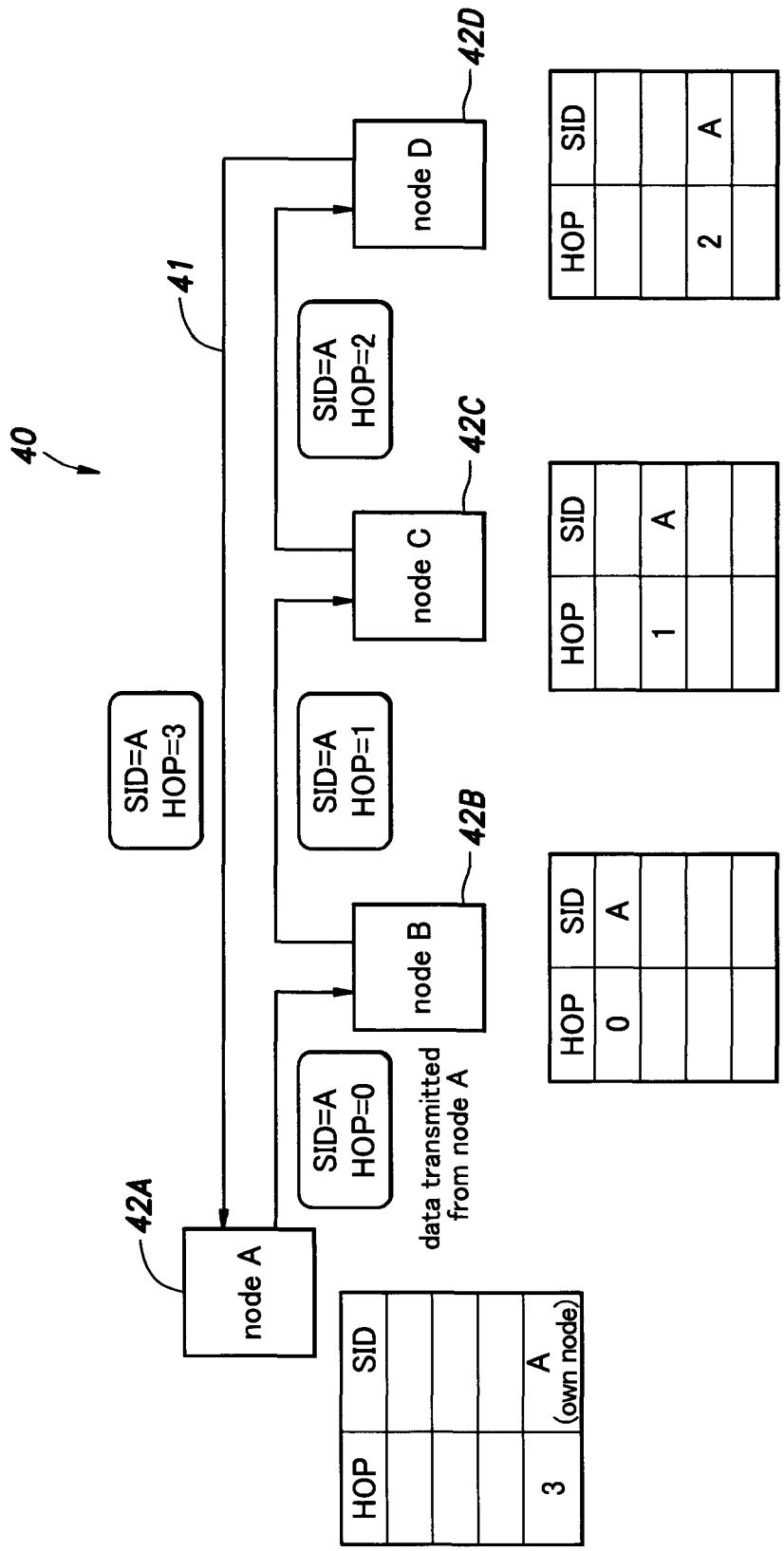
FIG. 7 is an explanatory diagram for explaining a change in the number of relays (HOP) of a packet transmitted from a node A (42A)

As shown in FIG. 7, for example, the number of relays (HOP) of a packet P generated by the node 42A (or a packet having the source node ID (SID) equal to A) changes as follows. The number of relays (HOP) of the packet P is set to 0 (zero) at the node 42A, and then, the packet P is transmitted from the node 42A to the communication lines 41. Therefore, the number of relays (HOP) of the packet P having the SID equal to A and received by the node 42B is 0 (zero). On the other hand, when the node 42B relays the packet P, the node 42B adds 1 (one) to the number of relays (HOP). As a result, the number of relays (HOP) of the packet P having the SID equal to A and received by the node 42C is 1 (one). The node 42C also adds 1 (one) to the number of relays (HOP) when relaying the packet P. Therefore, the number of relays (HOP) of the packet P having the SID equal to A and received by the node 42D is 2. Further, the node 42D also adds 1 (one) to the number of relays (HOP) when relaying the packet P. Therefore, the number of relays (HOP) of the packet P having the SID equal to A and received by the node 42A is 3.

Figure 8:
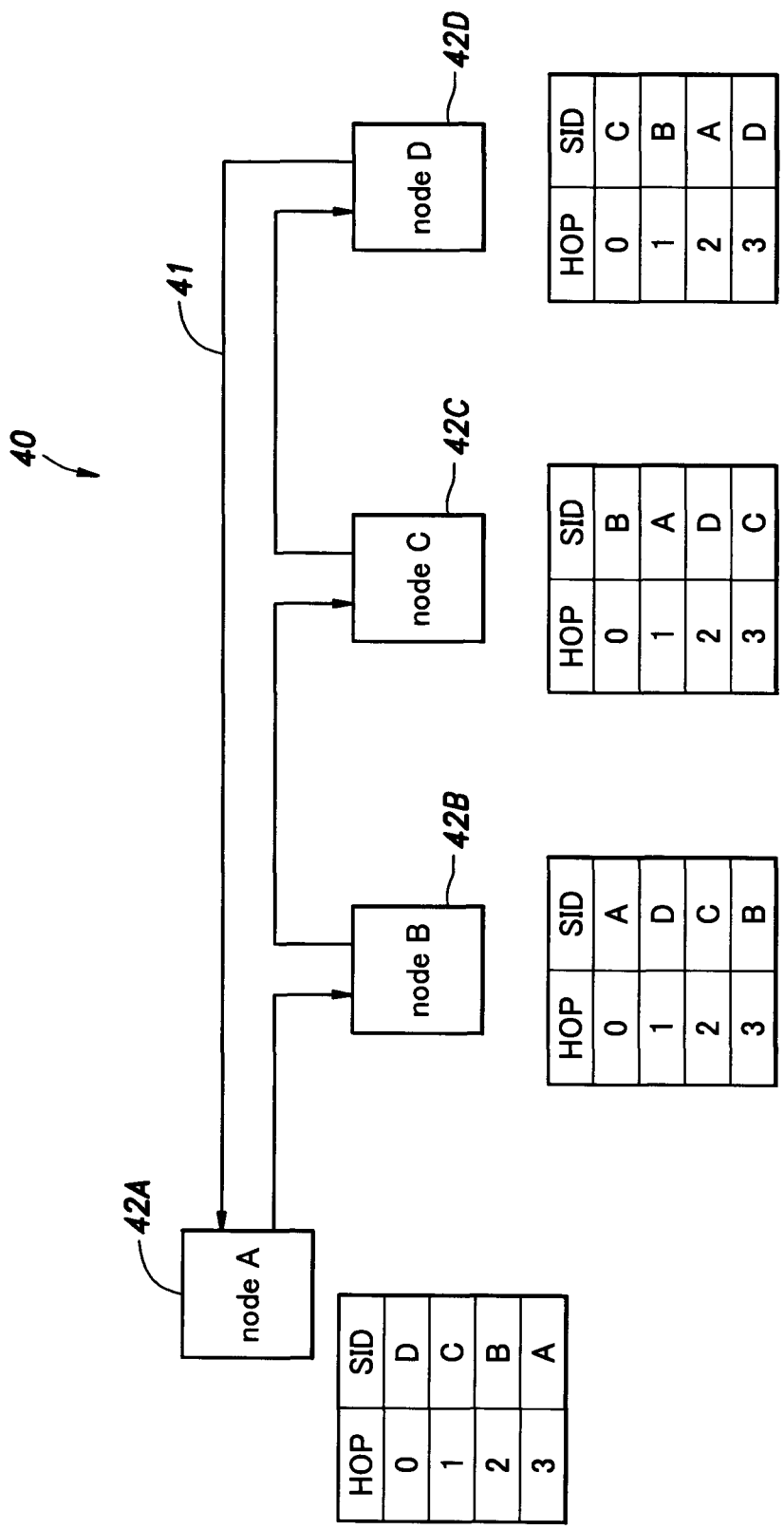
FIG. 8 is an explanatory diagram for explaining the number of relays (HOP) of the packet received by each node.

The packets P generated by the other nodes 42 are similarly relayed such that 1 (one) is added to the number of relays (HOP) thereof for each relay. Accordingly, the packets P transferred through the ring network 40 are received by each node 42 with the numbers of relays (HOP) as shown in FIG. 8. For instance, the HOP of the packet P received by the node 42A is 0 if the SID of the packet P is D, 1 if the SID is C, 2 if the SID is B, and 3 if the SID is A. At the node 42B, the relationship between the number of relays (HOP) and the SID of the received packets P slides by 1 compared to the packets P received by the node 42A. This also applies to the node 42C and the node 42D.

Figure 9:
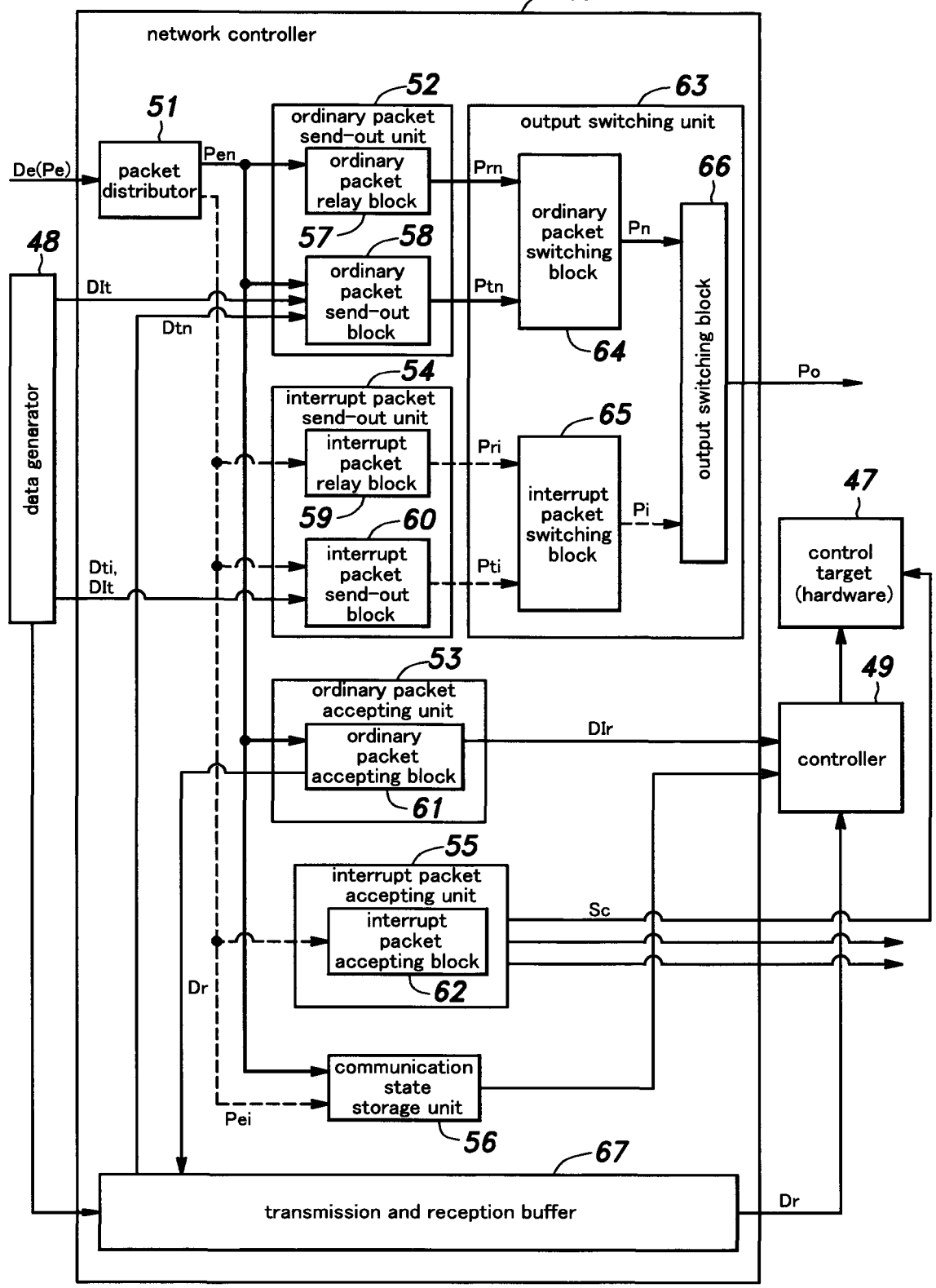
FIG. 9 is a functional block diagram of each node shown in FIG. 4.

FIG. 9 is a functional block diagram of each node 42. As shown in FIG. 9, each node 42 includes: the aforementioned network controller 45 implemented by hardware; a software-operated data generator 48 which is a functional unit that executes, with the CPU 44, arithmetic processing using software to generate data D to be transmitted to another node 42 (hereinafter referred to as transmission data Dt) and data-related information such as a code and a priority to be added to the data D (hereinafter referred to as data information DI); and a software-operated controller 49 which is a functional unit that executes, with the CPU 44, arithmetic processing using software based on at least the data D contained in the packet P transmitted from another node 42 and controls the control target 47.

The data generator 48 generates, as transmission data Dt to be sent to other nodes 2, two types of data; namely, ordinary transmission data Dtn used in ordinary control (i.e., used in the control of the control target 7 (hardware) by the controller 49 of another node 42) and interrupt transmission data Dti that is used to control the hardware of another node 42 without via the controller 49 and is prioritized than the ordinary transmission data Dtn. The data generator 48 is configured to generate the ordinary transmission data Dtn according to a predetermined repeating pattern (e.g., at a predetermined time interval). In this description, the ordinary transmission data Dtn and the interrupt transmission data Dti respectively indicate the ordinary data Dn and the interrupt data Di generated by the data generator 48 of each node 42 and yet to be transmitted, and these terms are used to distinguish them from the ordinary data Dn and the interrupt data Di input to each node 42 from the network 3, which will be referred to as ordinary input data Den and interrupt input data Dei, respectively, as described later.

Further, the data generator 48 generates data information DI to be included in the header and trailer of the packet P containing the transmission data Dt (ordinary transmission data Dtn or interrupt transmission data Dti). The packet P containing the transmission data Dt and having the header and trailer (hereinafter referred to as a transmission packet Pt) includes two types; namely, an ordinary transmission packet Ptn containing ordinary transmission data Dtn with a header, trailer, etc. added thereto, and an interrupt transmission packet Pti containing interrupt transmission data Dti and having a header, trailer, etc. It is to be noted here that the interrupt transmission data Dti may be incorporated in the trailer as shown in FIG. 6 or the header and trailer may be added before and after the interrupt transmission data Dti.

In each node 42, the packet P containing the data D transmitted from an upstream-side node in the ring network 40 is input to the network controller 45. In the present description, the data D and the packet P input to each node 42 from another node 42 are referred to as input data De and an input packet Pe, respectively, to distinguish from the transmission data Dt and transmission packet Pt generated by the data generator 48 of the own node 42 and yet to be transmitted. The input data De also includes two types; namely, ordinary input data Den used in ordinary control (i.e., used in the control of the hardware by the controller 49 of the own or another node 42) and interrupt input data Dei that is used to control the hardware of the own or another node 42 without via the controller 49 and is prioritized than the ordinary input data Den. Likewise, the input packet Pe includes two types; namely, an ordinary input packet Pen containing ordinary input data Den with a header, trailer, etc. added thereto, and an interrupt input packet Pei containing interrupt input data Dei and having a header, trailer, etc.

The network controller 45 includes a packet distributor 51 that distributes the input packet Pe containing the input data De to later-described various units (blocks) of the own node 42. In a case where the start of packet contained in the header of the input packet Pe is SODP (refer to FIG. 5), the packet distributor 51 recognizes the data segment from the header to the trailer containing the end of packet consisting of EODP (or to the CRC when the CRC is added after the trailer) as a single ordinary input packet Pen in principle. In a case where the start of packet contained in the header of the input packet Pe is SOIP (refer to FIG. 6), the packet distributor 51 recognizes the data segment from the header to the trailer containing the end of packet consisting of EOIP (or to the CRC when the CRC is added to the trailer) as a single interrupt input packet Pei in principle. Explanation on the exceptions is omitted here. In FIG. 9, the ordinary input packet Pen containing the ordinary input data Den and distributed from the packet distributor 51 is shown by bold lines while the interrupt input packet Pei containing the interrupt input data Dei and distributed from the packet distributor 51 is shown by broken lines.

In a case where the packet P input to the packet distributor 51 is a standard ordinary input packet Pen (namely, having the structure shown in FIG. 5), the packet distributor 51 distributes the ordinary input packet Pen to each of an ordinary packet send-out unit 52, an ordinary packet accepting unit 53, and a communication state storage unit 56. On the other hand, in a case where the packet P input to the packet distributor 51 is a standard interrupt input packet Pei (namely, having the structure shown in FIG. 6), the packet distributor 51 distributes the interrupt input packet Pei to each of an interrupt packet send-out unit 54, an interrupt packet accepting unit 55, and the communication state storage unit 56. Explanation on the packet distribution by the packet distributor 51 in a case where the input packet P is omitted.

The data generator 48 writes the generated ordinary transmission data Dtn addressed to another node 42 in a transmission and reception buffer 67, and writes the data information DI of the ordinary transmission data Dtn (hereinafter referred to as transmission data information DIt) in the ordinary packet send-out unit 52. Further, the data generator 48 writes the generated interrupt transmission data Dti (interrupt pin number (INT)) addressed to another node 42 and the transmission data information DIt thereof in the interrupt packet send-out unit 54.

The ordinary packet send-out unit 52 includes an ordinary packet relay block 57 and an ordinary packet send-out block 58. The ordinary packet relay block 57 is configured to, when the destination of the ordinary input packet Pen distributed from the packet distributor 51 is not the own node, send out the ordinary input packet Pen as it is except for adding one unit (1) to the number of relays (HOP) as an ordinary relay packet Prn to be relayed. The ordinary packet send-out block 58 is configured to send out the ordinary transmission data Dtn generated by the data generator 48 to be addressed to another node 42, after converting it to the ordinary transmission packet Ptn. The ordinary packet send-out block 58 reads out, from the transmission and reception buffer 67, the ordinary transmission data Dtn corresponding to the transmission data information DIt written by the data generator 48, and adds a header, trailer, and CRC to the ordinary transmission data Dtn to generate the ordinary transmission packet Ptn. Further, the ordinary packet send-out block 58 performs transmission completion determination based on the ordinary input packet Pen distributed from the packet distributor 51. Specifically, when the ordinary input packet Pen is identical with the ordinary transmission packet Ptn previously transmitted from the own node, namely when it is determined that the ordinary transmission packet Ptn previously generated by the own node has returned after circulating the ring network 40 one round, the packet send-out block 58 determines that the transmission of the ordinary transmission packet Ptn is completed.

The interrupt packet send-out unit 54 includes an interrupt packet relay block 59 and an interrupt packet send-out block 60. The interrupt packet relay block 59 is configured to, when the destination of the interrupt input packet Pei distributed from the packet distributor 51 is not the own node, send out the interrupt input packet Pei as it is except for adding one unit (1) to the number of relays (HOP) as an interrupt relay packet Pri to be relayed. The interrupt packet send-out block 60 is configured to send out the interrupt transmission data Dti generated by the data generator 48 to be addressed to another node 42, after converting it to the interrupt transmission packet Pti. The interrupt packet send-out block 60 generates the ordinary transmission packet Ptn by adding a header, trailer, and CRC to the interrupt transmission data Dti (to be exact, incorporating the interrupt transmission data Dti in the trailer).

The ordinary packet accepting unit 53 includes an ordinary packet accepting block 61. When the destination of the ordinary input packet Pen distributed from the packet distributor 51 is the own node and hence the ordinary input packet Pen should be accepted, the ordinary packet accepting block 61 accepts the ordinary input packet Pen and writes the ordinary input data Den contained therein in the transmission and reception buffer 67 as reception data Dr while forwarding the transmission data information DIt contained in the ordinary input packet Pen to the controller 49. The controller 49 reads out, from the transmission and reception buffer 67, the reception data Dr corresponding to the transmission data information DIt forwarded from the ordinary packet accepting block 61, and, based on the read-out reception data Dr, controls the control target 47 (hardware).

The interrupt packet accepting unit 55 includes an interrupt packet accepting block 62. When the destination of the interrupt input packet Pei distributed from the packet distributor 51 is the own node, the interrupt packet accepting block 62 accepts the interrupt input packet Pei and sends out a hardware control signal Sc to the hardware in accordance with the interrupt data Di (interrupt pin number (INT), see FIG. 6) contained in the accepted interrupt input packet Pei.

The ordinary relay packet Prn sent out from the ordinary packet relay block 57, the ordinary transmission packet Ptn sent out from the ordinary packet send-out block 58, the interrupt relay packet Pri sent out from the interrupt packet relay block 59, and the interrupt transmission packet Pti sent out from the interrupt packet send-out block 60 are input to an output switching unit 63.

In the output switching unit 63, an ordinary packet switching block 64 outputs one of the ordinary relay packet Prn and the ordinary transmission packet Ptn that has an earlier input timing as the ordinary packet Pn to be sent out to another node 42. Specifically, when one of the ordinary relay packet Prn and the ordinary transmission packet Ptn is input, the ordinary packet switching block 64 outputs the input packet as the ordinary packet Pn to be sent out, and when the ordinary relay packet Prn and the ordinary transmission packet Ptn are input simultaneously, the ordinary packet switching block 64 switches the output ordinary packet Pn between the ordinary relay packet Prn and the ordinary transmission packet Ptn such that the ordinary transmission packet Ptn is output with priority (earlier).

Further, in the output switching unit 63, an interrupt packet switching block 65 outputs one of the interrupt relay packet Pri and the interrupt transmission packet Pti that has an earlier input timing as the interrupt packet Pi to be sent out to another node 42, and conducts switching of the output interrupt packet Pi between the interrupt relay packet Pri and the interrupt transmission packet Pti. Similarly to the ordinary packet switching block 64, the interrupt packet switching block 65 outputs the interrupt transmission packet Pti with priority (earlier) when the interrupt relay packet Pri and the interrupt transmission packet Pti are input simultaneously.

Further, in the output switching unit 63, an output switching block 66 outputs, in principle, one of the ordinary packet Pn output from the ordinary packet switching block 64 and the interrupt packet Pi output from the interrupt packet switching block 65 as an output packet Po directed to a downstream node 42. Specifically, when one of the ordinary packet Pn and the interrupt packet Pi is input, the output switching block 66 outputs the input packet (ordinary packet Pn or interrupt packet Pi) as an output packet Po. Explanation on the exceptions is omitted.

Detailed description of the above units and blocks is omitted here. If necessary, reference should be made to JP2017-11519A (US2016/0380835A1) and JP2017-175231A (US2017/0272272A1) filed by the Applicant.

The communication state storage unit 56 is configured to store the transmission data information DIt for determining, for each input packet Pe (ordinary input packet Pen or interrupt input packet Pei) distributed by the packet distributor 51, whether the transmission according to the aforementioned repeating pattern has been performed and whether the relationship between the number of relays (HOP) and the source node ID (SID) is proper.

Figure 10:
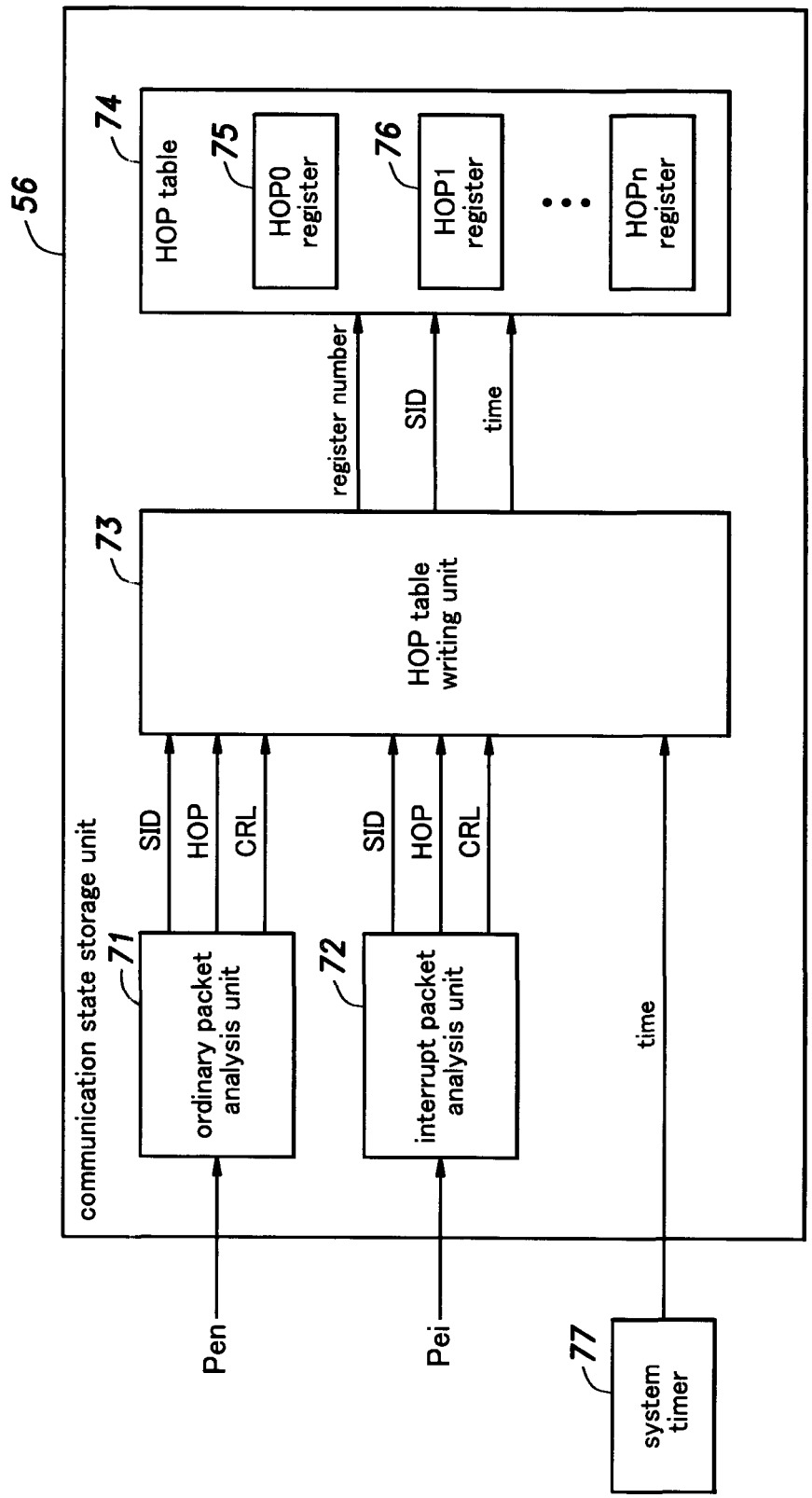
FIG. 10 is a functional block diagram of a communication state storage unit shown in FIG. 9.

As shown in FIG. 10, the communication state storage unit 56 includes an ordinary packet analysis unit 71 configured to analyze the source node ID (SID), the number of relays (HOP), and the CRC of the ordinary input packet Pen, and an interrupt packet analysis unit 72 configured to analyze the source node ID (SID), the number of relays (HOP), and the CRC of the interrupt input packet Pei. The communication state storage unit 56 further includes a HOP table writing unit 73 configured to write the source node ID (SID), the number of relays (HOP), and the CRC of the input packet Pe analyzed by the ordinary packet analysis unit 71 and the interrupt packet analysis unit 72 in a HOP table 74 together with a register number and a time provided by a system timer 77. The HOP table 74 is provided with a HOP0 register 75 which is an input field regarding the input packet Pe whose HOP is equal to 0, a HOP1 register 76 which is an input field regarding the input packet Pe whose HOP is equal to 1, . . . and a HOPn register which is an input field regarding the input packet Pe whose HOP is equal to n, and the source node ID (SID) and the CRC are written in these registers (75, 76, . . . ) for each HOP.

The controller 49 (FIG. 9) is configured to function as a communication error detector that reads out the HOP table 74 and determines whether the transmission according to the aforementioned repeating pattern has been performed to thereby detect an occurrence of a communication error in the ring network 40 and identify the part where the communication error has occurred. Here, the communication error may include, in addition to a break of any optical fiber cable constituting the communication lines 41, a transmission/reception failure of the packet P due to malfunction of any node 42, excessively large number of transmissions and receptions of the packet P due to any node 42 running out of control, etc.

It is to be noted that not all of the nodes 42 necessarily have to have all the functional units shown in FIG. 9. For instance, arrangement may be made such that the node 42A acting as the host node in the ring network 40 has the communication state storage unit 56, but the other nodes 42 in the same ring network 40 do not have the communication state storage unit 56. Also, it is not necessary that all of the nodes 42 have the interrupt packet send-out block 60, the interrupt packet switching block 65, and the interrupt packet accepting unit 55. However, each node 42 is provided with the data generator 48 to generate the ordinary transmission data Dtn, and the functional block/units necessary to embody the ring network 40, namely, the packet distributor 51, the ordinary packet relay block 57, the ordinary packet send-out block 58, and the ordinary packet switching block 64. In a case where the interrupt packet Pi is not used, the interrupt packet relay block 59 constituting the packet relay unit together with the ordinary packet relay block 57 in FIG. 9 is unnecessary.

Next, description will be made of communication error detection performed by the controller 49 (FIG. 9).

Figure 11:
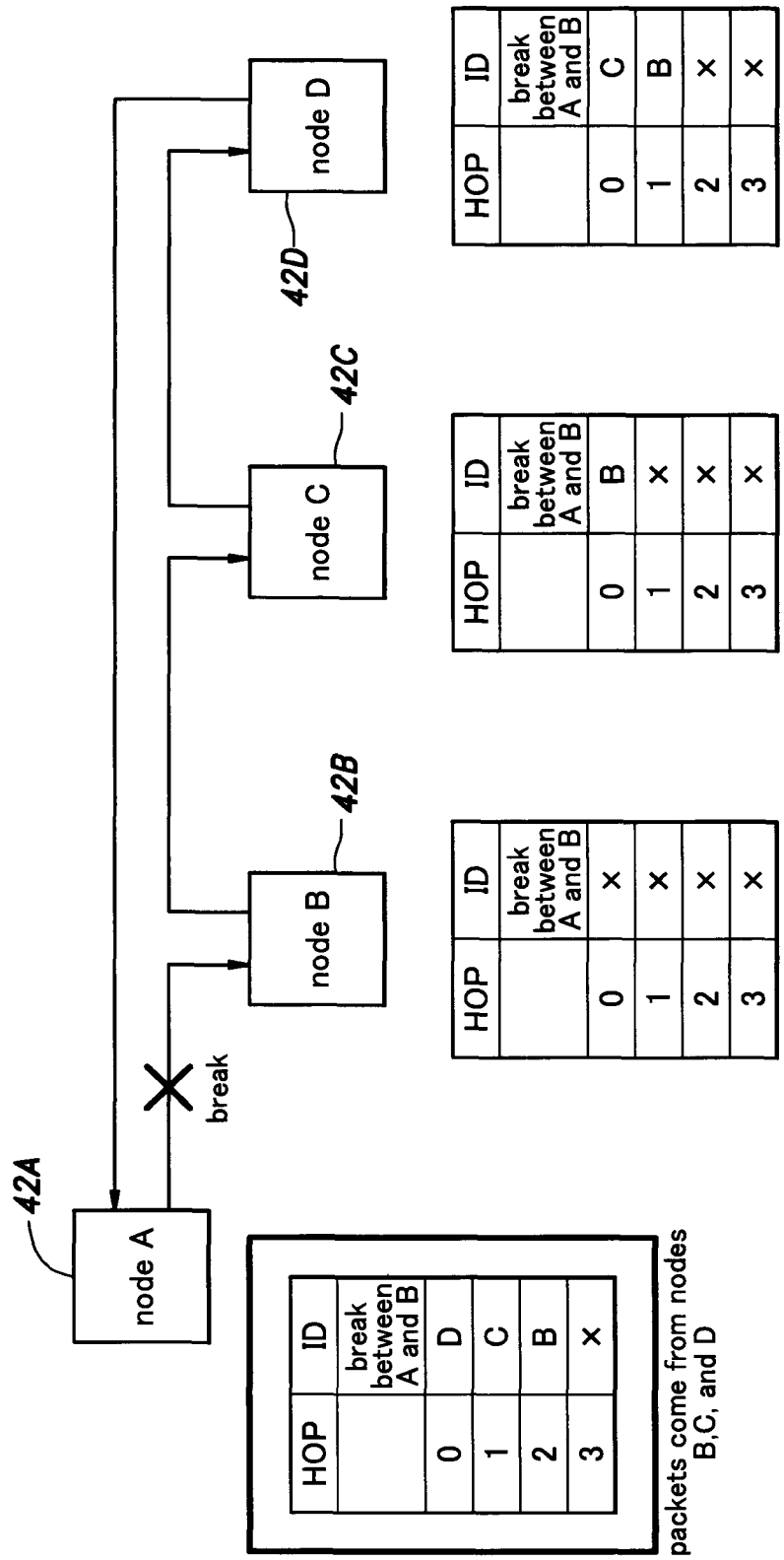
FIG. 11 is an explanatory diagram showing the HOP tables of the first embodiment in a first communication error pattern.

FIG. 11 is an explanatory diagram showing the HOP tables 74 of the first embodiment in a first communication error pattern. As shown in FIG. 11, the first communication error pattern is a break of the communication line 41 connecting between the node 42A acting as the host node and the node 42B on the downstream side thereof (may be expressed as "break between A and B"). In the first communication error pattern, only information (such as the transmission data information DIt and time) on the input packets Pe having the SID equal to A is not written in the HOP table 74 of the node 42A (as shown by "x" in the table), while information on the other input packets Pe is written in the same. It is to be noted that "the information on a packet being not written" means that the transmission of the packet according to the repeating pattern is not performed, and "the information on a packet being written" means that the transmission of the packet according to the repeating pattern is performed. In the HOP table 74 of the node 42B, information on any input packet Pe is not written. In the HOP table 74 of the node 42C, information on only the input packets Pe having the SID equal to B is written, while information on the other input packets Pe is not written. In the HOP table 74 of the node 42D, information on the input packets Pe having the SID equal to C or B is written, while information on the input packets Pe having the SID equal to A or C is not written.

Figure 12:
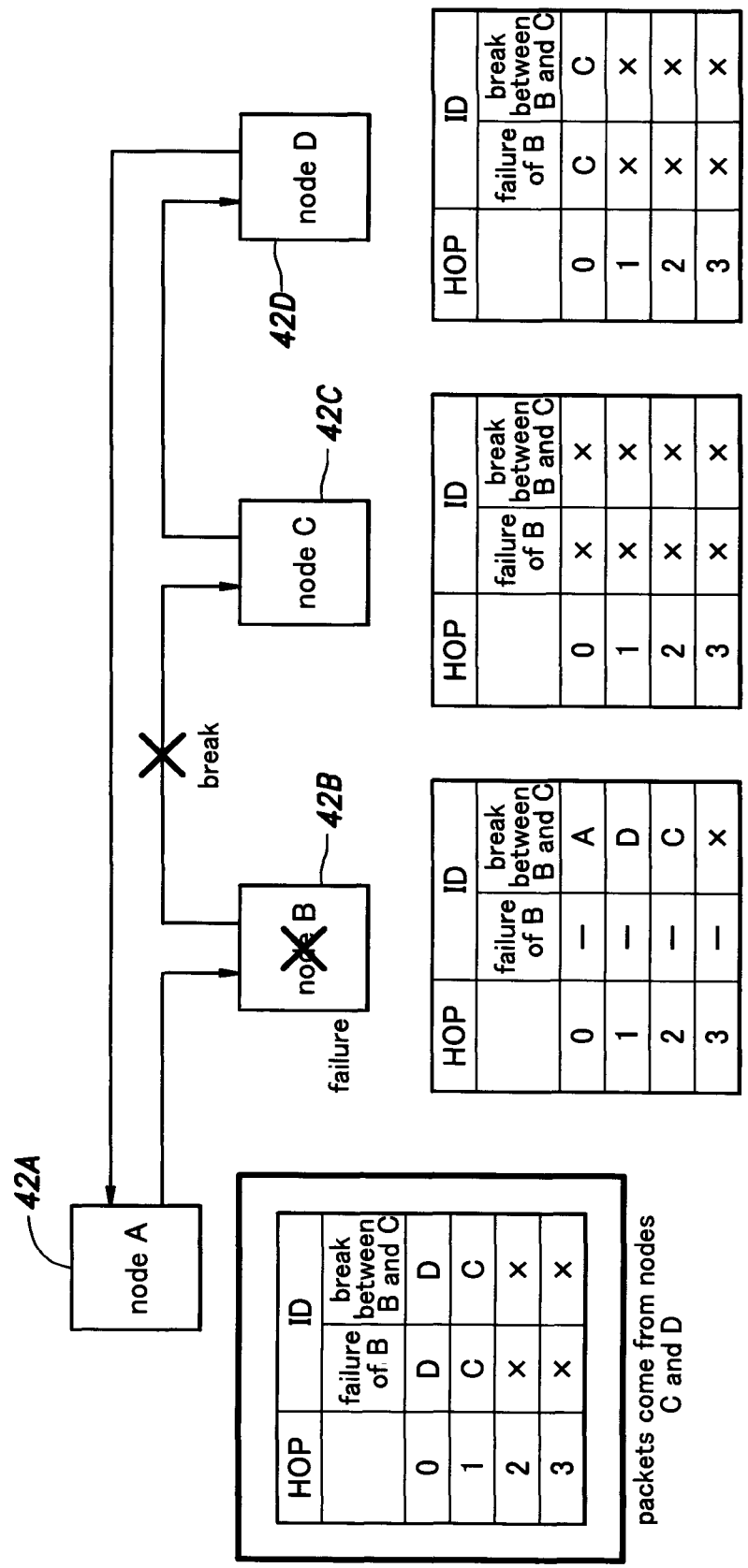
FIG. 12 is an explanatory diagram showing the HOP tables of the first embodiment in a second communication error pattern.

FIG. 12 is an explanatory diagram showing the HOP tables 74 of the first embodiment in a second communication error pattern. As shown in FIG. 12, the second communication error pattern is a failure of the node 42B or a break of the communication line 41 connecting between the node 42B and the node 42C on the downstream side thereof (may be expressed as "break between B and C"). In the second communication error pattern, information on the input packets Pe having the SID equal to B or A is not written in the HOP table 74 of the node 42A, while information on the input packets Pe having the SID equal to D or C is written in the same. In the HOP table 74 of the node 42B, only information on the input packets Pe having the SID equal to B is not written, while information on the other input packets Pe is written. In the HOP table 74 of the node 42C, information on any of the input packet Pe is not written. In the HOP table 74 of the node 42D, only information on the input packets Pe having the SID equal to C is written, while information on the other input packets Pe is not written.

Figure 13:
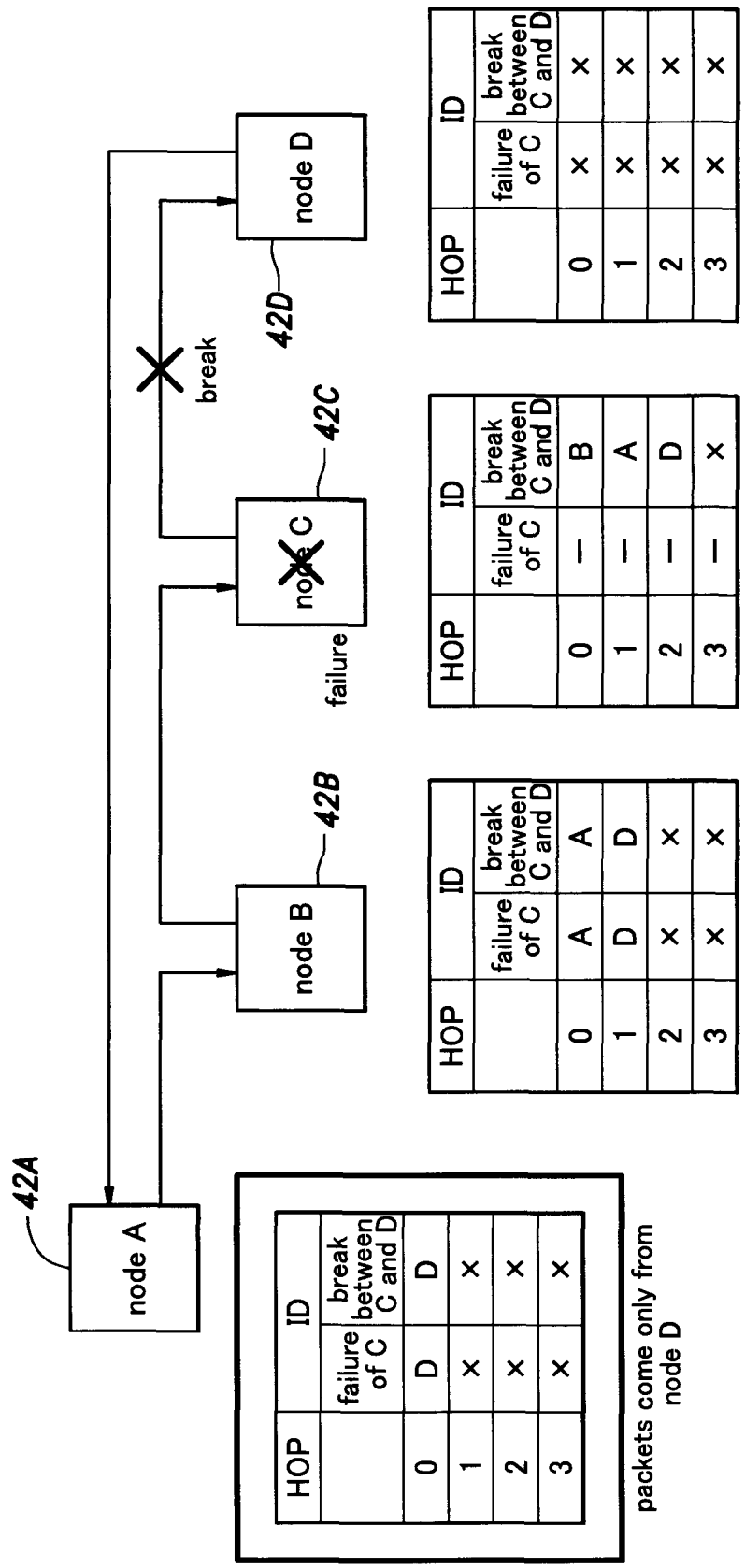
FIG. 13 is an explanatory diagram showing the HOP tables of the first embodiment in a third communication error pattern.

FIG. 13 is an explanatory diagram showing the HOP tables 74 of the first embodiment in a third communication error pattern. As shown in FIG. 13, the third communication error pattern is a failure of the node 42C or a break of the communication line 41 connecting between the node 42C and the node 42D on the downstream side thereof (may be expressed as "break between C and D"). In the third communication error pattern, only information on the input packets Pe having the SID equal to D is written in the HOP table 74 of the node 42A, while information on the other input packets Pe is not written in the same. In the HOP table 74 of the node 42B, information on the input packets Pe having the SID equal to C or B is not written, while information on the input packets Pe having the SID equal to A or D is written. In the HOP table 74 of the node 42C, only information on the input packets Pe having the SID equal to C is not written, while information on the other input packets Pe is written. In the HOP table 74 of the node 42D, information on any input packet Pe is not written.

Figure 14:
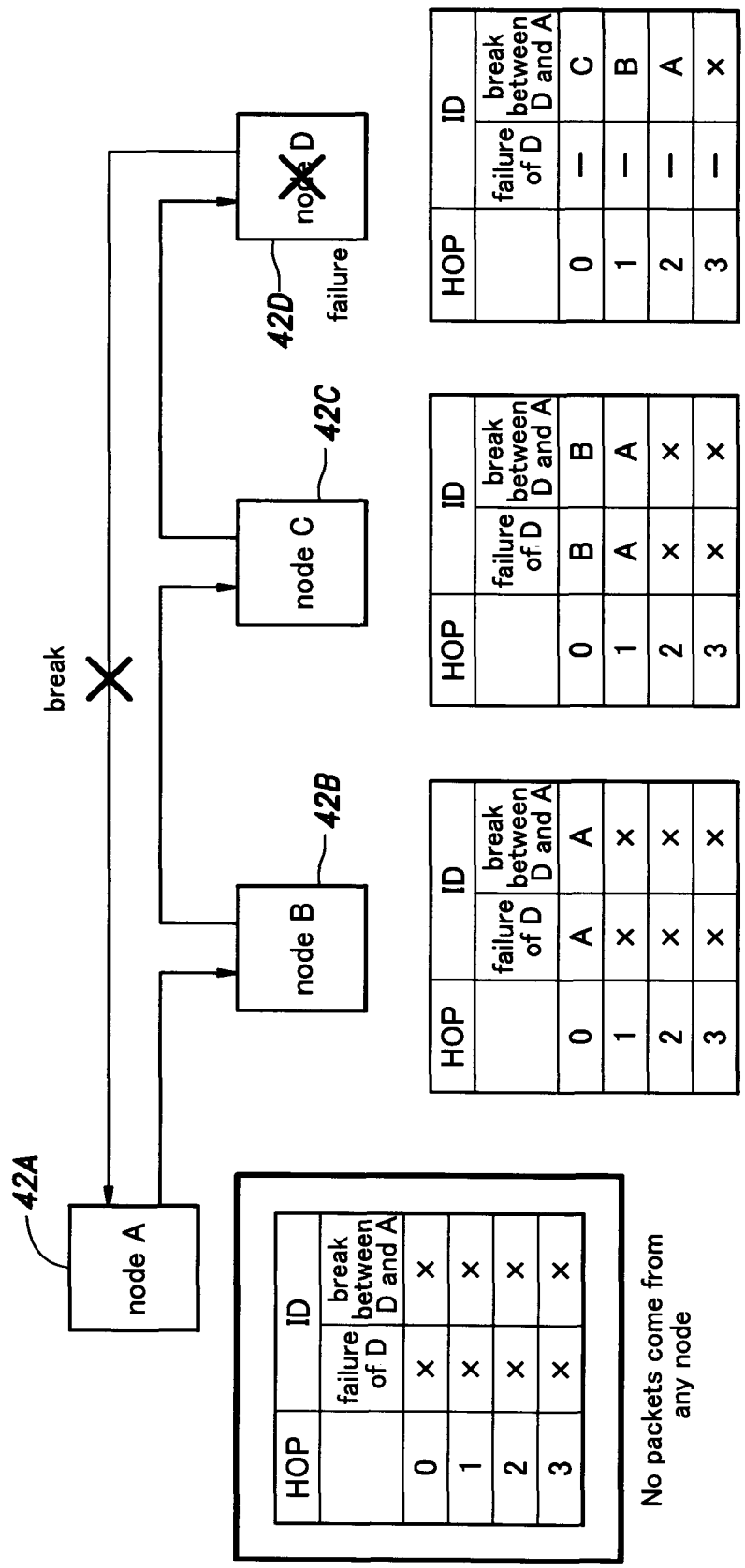
FIG. 14 is an explanatory diagram showing the HOP tables of the first embodiment in a fourth communication error pattern.

FIG. 14 is an explanatory diagram showing the HOP tables 74 of the first embodiment in a fourth communication error pattern. As shown in FIG. 14, the fourth communication error pattern is a failure of the node 42D or a break of the communication line 41 connecting between the node 42D and the node 42A on the downstream side thereof (may be expressed as "break between D and A"). In the fourth communication error pattern, information on any input packet Pe is not written in the HOP table 74 of the node 42A. In the HOP table 74 of the node 42B, only information on the input packet Pe having the SID equal to A is written, while information on the other input packets Pe is not written. In the HOP table 74 of the node 42C, information on the input packets Pe having the SID equal to D or C is not written, while information on the input packets Pe having the SID equal to B or A is written. In the HOP table 74 of the node 42D, only information on the input packets Pe having the SID equal to D is not written, while information on the other input packets Pe is written.

FIG. 15 is a table summarily showing the patterns of information in the HOP table 74 of the node 42A (node A) in the foregoing four communication error patterns. As shown in FIG. 15, in the first embodiment, the pattern of information written in the HOP table 74 of the node 42A varies for different communication error patterns. Therefore, the controller 49 can detect an occurrence of a communication error and determine which of the four communication error patterns has occurred (and thereby identify the location where the communication error has occurred) by reading out the HOP table 74 stored in the communication state storage unit 56 and determining, based on the pattern of information written in the HOP table 74 (more specifically, by referring to the source node IDs (SIDs) written in the HOP table 74), whether packet transmission according to the predetermined repeating pattern is being performed. It is to be noted that in the first embodiment, though it is possible to narrow down a region where the failure has occurred to a certain extent, it is not possible to distinguish between the failure of node 42B and the break of the communication line 41 connecting the node 42B to the node 42C in the second communication error pattern, to distinguish between the failure of node 42C and the break of the communication line 41 connecting the node 42C to the node 42D in the third communication error pattern, and to distinguish between the failure of node 42D and the break of the communication line 41 connecting the node 42D to the node 42A in the fourth communication error pattern. Also, it will be appreciated to a person skilled in the art that a table similar to that shown in FIG. 15 can be obtained for each of the HOP tables 74 of the other nodes 42B-42D, and the controller 49 of each node 42B-42D can detect an occurrence of a communication error and identify the location where the communication error has occurred in a similar manner.

Next, with reference to FIGS. 16 to 27, description will be made of a second embodiment of the ring network 40 shown in FIG. 3.

Figure 16:
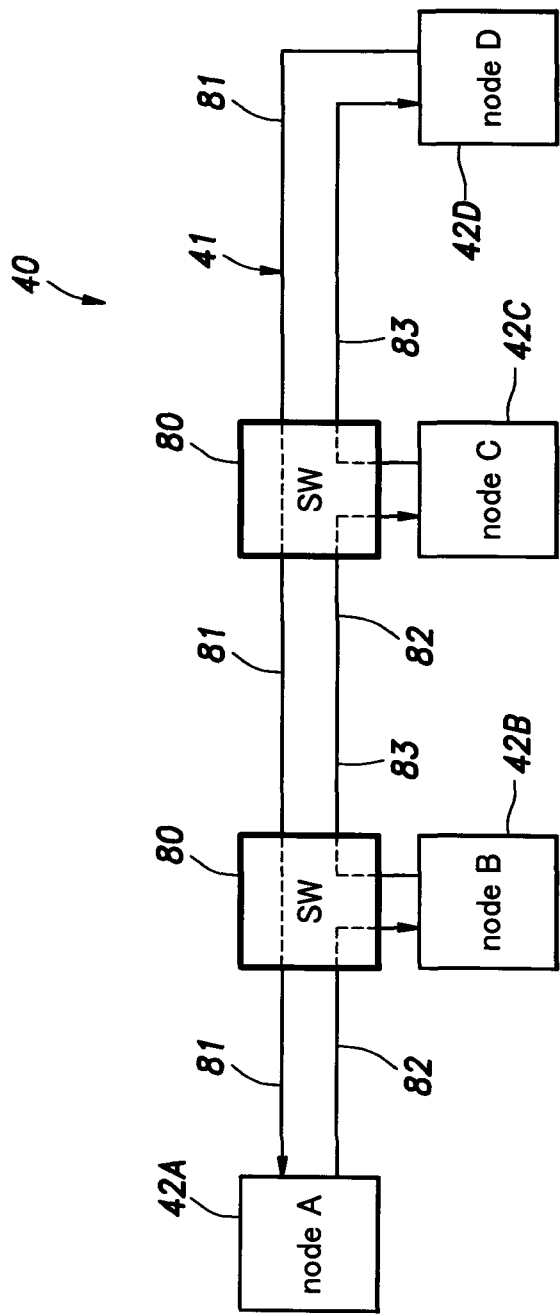
FIG. 16 is a schematic configuration diagram of a second embodiment of the ring network shown in FIG. 3.

FIG. 16 is a schematic configuration diagram of the second embodiment of the ring network 40. As shown in FIG. 16, four nodes 42 (nodes 41A-41D) are provided on the communication lines 41, and the communication lines 41 are divided into an upstream part and a downstream part such that the upstream part starts from the node 42A (node A) acting as the host node (the upstream part extending from the node 42A to the node 42D and the downstream part extending from the node 42D to the node 42A), and the upstream part and the downstream part are routed next to each other. Further, two switches 80 (represented as "SW" in the drawings) are provided on the communication lines 41 such that each switch 80 straddles the upstream part and the downstream part of the communication lines 41. In the following, explanation will be made concretely.

The node 42A acting as the host node is provided at an upstream end of the upstream part (or a downstream end of the downstream part) of the communication lines 41, and the node 42D is provided at a downstream end of the upstream part (or an upstream end of the downstream part) of the communication lines 41 (at the furthest position from the node 42A or at a return point where the downstream end of the upstream part of the communication lines 41 and the upstream end of the downstream part of the communication lines 41 meet). The nodes 42B and 42C are provided downstream of the node 42A and upstream of the node 42D (or between an output port (transmission port) of the node 42A and an input port (reception port) of the node 42D), and the node 42B and the node 42C may be referred to as intermediate nodes 42M. The output port (transmission port) of the node 42D and the input port (reception port) of the node 42A are connected with each other by a first communication line 81. The node 42B and the node 42C are each connected to the immediately upstream node 42 (42A, 42B) by an input-side communication line 82 and to the immediately downstream node 42 (42C, 42D) by an output-side communication line 83. Thus, the output-side communication line 83 for the node 42B and the input-side communication line 82 for the node 42C refer to the same signal communication line. The first communication line 81 is juxtaposed next to the input-side communication lines 82 and the output-side communication lines 83 for the node 42B and the node 42C so as to pass near the input-side communication lines 82 and the output-side communication lines 83 for the node 42B and the node 42C.

One of the switches 80 is provided on the input-side communication line 82 and the output-side communication line 83 for the node 42B and a part of the first communication line 81 passing near the node 42B. The other of the switches 80 is provided on the input-side communication line 82 and the output-side communication line 83 for the node 42C and a part of the first communication line 81 passing near the node 42C. Namely, the switches 80 are provided one for each intermediate node 42M (42B, 42C). It is to be noted that the signal transfer direction in the ring network 40 may be reversed from that shown in FIG. 16. That is, the intermediate nodes 42M (42B, 42C) may be provided on the downstream part of the communication lines 41 in which the downstream part and the upstream part are defined such that the upstream part starts from the node 42A and the upstream part and the downstream part are routed next to each other. In this case also, the switches 80 are provided one for each intermediate node 42M (42B, 42C)

Figure 17:
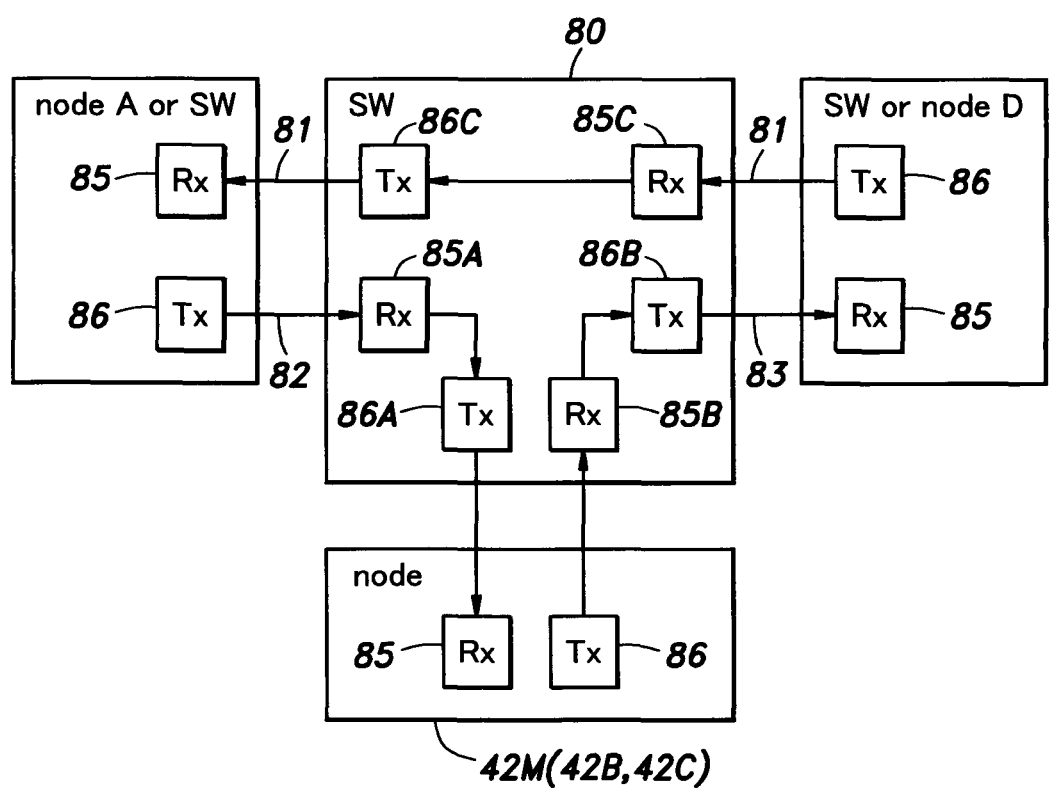
FIG. 17 is a schematic configuration diagram of a switch shown in FIG. 16.

As shown in FIG. 17, each switch 80 is provided with three reception ports 85 (first to third reception ports 85A to 85C) (represented as "Rx" in the drawings) and three transmission ports 86 (first to third transmission ports 86A to 86C) (represented as "Tx" in the drawings). The first reception port 85A is connected with an upstream section of the input-side communication line 82 that is connected to the transmission port 86 (Tx) of the node 42A or the switch 80 located on the upstream side. The first reception port 85A and the first transmission port 86A are connected to each other inside the switch 80. The first transmission port 86A is connected to the reception port 85 (Rx) of the associated intermediate node 42M (node 42B or node 42C) by a downstream section of the input-side communication line 82. The second reception port 85B is connected to the transmission port 86 of the associated intermediate node 42M by an upstream section of the output-side communication line 83. The second reception port 85B and the second transmission port 86B are connected to each other inside the switch 80. The second transmission port 86B is connected with a downstream section of the output-side communication line 83 which in turn is connected to the reception port 85 of the switch 80 or the node 42D on the downstream side. The third reception port 85C is connected with a section of the first communication line 81 that is connected to the transmission port 86 of the switch 80 or the node 42D on the downstream side. The third reception port 85C and the third transmission port 86C are connected to each other inside the switch 80. The third transmission port 86C is connected with a section of the first communication line 81 which intern is connected to the reception port 85 of the node 42A or the switches 80 on the upstream side. Thus, the third reception port 85C and the third transmission port 86C are provided on the first communication line 81 in this order from the upstream side. In the present embodiment, the reception ports 85A to 85C and the transmission ports 86A to 86C serve as regular ports which are switchably connected to one another in the switch 80 and are each connected with one of the communication lines 41.

Each switch 80 is configured to be capable of switching a signal (packet) transfer path therein, or to be capable of switching (or changing) the internal connection between the reception and transmission ports. Specifically, each switch 80 is configured to switch the packet transfer path based on the transfer state, in the input-side communication line 82 and the output-side communication line 83, of the relay packet Pr (ordinary relay packet Prn or interrupt relay packet Pri) to be relayed by the associated intermediate node 42M (node 42B or node 42C) and the transfer state, in the output-side communication line 83 and the input-side communication line 82, of the transmission packet Pt (ordinary transmission packet Ptn or interrupt transmission packet Pti) to be output from the associated intermediate node 42M. The switching performed by each switch 80 will be explained concretely below.

FIGS. 18A to 18C are explanatory diagrams showing three switching states that can be taken by each switch 80. As shown in FIG. 18A, in the first switching state, the switch 80 makes a short circuit between the upstream section of the input-side communication line 82 for the associated intermediate node 42M and the output-side communication line 83 for the same (by internally connecting the first reception port 85A to the second transmission port 86B) while maintaining the connection of the output-side communication line 83. As shown in FIG. 18B, in the second switching state, the switch 80 disconnects the output-side communication line 83 for the associated intermediate node 42M (by cutting the connection between the second reception port 85B and the second transmission port 86B) and makes a short circuit between the upstream section of the input-side communication line 82 and the output-side communication line 83. As shown in FIG. 18C, in the third switching state, the switch 80 makes a short circuit between the upstream section of the output-side communication line 83 for the associated intermediate node 42M and the first communication line 81 (by internally connecting the second reception port 85B to the third transmission port 86C) while maintaining the connection of the first communication line 81. The switch 80 is configured to selectively take one of the three switching states based on the packet transfer state.

Figure 19:
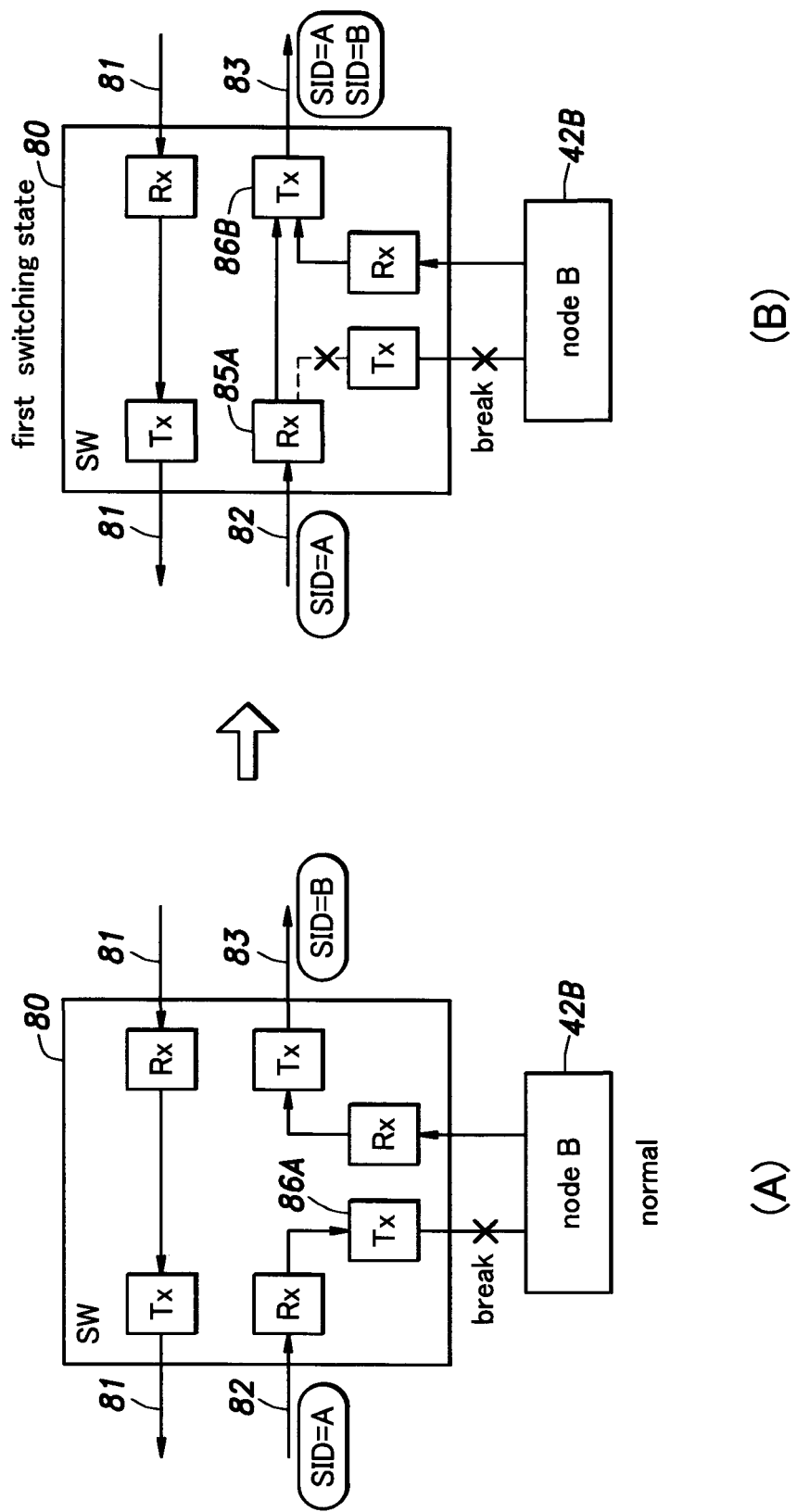
FIG. 19 is an explanatory diagram for explaining a switching condition for switching to the first switching state shown in FIG. 18A.

FIG. 19 is an explanatory diagram for explaining a switching condition (packet transfer pattern) for switching to the first switching state, taking the node 42B as an example of the intermediate nodes 42M. As shown in part (A) of FIG. 19, in a case where the relay packet Pr (e.g., the relay packet Pr having the source node ID (SID) equal to A) transmitted by an upstream-side node 42 according to the predetermined repeating pattern and having passed through the input-side communication line 82 is not transferred to the output-side communication line 83 and where the transmission packet Pt output from the node 42B according to the predetermined repeating pattern and having the SID equal to B is transferred to the output-side communication line 83, the switch 80 determines (or assumes) that the node 42B is normal and that there is a failure in the connection between the first transmission port 86A and the node 42B, and switches to the first switching state shown in part (B) of FIG. 19. Once the switch 80 has switched to the first switching state, the relay packet Pr received by the first reception port 85A is transmitted to the output-side communication line 83 via the second transmission port 86B without passing through the node 42B. Thereby, both the relay packet Pr (such as that having the SID equal to A) and the transmission packet Pt having the SID equal to B are transferred to the output-side communication line 83.

Figure 20:
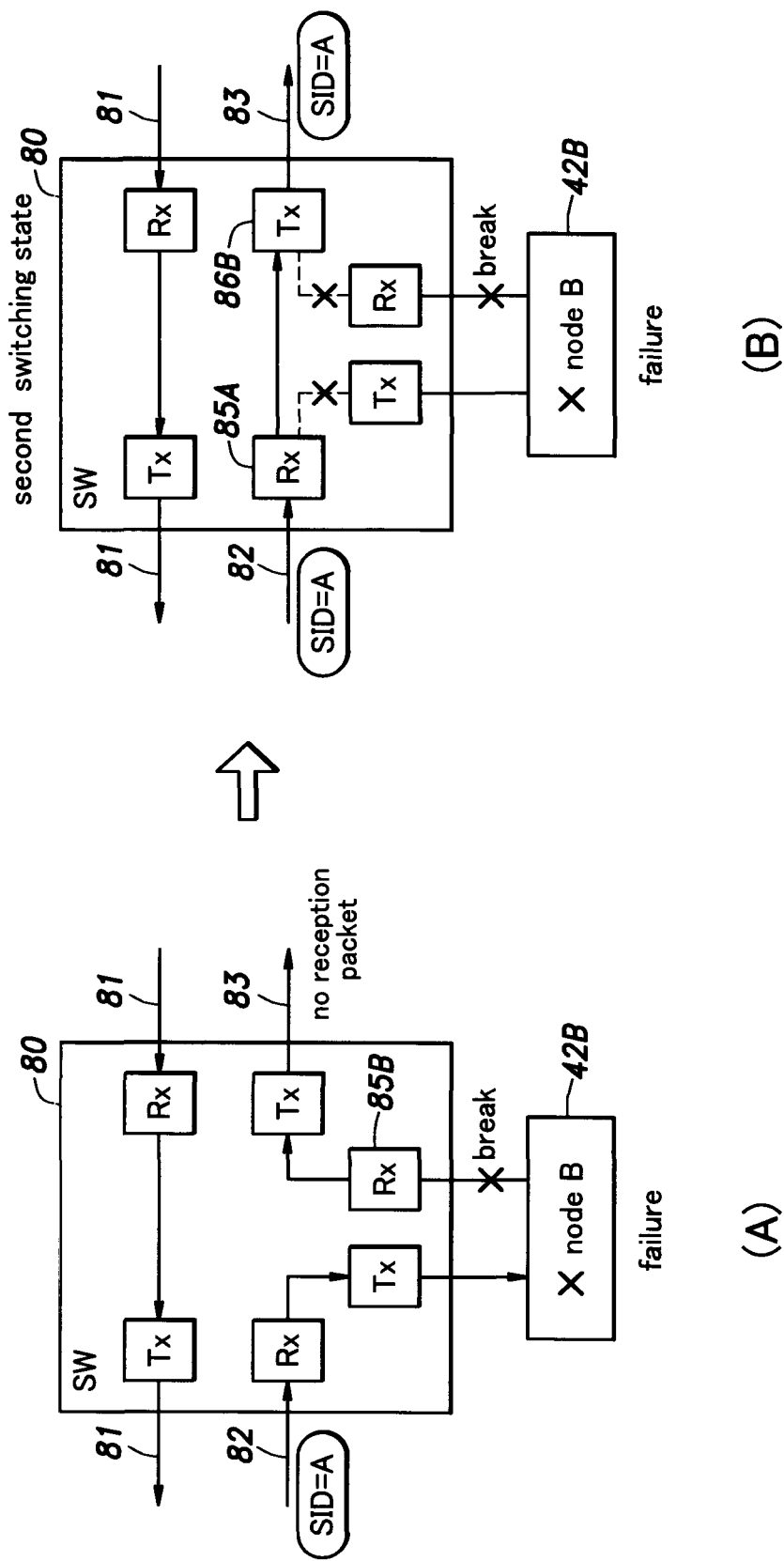
FIG. 20 is an explanatory diagram for explaining a switching condition for switching to the second switching state shown in FIG. 18B.

FIG. 20 is an explanatory diagram for explaining a switching condition (packet transfer pattern) for switching to the second switching state, taking the node 42B as an example of the intermediate nodes 42M. As shown in part (A) of FIG. 20, in a case where the relay packet Pr (e.g., the relay packet Pr having the SID equal to A) transmitted by an upstream-side node 42 according to the predetermined repeating pattern and having passed through the input-side communication line 82 is not transferred to the output-side communication line 83 and where the transmission packet Pt output from the node 42B according to the predetermined repeating pattern and having the SID equal to B is not transferred to the output-side communication line 83, the switch 80 determines (or assumes) that the node 42B is in failure or there is a failure in the connection between the node 42B and the second reception port 85B, and switches to the second switching state shown in part (B) of FIG. 20. Once the switch 80 has switched to the second switching state, the relay packet Pr received by the first reception port 85A is transmitted to the output-side communication line 83 via the second transmission port 86B without passing through the node 42B. Thereby, only the relay packet Pr (such as that having the SID equal to A) is transferred to the output-side communication line 83.

Figure 21:
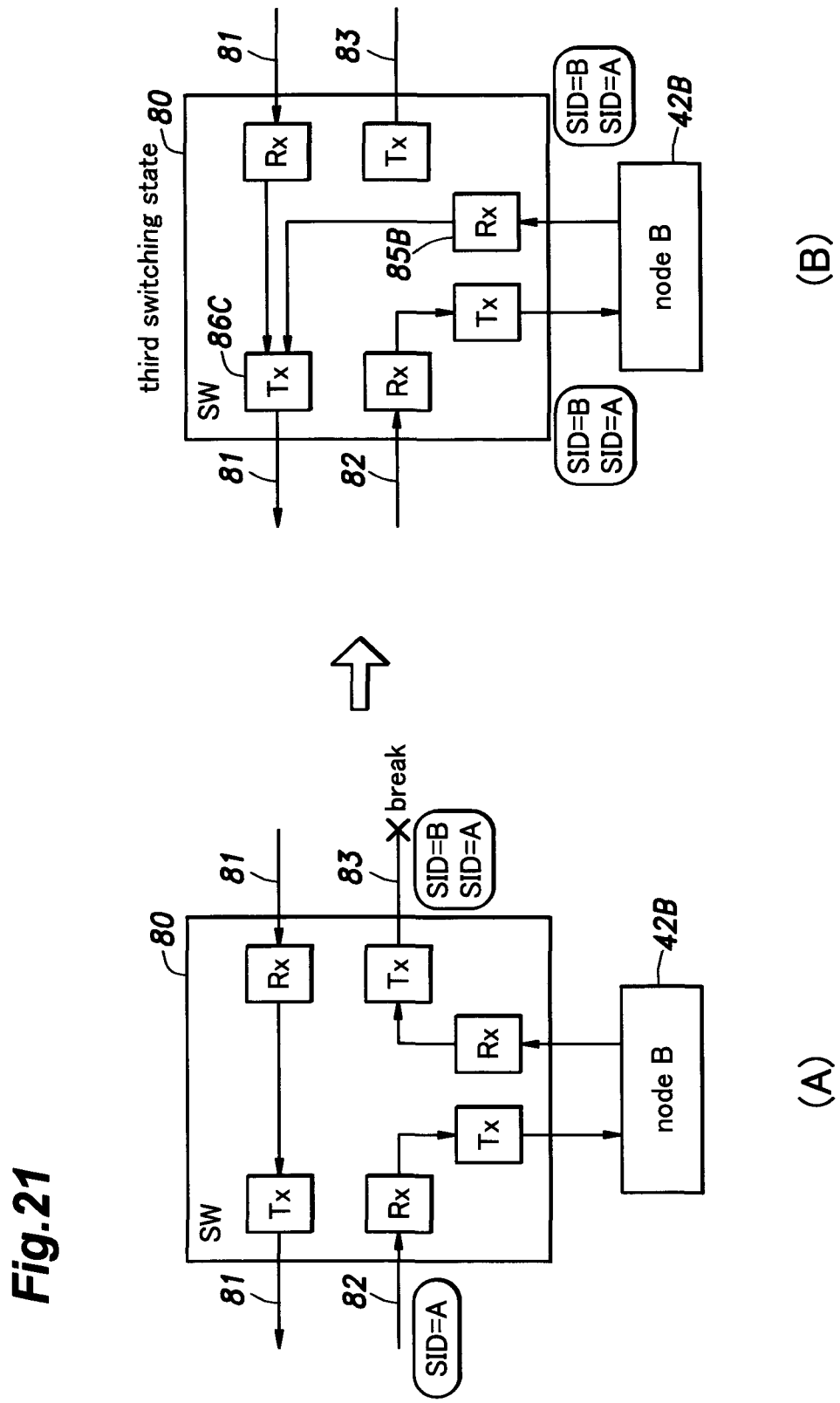
FIG. 21 is an explanatory diagram for explaining a switching condition for switching to the third switching state shown in FIG. 18C.

FIG. 21 is an explanatory diagram for explaining a switching condition (packet transfer pattern) for switching to the third switching state, taking the node 42B as an example of the intermediate nodes 42M. As shown in part (A) of FIG. 21, in a case where the relay packet Pr (e.g., the relay packet Pr having the SID equal to A) transmitted by an upstream-side node 42 according to the predetermined repeating pattern and having passed through the input-side communication line 82 is transferred to the output-side communication line 83 and where the transmission packet Pt output from the node 42B according to the predetermined repeating pattern and having the SID equal to B is transferred to the output-side communication line 83 but is not transferred (or not returned after circulating through the ring network 40) to the input-side communication line 82, the switch 80 determines (or assumes) that there is a communication error in the output-side communication line 83, and switches to the third switching state shown in part (B) of FIG. 21. Once the switch 80 has switched to the third switching state, the relay packet Pr (such as that having the SID equal to A) and the transmission packet Pt having the SID equal to B received by the second reception port 85B are transferred to the first communication line 81 via the third transmission port 86C without passing through the downstream-side nodes 42. Thereby, the transmission packet Pt having the SID equal to B is allowed to be transferred (returned) to the input-side communication line 82. It is to be noted that, instead of determining whether the transmission packet Pt output from the node 42B according to the predetermined repeating pattern is transferred to the output-side communication line 83 but is not transferred (or not returned after circulating through the ring network 40) to the input-side communication line 82, the switch 80 may determine whether the transmission packet Pt is delivered to the first communication line 81 (or to the third reception port 85C). In this way also, the switch 80 can determine that there is a communication error in the output-side communication line 83.

Next, description will be made of a change in the relationship between the number of relays (HOP) and the source node ID (SID) when the switch 80 changes the switching state as described above.

Figure 22:
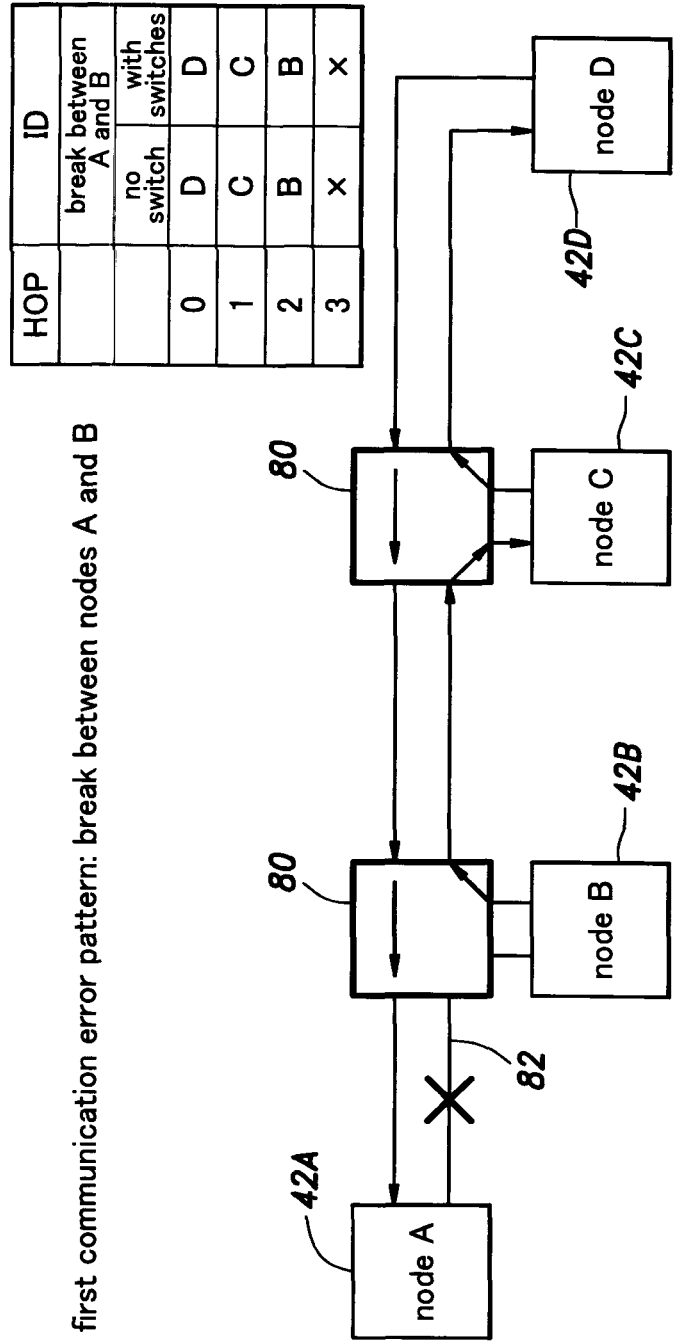
FIG. 22 is an explanatory diagram showing the HOP table of the node 42A of the second embodiment in a first communication error pattern.

FIG. 22 is an explanatory diagram showing the HOP table 74 of the node 42A of the second embodiment in a first communication error pattern. Similarly to the first communication error pattern in the first embodiment shown in FIG. 11, the first communication error pattern in this embodiment also is a break of the communication line 41 connecting between the node 42A acting as the host node and the node 42B on the downstream side thereof (may be expressed as "break between A and B"). In the first communication error pattern, no signal passes through the part of the input-side communication line 82 for the node 42B upstream of the switch 80 associated with the node 42B, and the switch 80 does not perform state switching because the first communication error pattern does not result in any of the packet transfer patterns shown in FIGS. 19 to 21. Consequently, as shown in the table in the upper right of FIG. 22, the pattern of information written in the HOP table 74 of the node 42A of the second embodiment (shown in the column labeled "with switches" in the table) is essentially no different from that in the HOP table 74 of the first embodiment in which no switch 80 is provided as shown in FIG. 11 (the pattern of information written in the HOP table 74 of the first embodiment is shown in the column labeled "no switch" in the table in FIG. 22 for comparison).

Though not shown in the drawing, in a case where there is a failure in the connection between the node 42B (more specifically, the reception port 85 of the node 42B) and the first transmission port 86A of the switch 80 provided in association with the node 42B, and the packet transfer pattern as shown in part (A) of FIG. 19 is caused in the switch 80 by the failure, the switch 80 switches to the first switching state shown in part (B) of FIG. 19, such that the transmission packets Pt having the SID equal to A are allowed to return to the node 42A. In this case, the number of relays (HOP) of each transmission packet Pt having the SID equal to A becomes 2 instead of 3 because it is not relayed by the node 42B.

FIG. 23 is an explanatory diagram showing the HOP table 74 of the node 42A of the second embodiment in a second communication error pattern. Similarly to the second communication error pattern in the first embodiment shown in FIG. 12, the second communication error pattern in this embodiment also is a failure of the node 42B or a break of the communication line 41 connecting between the node 42B and the node 42C on the downstream side thereof (may be expressed as "break between B and C"). When the node 42B is in failure, the packet transfer pattern as shown in part (A) of FIG. 20 is caused in the switch 80 provided in association with the node 42B, and accordingly, as shown in the upper diagram of FIG. 23, the switch 80 switches to the second switching state shown in part (B) of FIG. 20. Thereby, the transmission packets Pt having the SID equal to A are allowed to return to the node 42A. In this case, the number of relays (HOP) of each transmission packet Pt having the SID equal to A becomes 2 instead of 3 because it is not relayed by the node 42B.

When the communication line 41 between the nodes 42B and 42C is broken, the packet transfer pattern as shown in part (A) of FIG. 21 is caused in the switch 80 provided in association with the node 42B, and accordingly, as shown in the lower diagram of FIG. 23, the switch 80 switches to the third switching state shown in part (B) of FIG. 21. On the other hand, the switch 80 provided in association with the node 42C は does not perform state switching. As a result, the transmission packets Pt having the SID equal to A and the relay packets Pr having the SID equal to B are transferred to the node 42A via the first communication line 81 without being relayed by the node 42C and the node 42D. In this case, the number of relays (HOP) of each relay packet Pr having the SID equal to B becomes 0, and the number of relays (HOP) of each transmission packet Pt having the SID equal to A becomes 1.

Though not shown in the drawing, in a case where there is a failure in the connection between the node 42C (more specifically, the reception port 85 of the node 42C) and the first transmission port 86A of the switch 80 provided in association with the node 42C, and the packet transfer pattern as shown in part (A) of FIG. 19 is caused in the switch 80 by the failure and accordingly the switch 80 switches to the first switching state, the transmission packets Pt having the SID equal to A and the relay packets Pr having the SID equal to B can be transferred to the node 42A. In this case, the number of relays (HOP) of each relay packet Pr having the SID equal to B becomes 1 instead of 2, and the number of relays (HOP) of each transmission packet Pt having the SID equal to A becomes 2 instead of 3.

Figure 24:
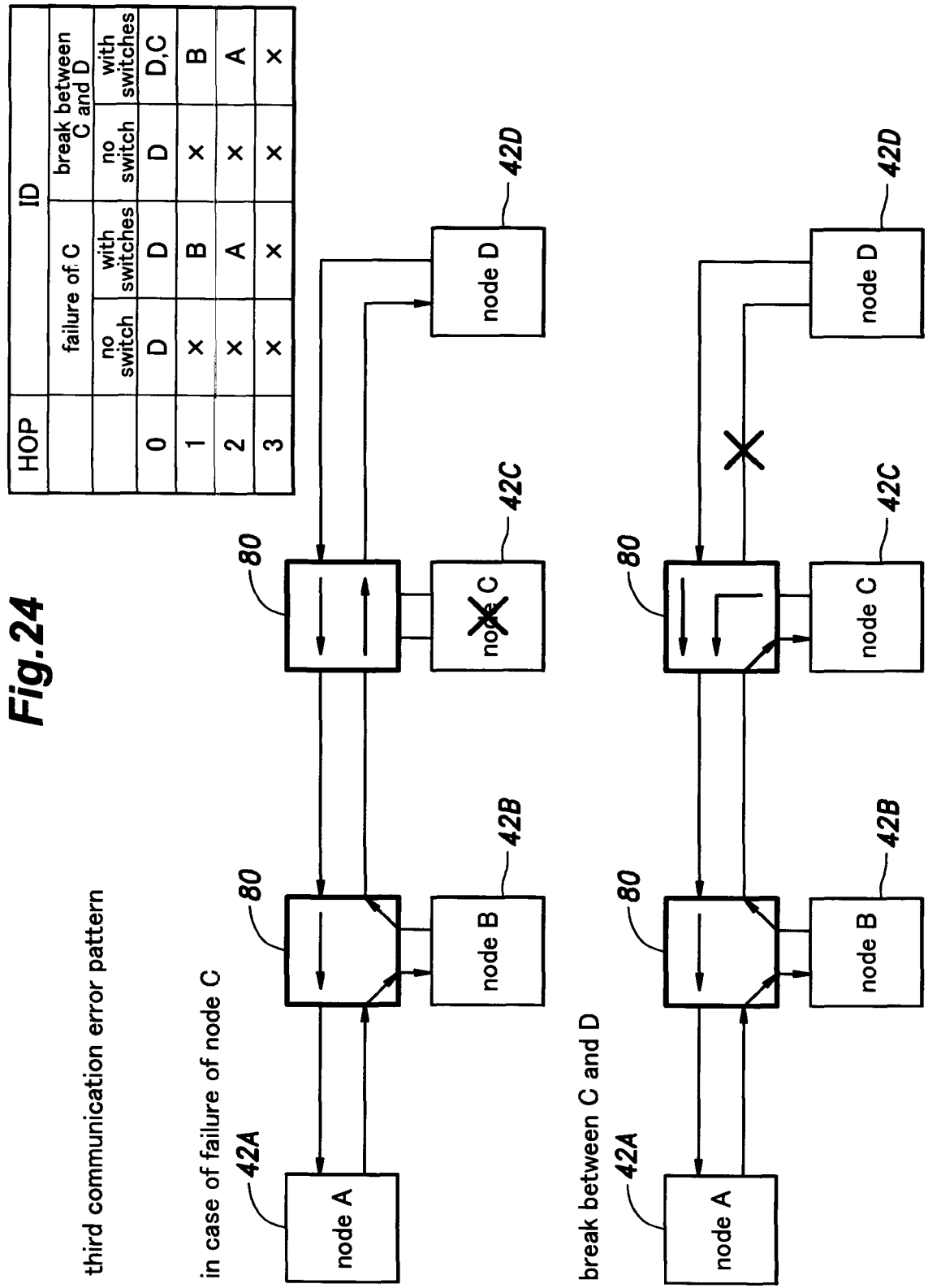
FIG. 24 is an explanatory diagram showing the HOP table of the node 42A of the second embodiment in a third communication error pattern.

FIG. 24 is an explanatory diagram showing the HOP table 74 of the node 42A of the second embodiment in a third communication error pattern. Similarly to the third communication error pattern in the first embodiment shown in FIG. 13, the third communication error pattern in this embodiment also is a failure of the node 42C or a break of the communication line 41 connecting between the node 42C and the node 42D on the downstream side thereof (may be expressed as "break between C and D"). When the node 42C is in failure, the packet transfer pattern as shown in part (A) of FIG. 20 is caused in the switch 80 provided in association with the node 42C, and accordingly, as shown in the upper diagram of FIG. 24, the switch 80 switches to the second switching state. Thereby, the transmission packets Pt having the SID equal to A and the relay packets Pr having the SID equal to B are transferred to the node 42A. In this case, the number of relays (HOP) of each relay packet Pr having the SID equal to B becomes 1, and the number of relays (HOP) of each transmission packet Pt having the SID equal to A becomes 2.

When the communication line 41 between the nodes 42C and 42D is broken, the packet transfer pattern as shown in part (A) of FIG. 21 is caused in the switch 80 provided in association with the node 42C, and accordingly, as shown in the lower diagram of FIG. 24, the switch 80 switches to the third switching state. Thereby, the transmission packets Pt having the SID equal to A and the relay packets Pr having the SID equal to B or C are transferred to the node 42A via the first communication line 81 without being relayed by the node 42D. In this case, the number of relays (HOP) of each relay packet Pr having the SID equal to C becomes 0, the number of relays (HOP) of each relay packet Pr having the SID equal to B becomes 1, and the number of relays (HOP) of each transmission packet Pt having the SID equal to A becomes 2.

FIG. 25 is an explanatory diagram showing the HOP table 74 of the node 42A of the second embodiment in a fourth communication error pattern. Similarly to the fourth communication error pattern in the first embodiment shown in FIG. 14, the fourth communication error pattern in this embodiment also is a failure of the node 42D or a break of the communication line 41 connecting between the node 42D and the node 42A on the downstream side thereof (may be expressed as "break between D and A"). When the node 42D is in failure, the packet transfer pattern as shown in part (A) of FIG. 21 is caused in the switch 80 provided in association with the node 42C, and accordingly, as shown in the upper diagram of FIG. 25, the switch 80 switches to the third switching state. Thereby, the transmission packets Pt having the SID equal to A and the relay packets Pr having the SID equal to B or C are transferred to the node 42A. In this case, however, the number of relays (HOP) of each relay packet Pr having the SID equal to C becomes 0, the number of relays (HOP) of each relay packet Pr having the SID equal to B becomes 1, and the number of relays (HOP) of each transmission packet Pt having the SID equal to A becomes 2.

When the communication line 41 between the nodes 42D and 42A is broken (for instance, between the two switches 80), the packet transfer pattern as shown in part (A) of FIG. 21 is caused in the switch 80 provided in association with the node 42B, and accordingly, as shown in the lower diagram of FIG. 25, the switch 80 switches to the third switching state. Thereby, the transmission packets Pt having the SID equal to A and the relay packets Pr having the SID equal to B are transferred to the node 42A via the first communication line 81 without being relayed by the node 42C and the node 42D. In this case, the number of relays (HOP) of each relay packet Pr having the SID equal to B becomes 0, and the number of relays (HOP) of each transmission packet Pt having the SID equal to A becomes 1.

Though not shown in the drawing, in a case where a break of the communication line 41 occurs in a section between the node 42A and the downstream-side switch 80 (more specifically, the third transmission port 86C of the downstream-side switch 80), no packet P is transferred to the node 42A.

FIG. 26 is a table showing the identifiability of the failure location based on the HOP table 74 in the second embodiment of the ring network without the switches 80 (namely, same as the first embodiment), taking the HOP table 74 of the node 42A as an example. As shown in FIG. 26, without the switches 80, it is possible to narrow down a region where the communication error has occurred to a certain extent by referring to the SIDs of the received packets (or determining whether the packet transmission according to the predetermined repeating pattern is performed), but analysis of the relationship between the number of relays (HOP) and the source node ID (SID) of each received packet does not contribute to identifying the specific failure location (e.g., distinguishing between the failure of node 42B and the break of the communication line 41 connecting the node 42B to the node 42C in the second communication error pattern) because the relationship is the same as when there is no failure in the ring network 40.

Figure 27:
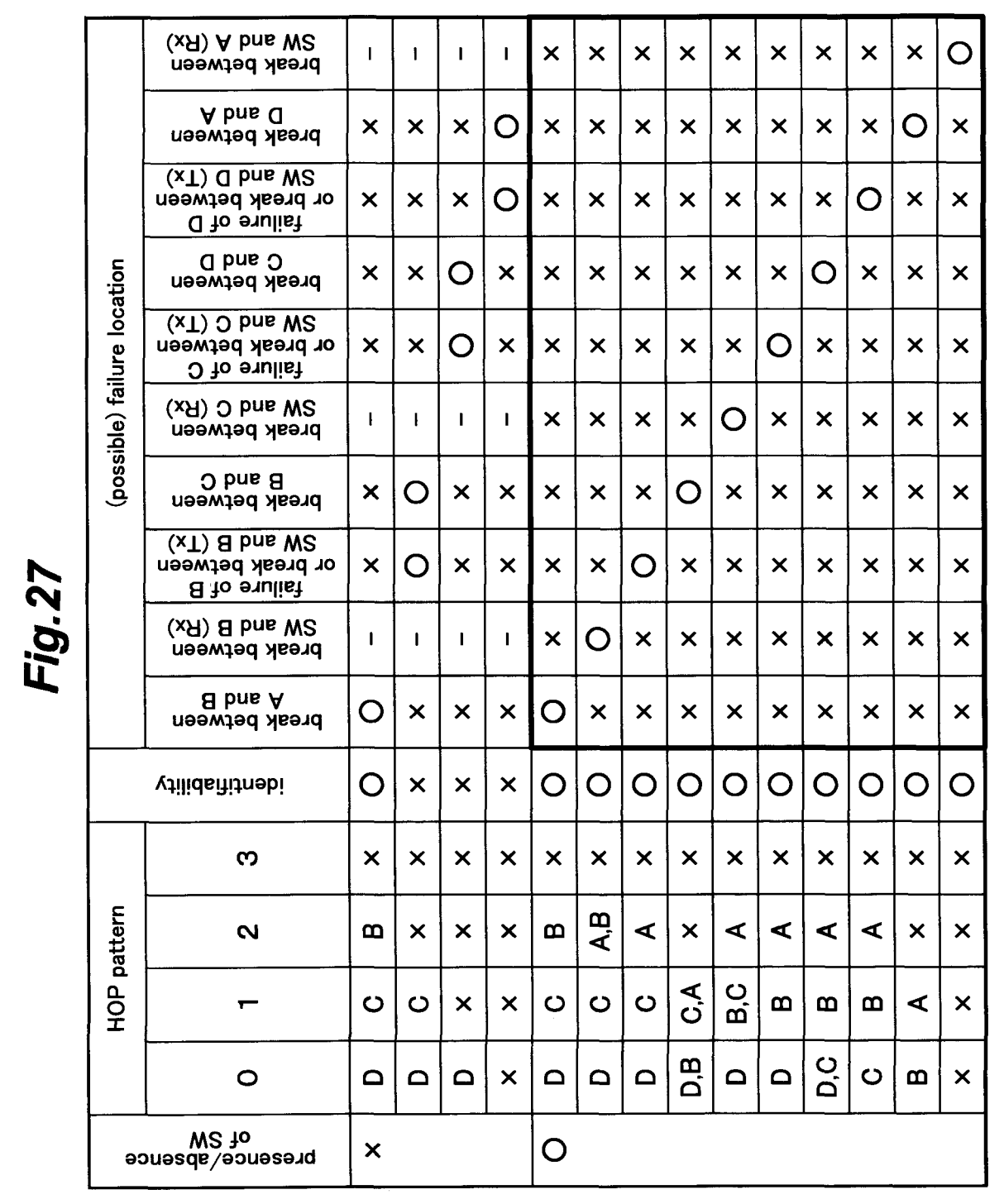

FIG. 27 is a table showing the identifiability of the failure location based on the HOP table 74 in the second embodiment of the ring network with the switches 80 in comparison with the case without the switches, again taking the HOP table 74 of the node 42A as an example. As shown in FIG. 27, in the second embodiment, owing to the provision of the switches 80, the node 42A can identify (or further narrow down) the location of a communication error based on the relationship between the number of relays (HOP) and the source node ID (SID) of the input packets Pe (for example, it is possible to distinguish between the failure of node 42B and the break of the communication line 41 connecting the node 42B to the node 42C). It is to be noted here that similarly to the node 42A, each of the other nodes 42B-42D also can identify the failure location based on the HOP table 74 of its own.

As described above, each switch 80 is configured to switch the packet transfer path based on the packet transfer state on the input-side communication line 82 and the output-side communication line 83 for the associated intermediate node 42M, and therefore, even if a communication error occurs, a situation in that no packet is transferred to the downstream thereof can be avoided. Specifically, by switching to the first switching state shown in part (B) of FIG. 19, each switch 80 can allow the relay packet Pr to be transferred directly to the output-side communication line 83 for the associated intermediate node 42M by bypassing (or without passing through) the intermediate node 42M, while allowing the transmission packet Pt output from the associated intermediate node 42M to be transferred to the output-side communication line 83 without being blocked. Further, by switching to the second switching state shown in part (B) of FIG. 20, the switch 80 can allow the relay packet Pr to be transferred directly to the output-side communication line 83 for the associated intermediate node 42M by bypassing the (without passing through) the intermediate node 42M. Yet further, by switching to the third switching state shown in part (B) of FIG. 21, the switch 80 can allow the transmission packet Pt and the relay packet Pr to be transferred directly to the first communication line 81 by bypassing (without passing through) the associated intermediate node 42M and the nodes 42 downstream thereof.

Referring back to FIG. 9, the controller 49 performs the foregoing determination and analysis to detect a communication error in the ring network 40 and identify the location where the detected communication error has occurred. In the robot 1 shown in FIG. 3, each node 42 is provided with the communication state storage unit 56. The controller 49 of each of the node 42C provided on the thigh 10 and the node 42D provided on the lower leg 11 is configured to servo-lock the associated electric servomotor(s) 35 to lock the associated joint (the knee joint 26 or the ankle joint 27) when it detects a communication error on the upstream side thereof. Each of the node 42A and the node 42B provided on the torso 2 is configured such that when it detects a communication error on the downstream side thereof, it performs fallback control by regarding the links connected by the joint(s) controlled by the node(s) 42 downstream of the location where the communication error has occurred as a rigid unitary body. Therefore, in the robot 1 shown in FIG. 3, if the communication line 41 connecting between the node 42C and the node 42D is broken, the node 42D servo-locks the ankle joint 27, and accordingly, the nodes 42A and 42B perform control regarding the lower leg 11 and the foot 12 as a rigid unitary body, and if the communication line 41 connecting between the node 42B and the node 42C is broken, the node 42C and the node 42D servo-lock the knee joint 26 and the ankle joint 27, respectively, and accordingly, the nodes 42A and 42B perform control regarding the entire leg 5 (the thigh 10, the lower leg 11, and the foot 12) as a rigid unitary body. Thus, in the robot 3 shown in FIG. 3, when a communication error has occurred in the ring network 40, control is performed regarding the links located generally on the free end side of the leg 5 relative to the failure location as a rigid unitary body. Thereby, when a communication error occurs, the robot 1 is allowed to perform fallback control in accordance with the failure location where the communication error has occurred. For example, control to reduce the movement by regarding the links on the free end side of the knee joint 26 as a rigid unitary body or control to make the entirety of the leg 5 function as a rigid stick can be performed.

Next, a modification of the second embodiment will be described with reference to FIG. 28 and FIG. 29.

Figure 28:
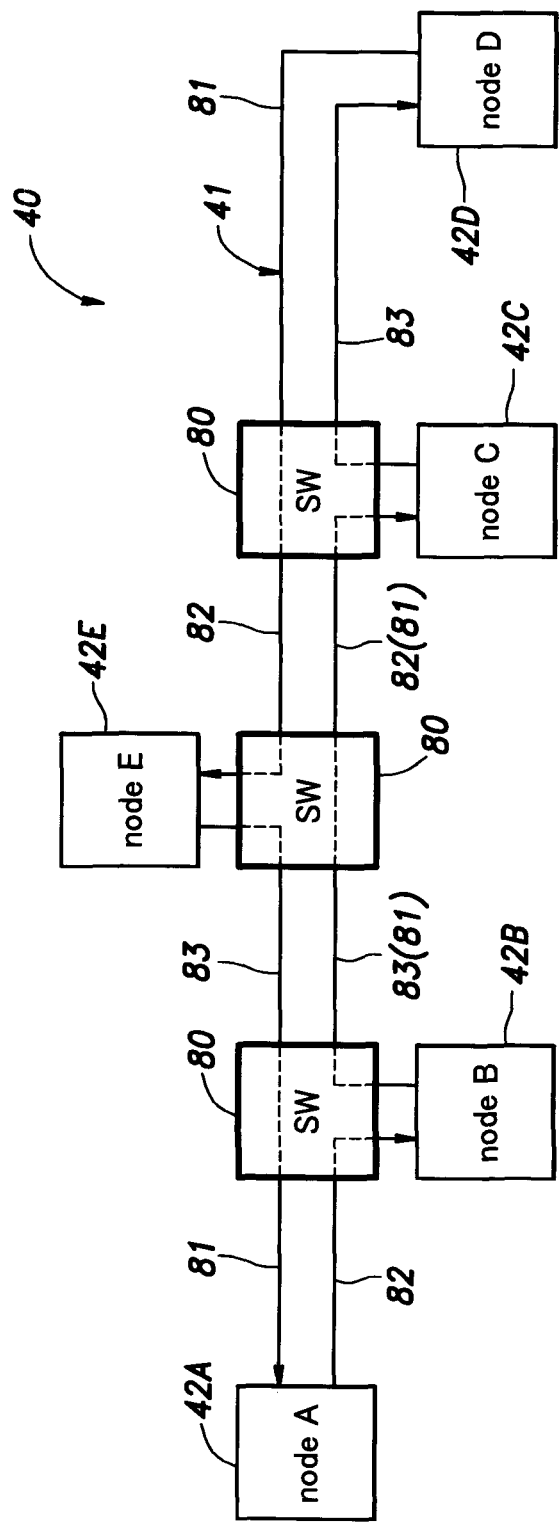
FIG. 28 is a schematic configuration diagram of a ring network according to a modification of the second embodiment.

As shown in FIG. 28, in this modification also, the communication lines 41 are divided into an upstream part and a downstream part where the upstream part starts from the node 42A acting as the host node (the upstream part extending from the node 42A to the node 42D and the downstream part extending from the node 42D to the node 42A), and the upstream part and the downstream part are routed next to each other. In this modification, a node 42E (may also be referred to as a node E) serving as an intermediate node 42M is additionally provided on the downstream part. The node 42E may be physically located on the thigh 10 at a position between the node 42B and the node 42C. The node 42E is connected to the node 42D on the upstream side thereof in the ring network 40 via an input-side communication line 82 and to the node 42A on the downstream side thereof via an output-side communication line 83. The communication line 41 connecting the node 42B and the node 42C to each other (namely, the communication line constituting the output-side communication line 83 for the node 42B or the input-side communication line 82 for the node 42C) is juxtaposed next to the input-side communication line 82 and the output-side communication line 83 for the node 42E so as to pass near the input-side communication line 82 and the output-side communication line 83 for the node 42E.

The modification further includes another switch 80 provided in association with the node 42E. The switch 80 provided in association with the node 42E also has the configuration as shown in FIG. 17 though it is rotated by 180 degrees. It is also to be noted that, for the switch 80 provided in association with the node 42E, the communication line 41 connecting the node 42B and the node 42C to each other serves as the first communication line 81 in FIG. 17, as indicated by the numeral in parentheses in FIG. 28. The switch 80 provided in association with the node 42E is configured to be capable of switching to the first switching state (part (B) of FIG. 19) and the second switching state (part (B) of FIG. 20). In addition, The switch 80 provided in association with the node 42E is configured to be capable of switching to a fourth switching state as shown in part (B) of FIG. 29 instead of the third switching state as shown in part (B) of FIG. 21. In the fourth switching state, the switch 80 makes a short circuit between an upper section of the first communication line 81 connected to the third reception port 85C and the input-side communication line 82 for the associated node 42E, while maintaining the connection of the input-side communication line 82.

Figure 29:
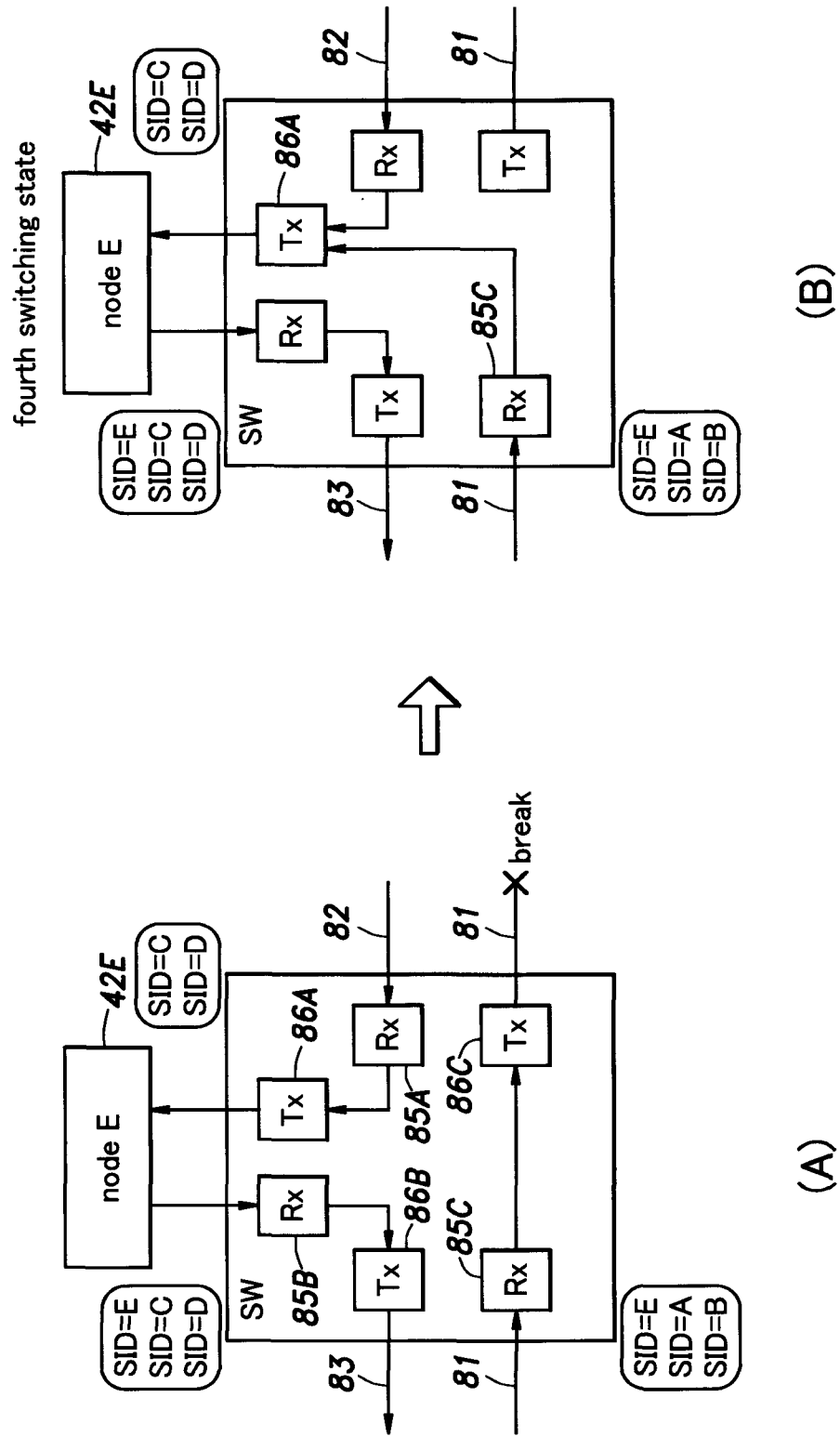
FIG. 29 is an explanatory diagram for explaining a switching condition for a switch associated with a node E (42E) to switch to a fourth switching state in the modification of the second embodiment.

FIG. 29 is an explanatory diagram for explaining a switching condition for the switch 80 associated with the node E (42E) to switch to the fourth switching state in the modification of the second embodiment. As shown in part (A) of FIG. 29, in a case where the relay packets Pr transmitted by the nodes 42C and 42D, which are located more distant from the node 42A than the switch 80 associated with the node 42E, according to the predetermined repeating pattern (namely, the relay packets Pr having the SID equal to C or D) and having passed through the input-side communication line 82 for the node 42E are transferred to the output-side communication line 83 for the node 42E, where the transmission packet Pt transmitted by the node 42E according to the predetermined repeating pattern and having the SID equal to E is transferred to the output-side communication line 83 for the node 42E but is not transferred (or not returned after circulating through the ring network 40) to the input-side communication line 82 for the node 42E, and where the relay packets Pr transmitted by the nodes 42A and 42B according to the predetermined repeating pattern and having the SID equal to A or B are not transferred to the input-side communication line 82 for the node 42E, the switch 80 associated with the node 42E determines that there is a communication error on a section of the first communication line 81 connected to the third transmission port 86C thereof (or on the communication line 41 between the switch 80 associated with the node 42E and the node 42C), and switches to the fourth switching state shown in part (B) of FIG. 29. Once the switch 80 has switched to the fourth switching state, the relay packet Pr having the SID equal to A or B and the transmission packet Pt having the SID equal to E received by the third reception port 85C are transferred to the input-side communication line 82 via the first transmission port 86A without passing through the nodes 42 (the nodes 42C and 42D) located more distant from the node 42A than the switch 80 associated with the node 42E. Thereby, the transmission packet Pt having the SID equal to E is allowed to be transferred (returned) to the input-side communication line 82.

In this modification also, the node 42A can identify the location where a communication error has occurred based on the relationship between the number of relays (HOP) and the source node ID (SID) of the input packets Pe.

Next, with reference to FIGS. 30 to 45, description will be made of a third embodiment of the ring network 40 shown in FIG. 3.

Figure 30:
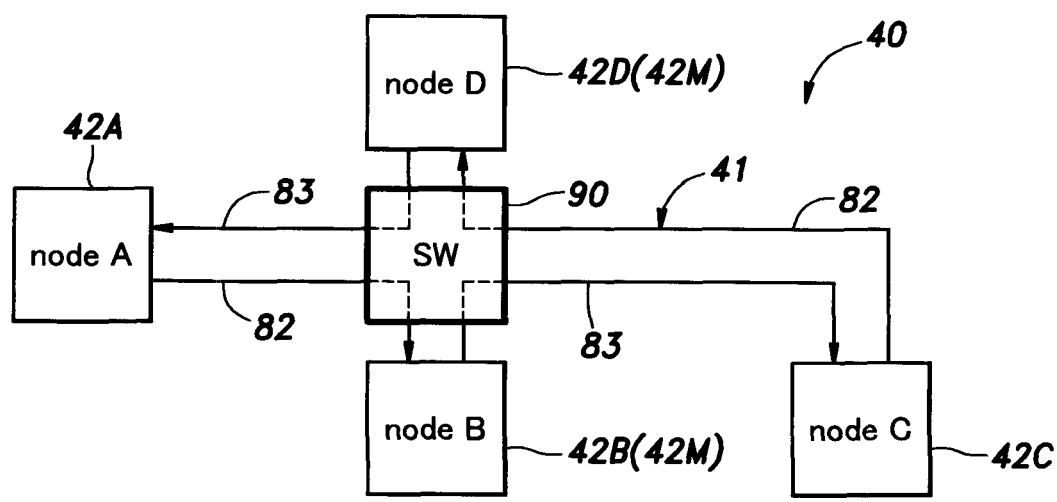
FIG. 30 is a schematic configuration diagram of a third embodiment the ring network shown in FIG. 3.

FIG. 30 is schematic configuration diagram of the third embodiment of the ring network 40. As shown in FIG. 30, four nodes 42 (nodes 41A-41D) are provided on the communication lines 41, and the communication lines 41 are divided into an upstream part and a downstream part where the upstream part starts from the node 42A acting as a host node (the upstream part extending from the node 42A to the node 42C and the downstream part extending from the node 42C to the node 42A), and the upstream part and the downstream part are routed next to each other. Further, a single switch 90 (represented as "SW" in the drawings) is provided to straddle the upstream part and the downstream part of the communication lines 41. In the following, explanation will be made concretely.

The node 42A acting as the host node is provided at an upstream end of the upstream part of the communication lines 41, and the node 42C is provided at a downstream end of the upstream part. Between the node 42A and the node 42D are the node 42B and the node 42D each serving as an intermediate node 42M, such that the node 42B is provided on the upstream part of the communication lines 41 while the node 42D is provided on the downstream part. It is to be noted that in another embodiment, more than two intermediate nodes 42M may be provided, and in such a case, additional switches each having the same structure as the switch 90 may be included in the ring network 40 for the additional intermediate nodes 42M. Each intermediate node 42M is connected to the node 42 (42A, 42C) on the upstream side by an input-side communication line 82, and to the node 42 (42C, 42A) on the downstream side by an output-side communication line 83, via the switch 90. Namely, the switch 90 is provided on the input-side communication line 82 and the output-side communication line 83 for each of the multiple intermediate nodes 42M (the node 42B and the node 42D). The output-side communication line 83 for the node 42B serves as an input-side communication line for the node 42C, and the input-side communication line 82 for the node 42D serves as an output-side communication line for the node 42C. It is to be noted that in a case where more than two intermediate nodes 42M are included in the ring network 40, each of the node 42B and the node 42D may be connected to an adjacent intermediate node 42M instead of the node 42A or the node 42C, via the switches.

Figure 33:
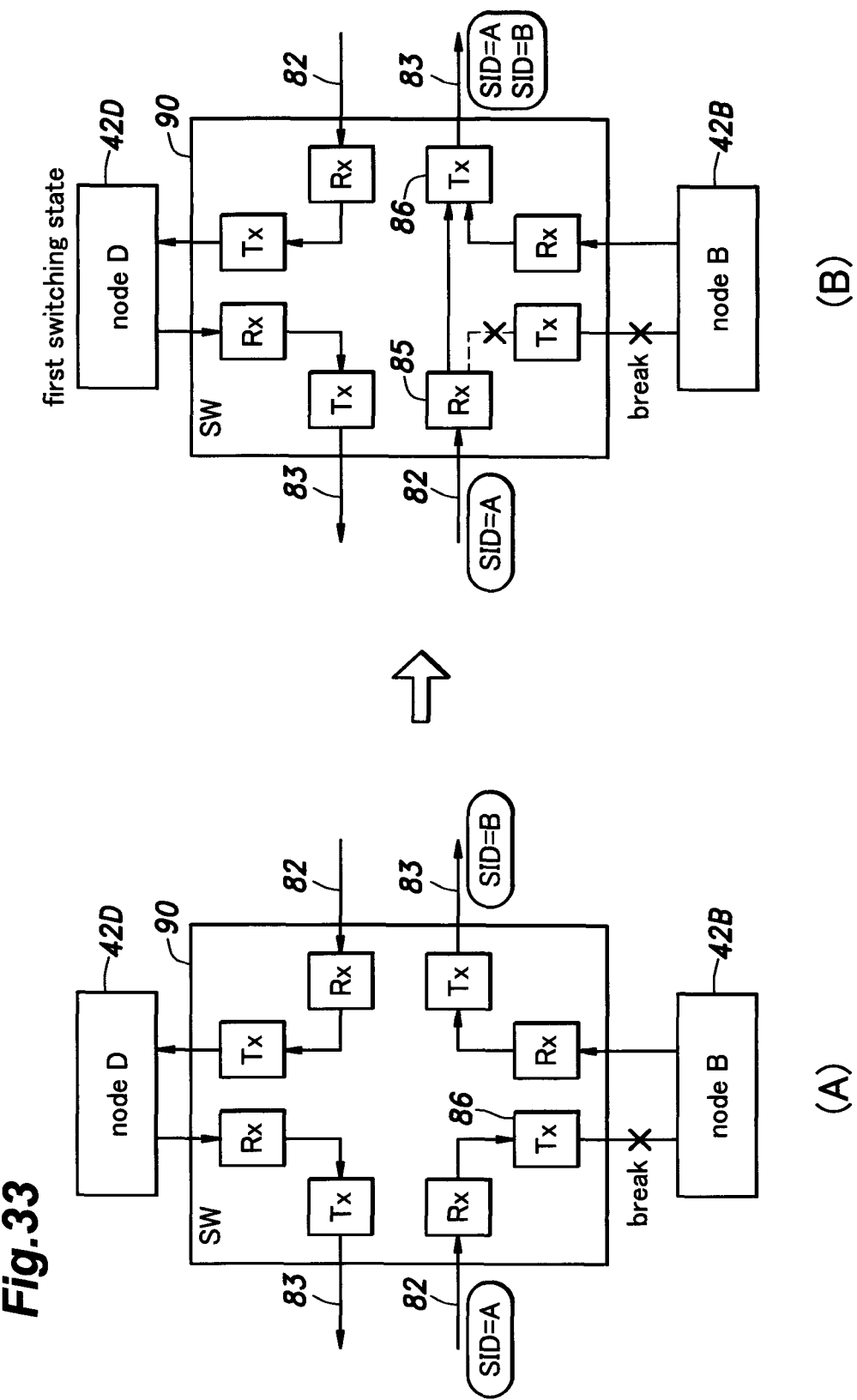
FIG. 33 is an explanatory diagram for explaining a switching condition for the switch shown in FIG. 30 to switch to the first switching state shown in FIG. 31A.

As shown in FIG. 33, the switch 90 is provided with four reception ports 85 (represented as "Rx" in the drawings) and four transmission ports 86 (represented as "Tx" in the drawings). On each of the input-side communication line 82 and the output-side communication line 83 for the node 42B and on each of the input-side communication line 82 and the output-side communication line 83 for the node 42D, a pair of the reception port 85 and the transmission port 86 are provided in this order from the upstream side. The reception port 85 and the transmission port 86 in each pair are connected to each other in the switch 90 in an initial state.

The switch 90 is configured to be capable of switching the packet transfer path therein or to be capable of switching (or changing) the internal connection between the reception and transmission ports. Specifically, the switch 90 is configured to switch the packet transfer path based on the transfer state, in the input-side communication line 82 and the output-side communication line 83, of the relay packet Pr to be relayed by each intermediate node 42M (the node 42B or the node 42D) and the transfer state, in the output-side communication line 83 and the input-side communication line 82, of the transmission packet Pt to be output from the intermediate node 42M. The switching performed by the switch 90 will be explained concretely below.

Figure 31A:
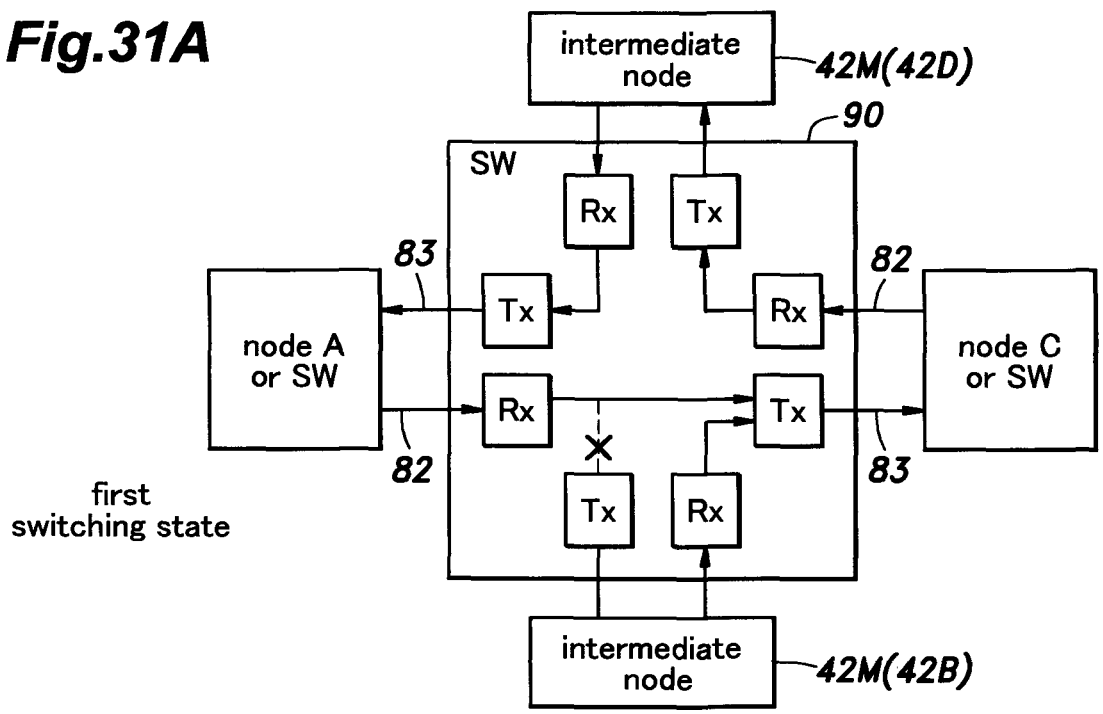
FIGS. 31A and 31B are explanatory diagrams respectively showing first and second switching states that can be taken by the switch shown in FIG. 30.
Figure 31B:
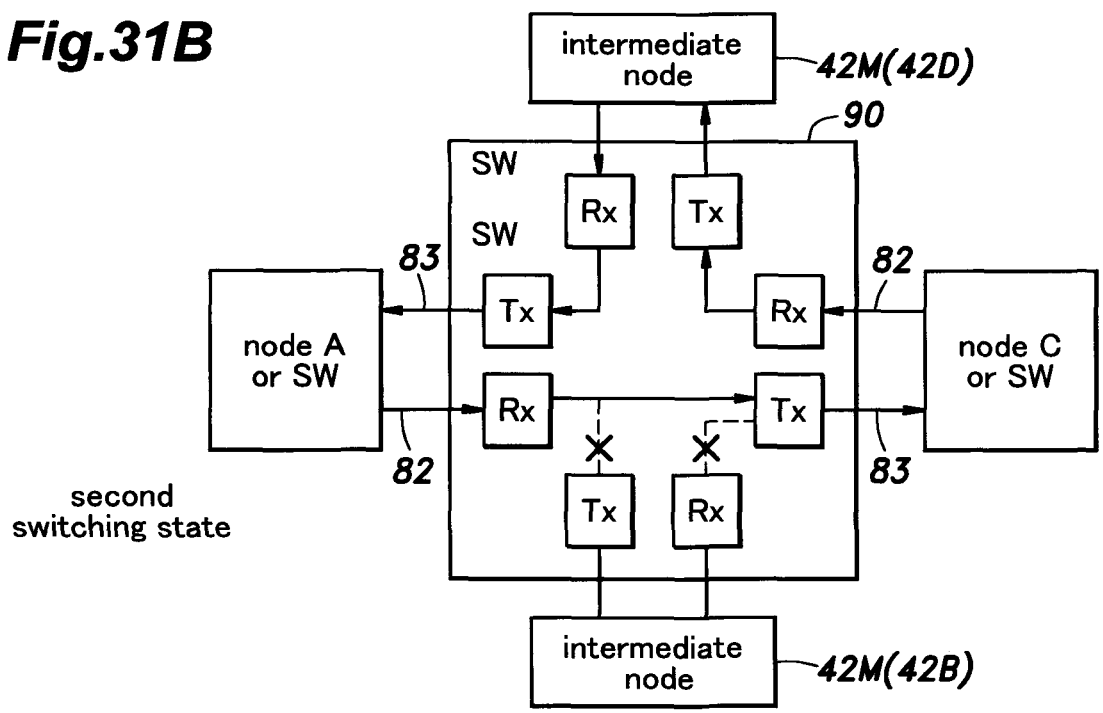
Figure 32A:
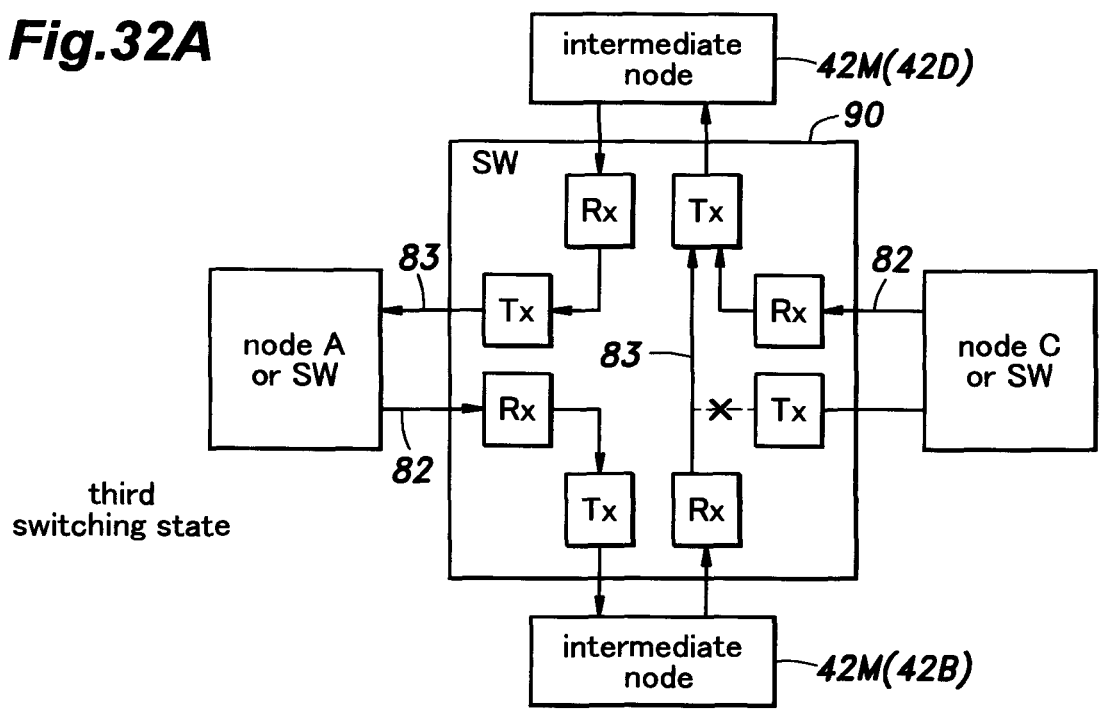
FIGS. 32A and 32B are explanatory diagrams respectively showing third and fourth switching states that can be taken by the switch shown in FIG. 30.
Figure 32B:
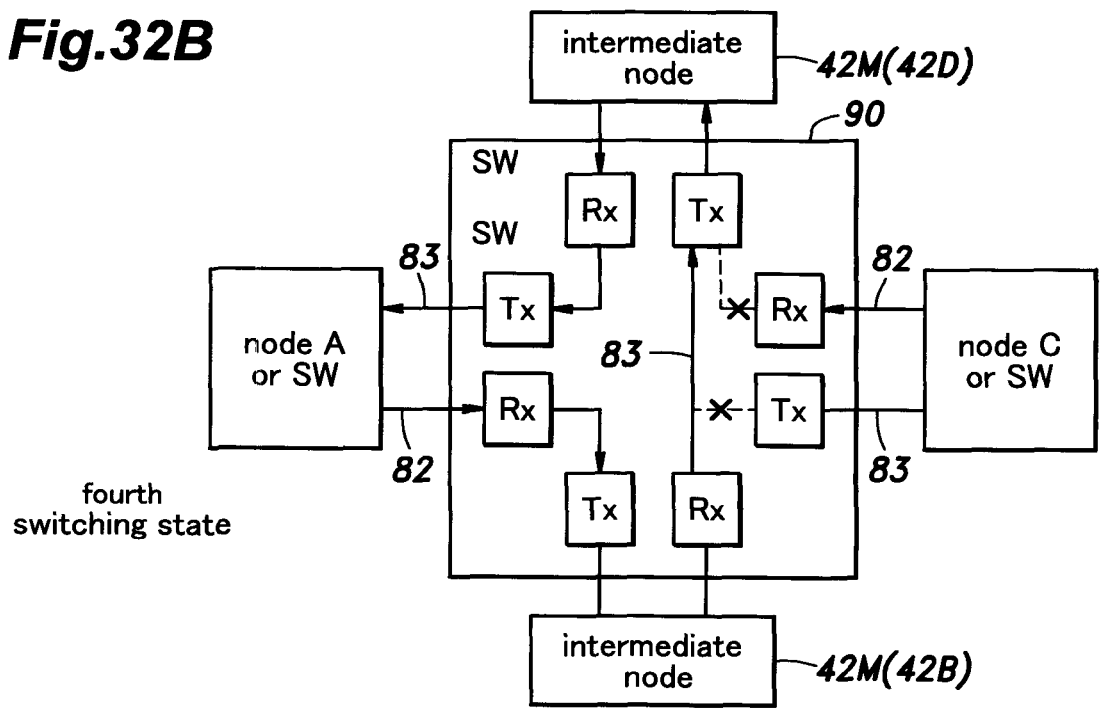

FIGS. 31A, 31B, 32A, and 32B are explanatory diagrams showing first to fourth switching states that can be taken by the switch 90. As shown in FIG. 31A, in the first switching state, the switch 90 makes a short circuit between the upstream section of the input-side communication line 82 for one of the associated intermediate nodes 42M (node 42B in the illustrated example) and the output-side communication line 83 for the same, while maintaining the connection of the output-side communication line 83. As shown in FIG. 31B, in the second switching state, the switch 90 disconnects the output-side communication line 83 for one of the associated intermediate nodes 42M (node 42B in the illustrated example) and makes a short circuit between the upstream section of the input-side communication line 82 and the output-side communication line 83 for this intermediate node 42M. As shown in FIG. 32A, in the third switching state, the switch 90 makes a short circuit between the upstream section of the output-side communication line 83 for one of the associated intermediate nodes 42M (node 42B in the illustrated example) and the input-side communication line 82 for the other of the associated intermediate nodes 42M (node 42D in the illustrated example), while maintaining the connection of the input-side communication line 82 for the other of the associated intermediate nodes 42M. As shown in FIG. 32B, in the fourth switching state, the switch 90 makes a short circuit between the upstream section of the output-side communication line 83 for one of the associated intermediate nodes 42M (node 42B in the illustrated example) and the input-side communication line 82 for the other of the associated intermediate nodes 42M (node 42D in the illustrated example), and disconnects the input-side communication line 82 for the other of the associated intermediate nodes 42M. It is to be noted that in the foregoing, the first to fourth switching states are defined with respect to the node 42B of the pair of intermediate nodes associated with the switch 90, but the first to fourth switching states can be similarly defined with respect to the node 42D (the other of the associated intermediate nodes). The switch 90 is configured to selectively take one of the above switching states based on the packet transfer state.

FIG. 33 is an explanatory diagram for explaining a switching condition for the switch 90 shown in FIG. 30 to switch to the first switching state, taking the node 42B as an example of the intermediate nodes 42M. As shown in part (A) of FIG. 33, in a case where the relay packet Pr (e.g., the relay packet Pr having the source node ID (SID) equal to A) transmitted by an upstream-side node 42 according to the predetermined repeating pattern and having passed through the input-side communication line 82 is not transferred to the output-side communication line 83 and where the transmission packet Pt output from the node 42B according to the predetermined repeating pattern and having the SID equal to B is transferred to the output-side communication line 83, the switch 90 determines that the node 42B is normal and there is a failure in the connection between the node 42B and the transmission port 86 for connection with the node 42B, and switches to the first switching state shown in part (B) of FIG. 33. Once the switch 90 has switched to the first switching state, the relay packet Pr received by the reception port 85 for connection with the upstream node is transmitted to the output-side communication line 83 via the transmission port 86 for connection with the downstream node without passing through the node 42B. Thereby, both the relay packet Pr (such as that having the SID equal to A) and the transmission packet Pt having the SID equal to B are transferred to the output-side communication line 83.

Figure 34:
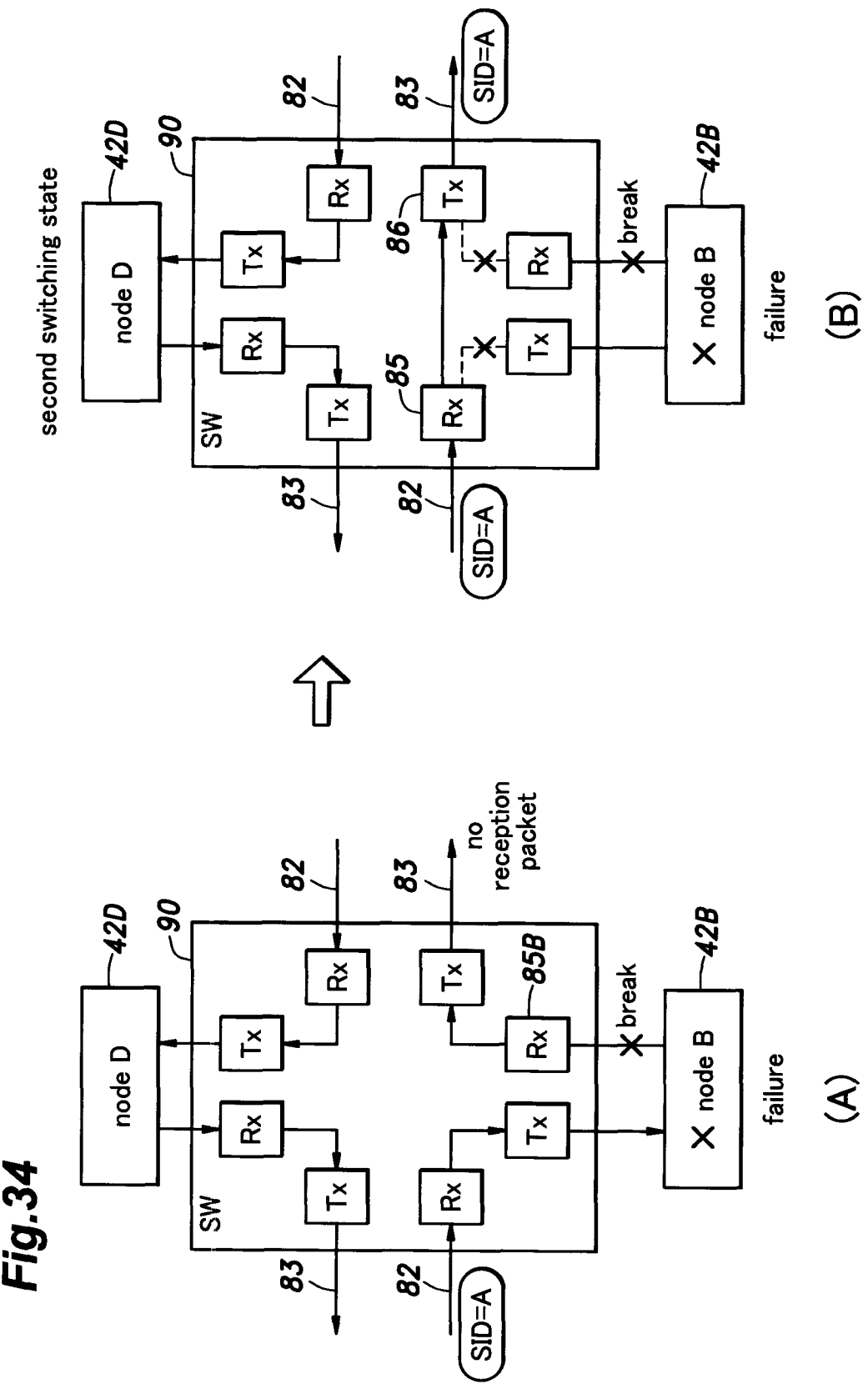
FIG. 34 is an explanatory diagram for explaining a switching condition for the switch shown in FIG. 30 to switch to the second switching state shown in FIG. 31B.

FIG. 34 is an explanatory diagram for explaining a switching condition for the switch 90 shown in FIG. 30 to switch to the second switching state, taking the node 42B as an example of the intermediate nodes 42M. As shown in part (A) of FIG. 34, in a case where the relay packet Pr (e.g., the relay packet Pr having the SID equal to A) transmitted by an upstream-side node 42 according to the predetermined repeating pattern and having passed through the input-side communication line 82 is not transferred to the output-side communication line 83 and where the transmission packet Pt output from the node 42B according to the predetermined repeating pattern and having the SID equal to B is not transferred to the output-side communication line 83, the switch 90 determines that the node 42B is in failure or there is a failure in the node 42B and the reception port 85B for connection with the node 42B, and switches to the second switching state shown in part (B) of FIG. 34. Once the switch 90 has switched to the second switching state, the relay packet Pr received by the reception port 85 for connection with the upstream node is transmitted to the output-side communication line 83 via the transmission port 86B for connection with the downstream node without passing through the node 42B. Thereby, only the relay packet Pr (such as that having the SID equal to A) is transferred to the output-side communication line 83.

Figure 35:
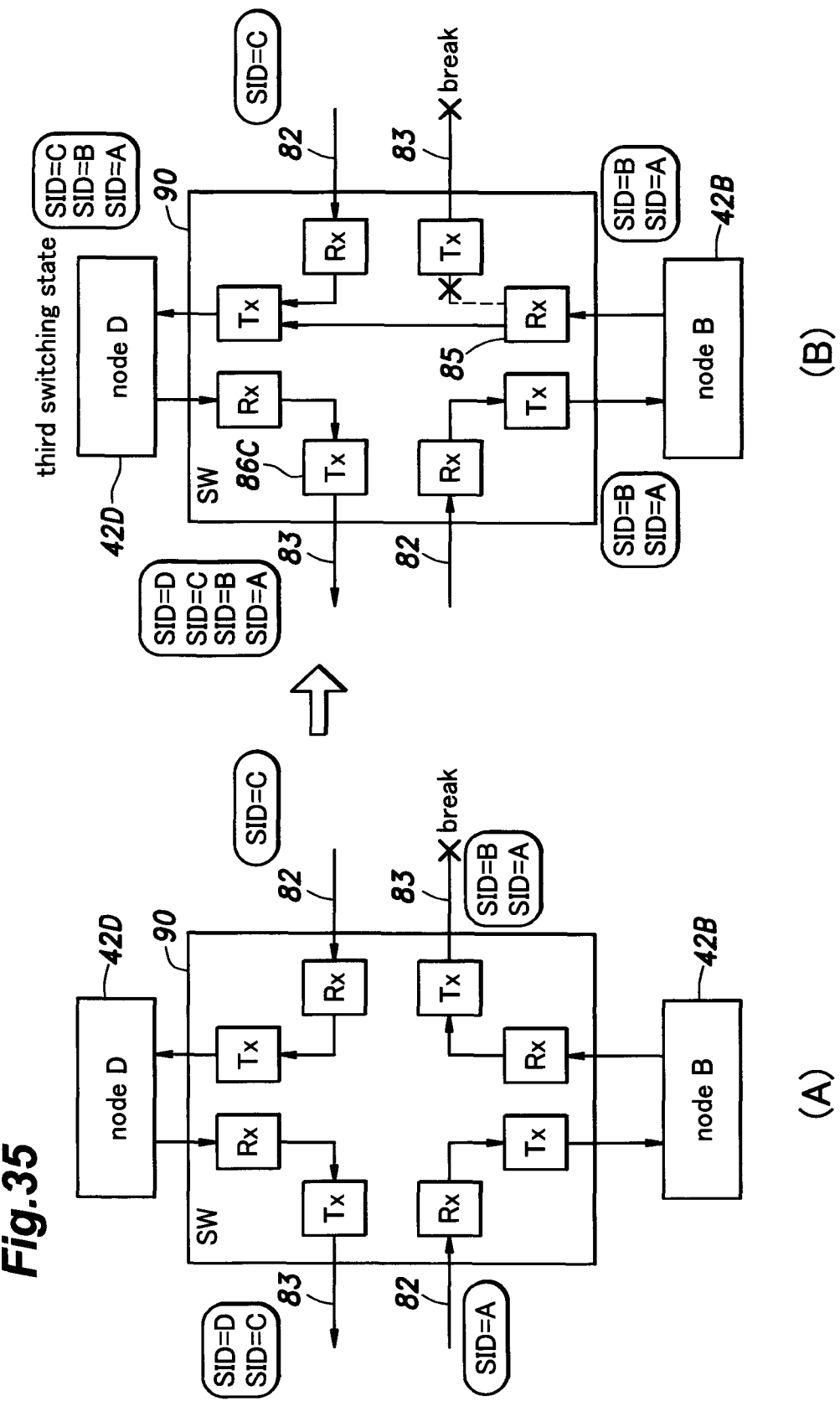
FIG. 35 is an explanatory diagram for explaining a switching condition for the switch shown in FIG. 30 to switch to the third switching state shown in FIG. 32A.

FIG. 35 is an explanatory diagram for explaining a switching condition for the switch 90 shown in FIG. 30 to switch to the third switching state when a failure occurs in the output-side communication line 83 for the node 42B, which is one of the intermediate nodes 42M that is provided on the upstream part of the ring network 40. As shown in part (A) of FIG. 35, in a case where the relay packet Pr (such as the relay packet Pr having the SID equal to A) transmitted by a node 42 upstream of the node 42B according to the predetermined repeating pattern as well as the transmission packet Pt output from the node 42B and having the SID equal to B are transferred to the output-side communication line 83 for the node 42B but are not delivered to the input-side communication line 82 for the node 42D and where the relay packet Pr transmitted by a node 42 downstream of the node 42B and upstream of the node 42D (namely, the node 42C in the ring network shown in FIG. 30) according to the predetermined repeating pattern (such as the relay packet Pr having the SID equal to C) is delivered to the input-side communication line 82 for the node 42D, the switch 90 determines that there is a communication error (failure) in the output-side communication line 83 for the node 42B, and switches to the third switching state shown in part (B) of FIG. 35. Once the switch 90 has switched to the third switching state, the relay packet Pr received by the reception port 85 of the switch 90 for connection with the node 42 upstream of the node 42B and the transmission packet Pt output from the node 42B are transferred to the node 42D without passing through any node 42 between the node 42B and the node 42D (node 42C in the shown example). Thereby, in addition to the relay packet Pr having the SID equal to C, the relay packet Pr having the SID equal to A and the transmission packet Pt having the SID equal to B are allowed to be transferred to the input-side communication line 82 for the node 42D.

Figure 36:
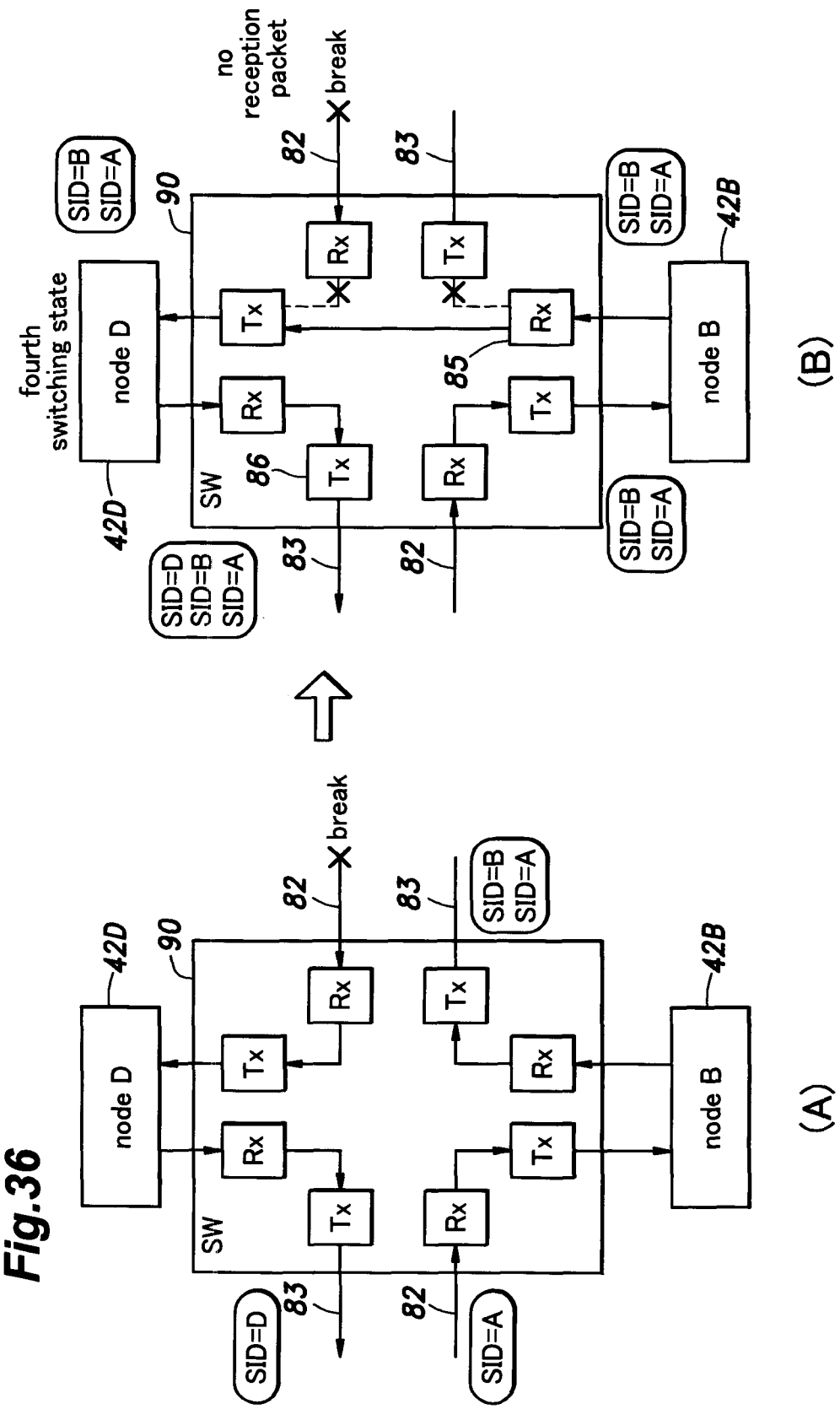
FIG. 36 is an explanatory diagram for explaining a switching condition for the switch shown in FIG. 30 to switch to the fourth switching state shown in FIG. 32B.

FIG. 36 is an explanatory diagram for explaining a switching condition for the switch 90 shown in FIG. 30 to switch to the fourth switching state when a failure occurs in the input-side communication line 82 for the node 42D, which is one of the intermediate nodes 42M that is provided on the downstream part of the ring network 40. As shown in part (A) of FIG. 36, in a case where the relay packet Pr (such as the relay packet Pr having the SID equal to A) transmitted by a node 42 upstream of the node 42B according to the predetermined repeating pattern as well as the transmission packet Pt output from the node 42B and having the SID equal to B are transferred to the output-side communication line 83 for the node 42B but are not delivered to the input-side communication line 82 for the node 42D and where the relay packet Pr transmitted by a node 42 downstream of the node 42B and upstream of the node 42D (namely, the node 42C in the ring network shown in FIG. 30) according to the predetermined repeating pattern (such as the transmission packet Pt having the SID equal to C) is not delivered to the input-side communication line 82 for the node 42D, the switch 90 determines that there is a communication error (failure) in the input-side communication line 82 for the node 42D, and switches to the fourth switching state shown in part (B) of FIG. 36. Once the switch 90 has switched to the fourth switching state, the relay packet Pr received by the reception port 85 of the switch 90 for connection with the node 42 upstream of the node 42B and the transmission packet Pt output from the node 42B are transferred to the node 42D without passing through any node 42 between the node 42B and the node 42D (node 42C in the shown example). Thereby, the relay packet Pr having the SID equal to A and the transmission packet Pt having the SID equal to B are allowed to be transferred to the input-side communication line 82 for the node 42D.

Next, description will be made of a change in the relationship between the number of relays (HOP) and the source node ID (SID) when the switch 90 changes the switching state as described above.

Figure 37:
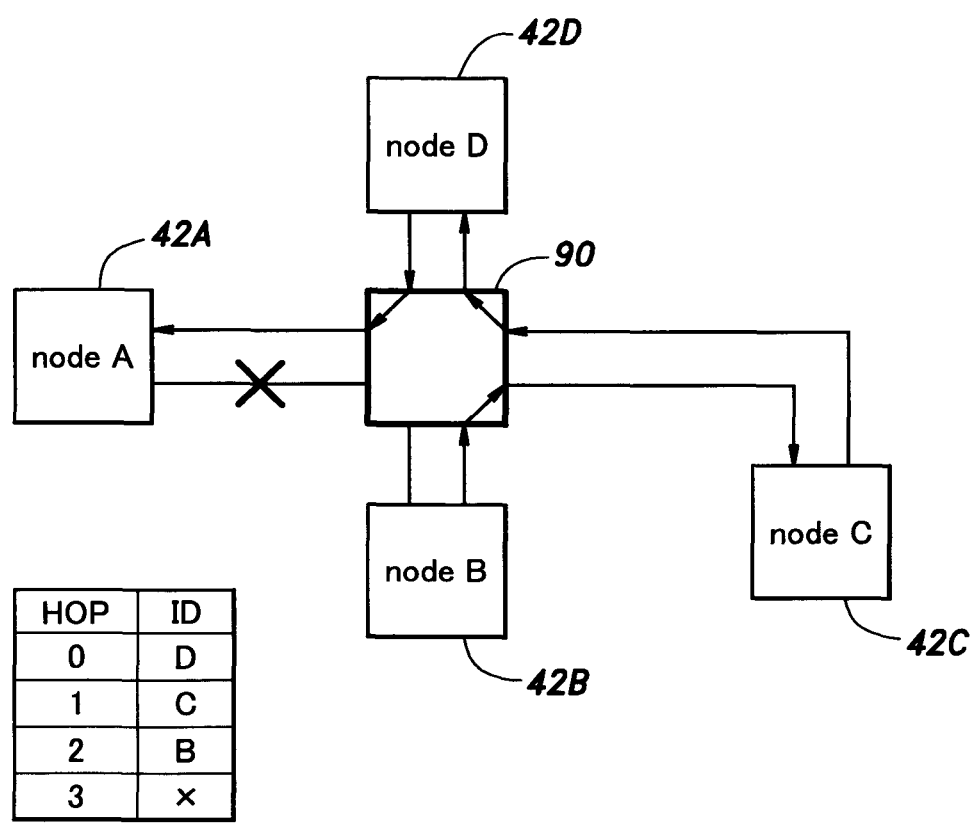
FIG. 37 is an explanatory diagram showing the HOP table of the node 42A of the third embodiment in a first communication error pattern.

FIG. 37 is an explanatory diagram showing the HOP table 74 of the node 42A of the third embodiment in a first communication error pattern. The first communication error pattern in the third embodiment is a break of the communication line 41 connecting between the node 42A acting as the host node and the switch 90 on the downstream side thereof (may be expressed as "break between A and SW").

In the first communication error pattern, no signal passes through the part of the input-side communication line 82 for the node 42B upstream of the switch 90, and the switch 90 does not perform state switching because the first communication error pattern does not result in any of the packet transfer patterns shown in FIGS. 33 to 36. Consequently, the pattern of information written in the HOP table 74 of the node 42A acting as the host node becomes as shown in the table in the lower left of FIG. 37.

Figure 38:
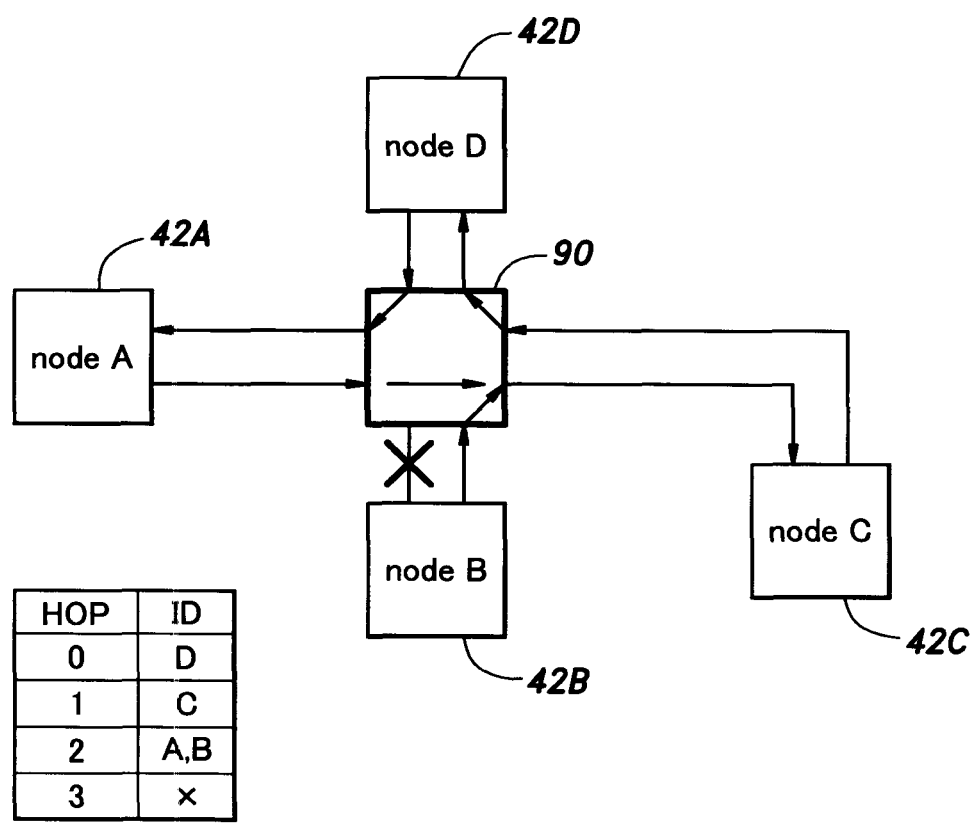
FIG. 38 is an explanatory diagram showing the HOP table of the node 42A of the third embodiment in a second communication error pattern.

FIG. 38 is an explanatory diagram showing the HOP table 74 of the node 42A of the third embodiment in a second communication error pattern. The second communication error pattern in the third embodiment is a break of the communication line 41 connecting between the switch 90 and the node 42B (may be expressed as "break between SW and B"). In the second communication error pattern, the packet transfer pattern shown in part (A) of FIG. 33 is caused in the switch 90, and accordingly, the switch 90 switches to the first switching state shown in part (B) of FIG. 33. Thereby, the transmission packets Pt having the SID equal to A are allowed to return to the node 42A. In this case, the number of relays (HOP) of each transmission packet Pt having the SID equal to A becomes 2 instead of 3 because it is not relayed by the node 42B.

Figure 39:
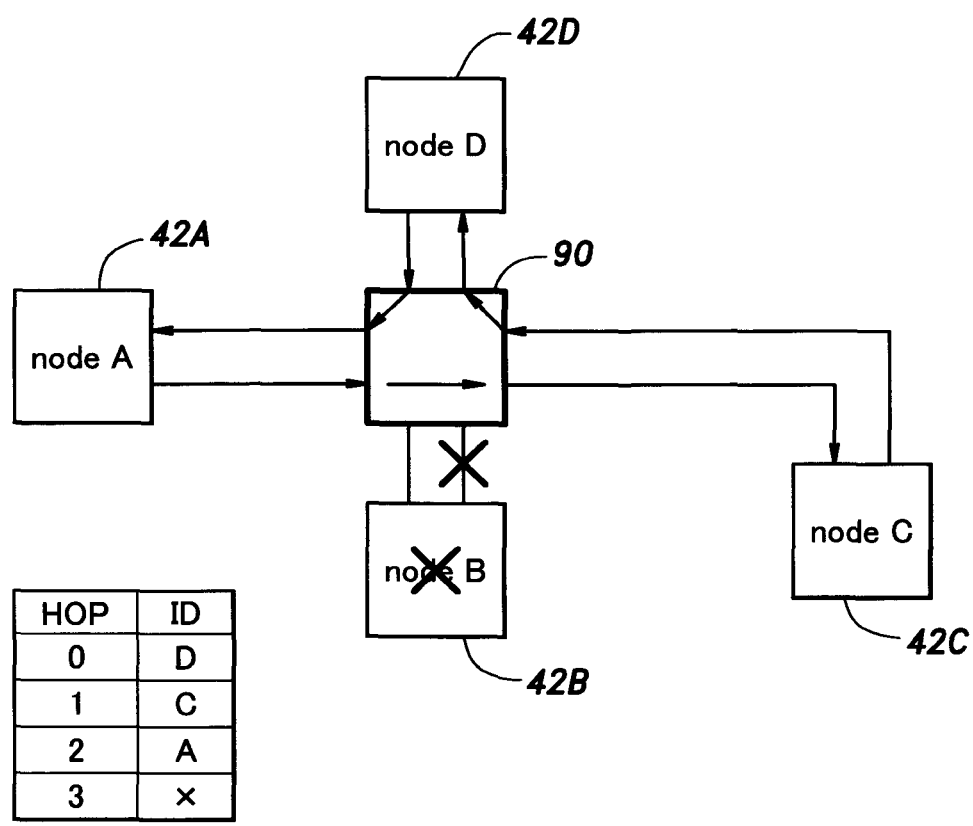
FIG. 39 is an explanatory diagram showing the HOP table of the node 42A of the third embodiment in a third communication error pattern.

FIG. 39 is an explanatory diagram showing the HOP table 74 of the node 42A of the third embodiment in a third communication error pattern. The third communication error pattern in the third embodiment is a failure of the node 42B or a break of the communication line 41 connecting between the node 42B and the switch 90 (may be expressed as "break between B and SW"). In the third communication error pattern, the packet transfer pattern shown in part (A) of FIG. 34 is caused in the switch 90, and accordingly, the switch 90 switches to the second switching state shown in part (B) of FIG. 34. Thereby, the transmission packets Pt having the SID equal to A are allowed to return to the node 42A. In this case, the number of relays (HOP) of each transmission packet Pt having the SID equal to A becomes 2 instead of 3 because it is not relayed by the node 42B.

Figure 40:
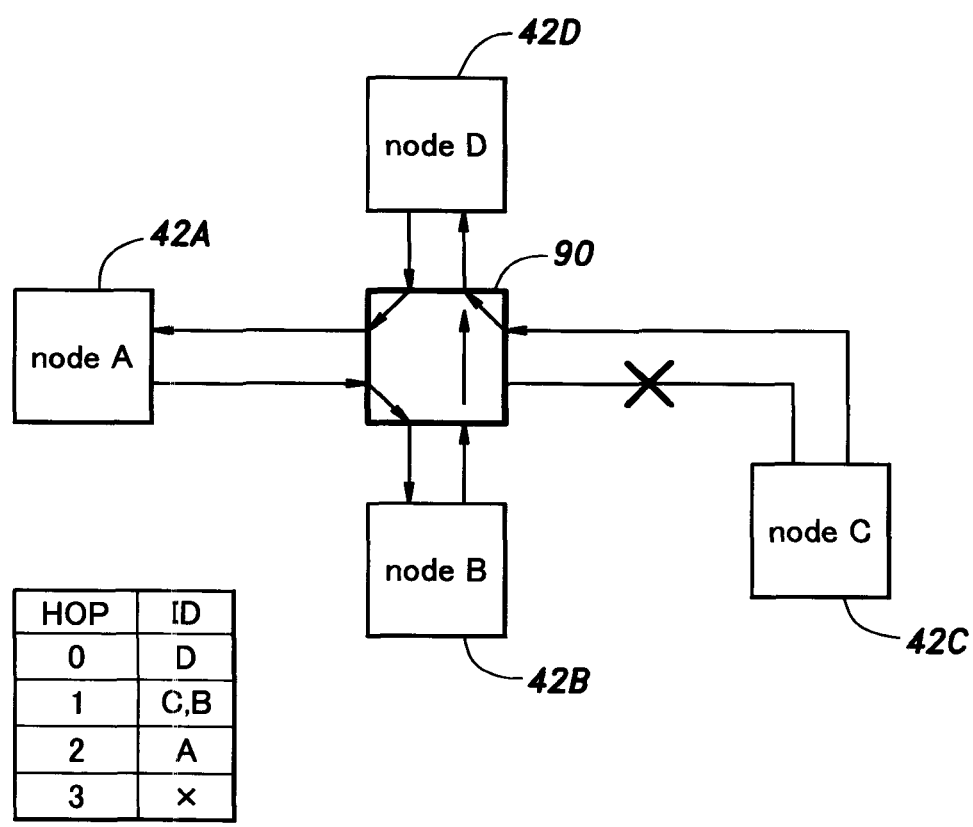
FIG. 40 is an explanatory diagram showing the HOP table of the node 42A of the third embodiment in a fourth communication error pattern.

FIG. 40 is an explanatory diagram showing the HOP table 74 of the node 42A of the third embodiment in a fourth communication error pattern. The fourth communication error pattern in the third embodiment is a break of the communication line 41 connecting between the switch 90 and the node 42C (may be expressed as "break between SW and C"). In the fourth communication error pattern, the packet transfer pattern shown in part (A) of FIG. 35 is caused in the switch 90, and accordingly, the switch 90 switches to the third switching state shown in part (B) of FIG. 35. Thereby, the transmission packets Pt having the SID equal to B or A are allowed to be transferred/return to the node 42A. In this case, the number of relays (HOP) of each transmission packet Pt having the SID equal to B becomes 2 and the number of relays (HOP) of each transmission packet Pt having the SID equal to A becomes 1 because they are not relayed by the node 42C.

Figure 41:
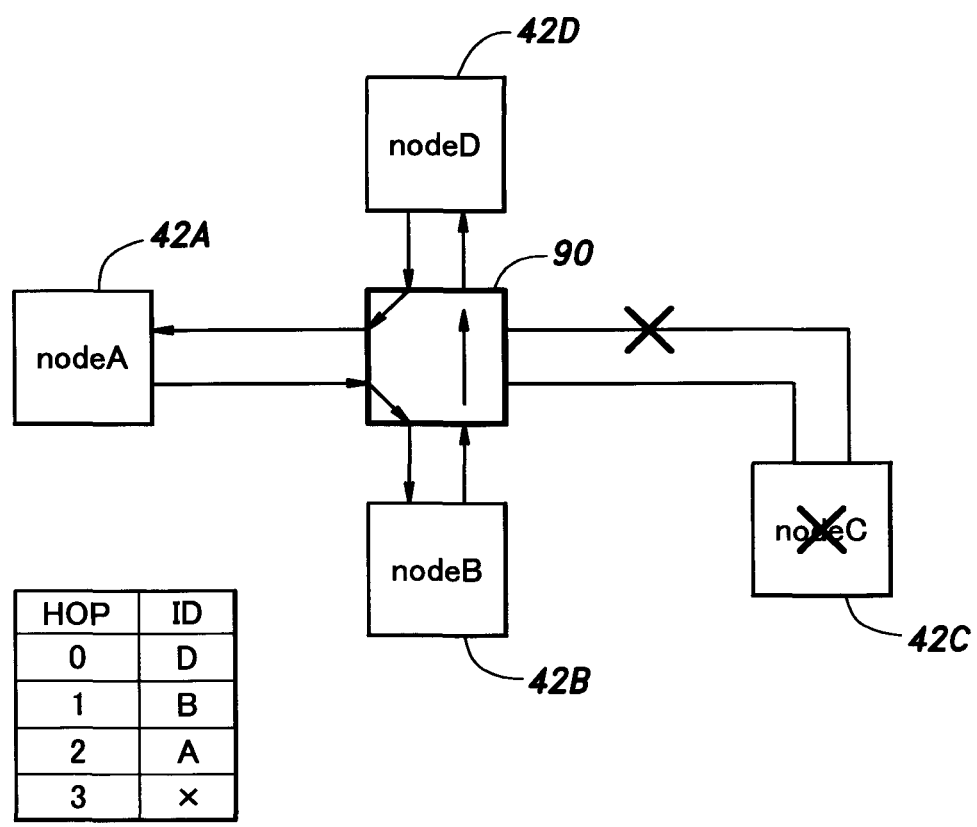
FIG. 41 is an explanatory diagram showing the HOP table of the node 42A of the third embodiment in a fifth communication error pattern.

FIG. 41 is an explanatory diagram showing the HOP table 74 of the node 42A of the third embodiment in a fifth communication error pattern. The fifth communication error pattern in the third embodiment is a failure of the node 42C or a break of the communication line 41 connecting between the node 42C and the switch 90 (may be expressed as "break between C and SW"). In the fifth communication error pattern, the packet transfer pattern shown in part (A) of FIG. 36 is caused in the switch 90, and accordingly, the switch 90 switches to the fourth switching state shown in part (B) of FIG. 36. Thereby, the transmission packets having the SID equal to B or A are allowed to be transferred/return to the node 42A. In this case, the number of relays (HOP) of each transmission packet Pt having the SID equal to B becomes 2 and the number of relays (HOP) of each transmission packet Pt having the SID equal to A becomes 1 because they are not relayed by the node 42C.

Figure 42:
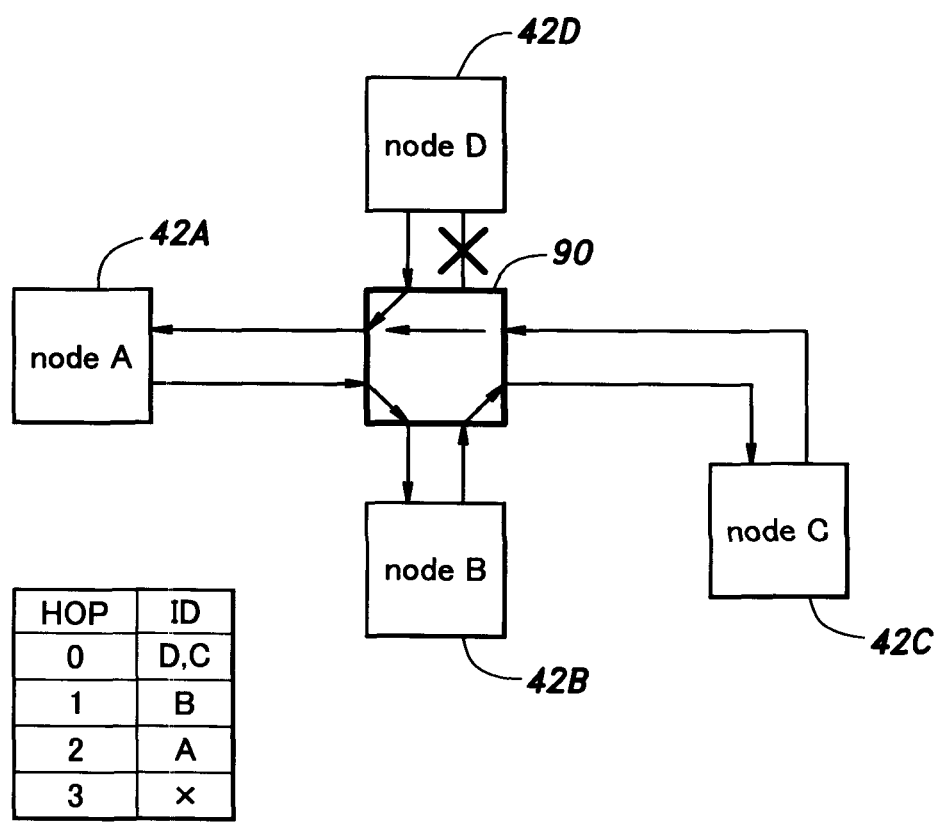
FIG. 42 is an explanatory diagram showing the HOP table of the node 42A of the third embodiment in a sixth communication error pattern.

FIG. 42 is an explanatory diagram showing the HOP table 74 of the node 42A of the third embodiment in a sixth communication error pattern. The sixth communication error pattern in the third embodiment is a break of the communication line 41 connecting between the switch 90 and the node 42D (may be expressed as "break between SW and D"). In the sixth communication error pattern, the packet transfer pattern shown in part (A) of FIG. 33 for the node 42B is caused for the node 42D in the switch 90, and accordingly, the switch 90 switches to the first switching state defined for the node 42D (180 degrees rotationally symmetric to the first switching state for the node 42B shown in part (B) of FIG. 33). Thereby, the transmission packets Pt having the SID equal to C, B, or A are allowed to be transferred/return to the node 42A. In this case, the number of relays (HOP) of each transmission packet Pt having the SID equal to C becomes 0, the number of relays (HOP) of each transmission packet Pt having the SID equal to B becomes 1, and the number of relays (HOP) of each transmission packet Pt having the SID equal to A becomes 2 because they are not relayed by the node 42D.

Figure 43:
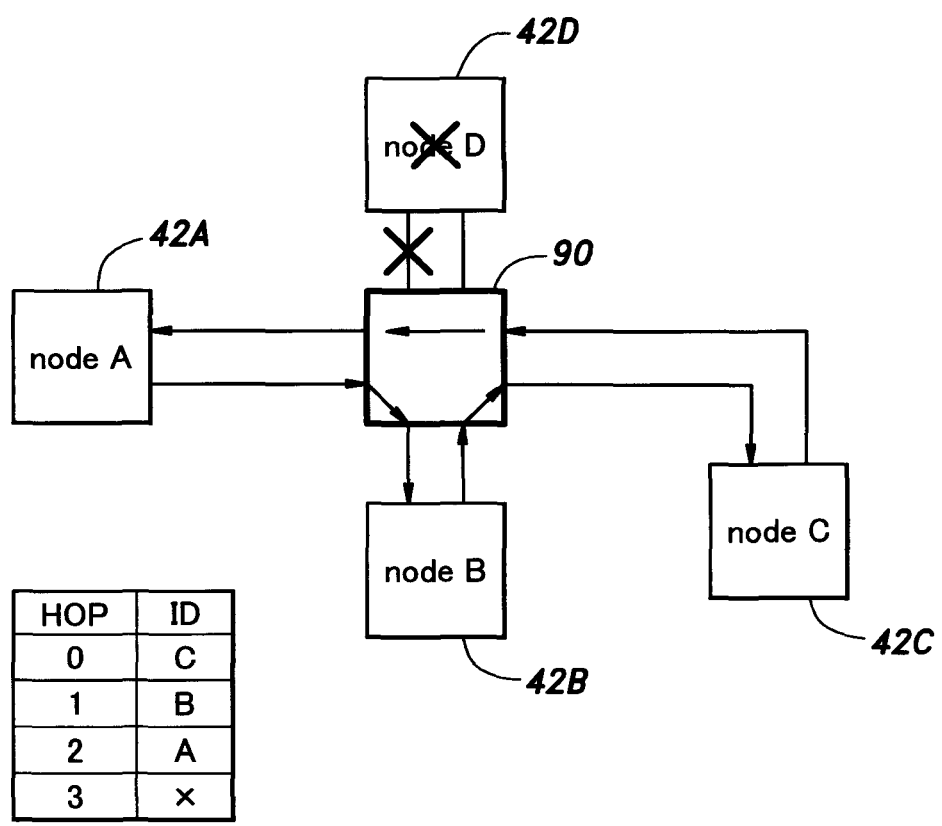
FIG. 43 is an explanatory diagram showing the HOP table of the node 42A of the third embodiment in a seventh communication error pattern.

FIG. 43 is an explanatory diagram showing the HOP table 74 of the node 42A of the third embodiment in a seventh communication error pattern. The seventh communication error pattern in the third embodiment is a failure of the node 42D or a break of the communication line 41 connecting between the node 42D and the switch 90 (may be expressed as "break between D and SW). In the seventh communication error pattern, the packet transfer pattern shown in part (A) of FIG. 34 for the node 42B is caused for the node 42D in the switch 90, and accordingly, the switch 90 switches to the second switching state defined for the node 42D (180 degrees rotationally symmetric to the second switching state for the node 42B shown in part (B) of FIG. 34). Thereby, the transmission packets Pt having the SID equal to C, B, or A are allowed to be transferred/return to the node 42A. In this case, the number of relays (HOP) of each transmission packet Pt having the SID equal to C becomes 0, the number of relays (HOP) of each transmission packet Pt having the SID equal to B becomes 1, and the number of relays (HOP) of each transmission packet Pt having the SID equal to A becomes 2 because they are not relayed by the node 42D.

Figure 44:
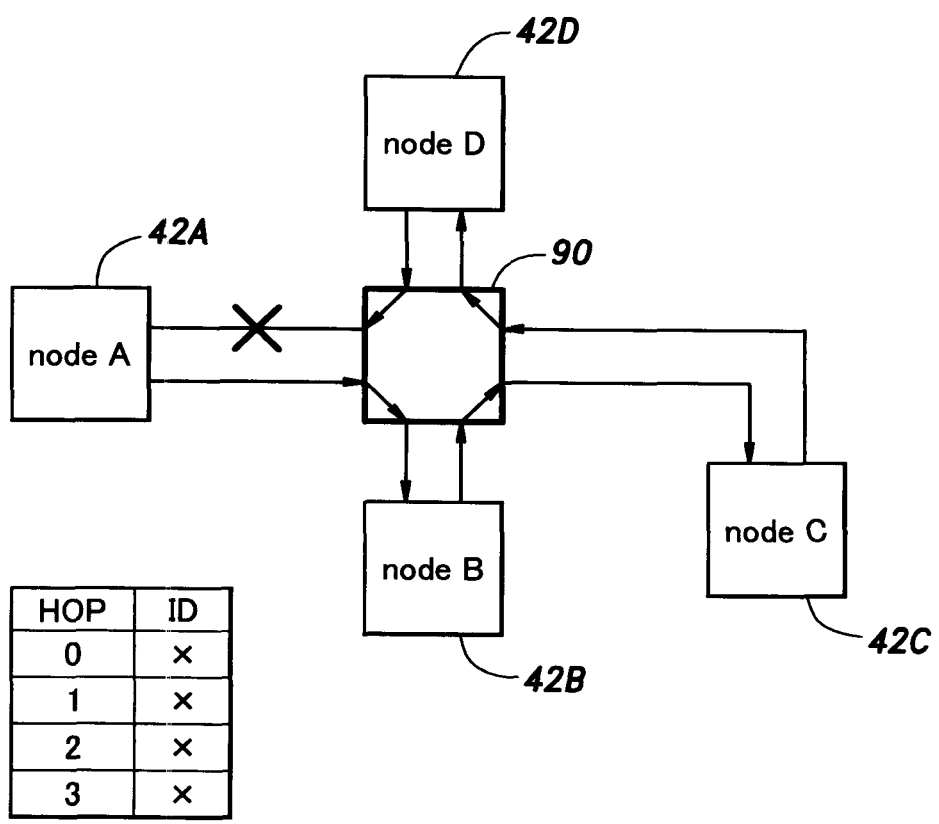
FIG. 44 is an explanatory diagram showing the HOP table of the node 42A of the third embodiment in an eighth communication error pattern.

FIG. 44 is an explanatory diagram showing the HOP table 74 of the node 42A of the third embodiment in an eighth communication error pattern. The eighth communication error pattern in the third embodiment is a break of the communication line 41 connecting between the switch 90 and the node 42A (may be expressed as "break between SW and A). In the eighth communication error pattern, all transmission packets Pt transmitted according to the predetermined repeating pattern pass through the switch 90. Therefore, none of the packet transfer patterns shown in FIGS. 33 to 36 is caused, and accordingly, the switch 90 does not perform state switching (maintains the normal state as shown in part (A) of FIG. 33, for example). In this case, no transmission packet Pt is transmitted to the node 42A acting as the host node, as represented by the HOP table 74 shown in the lower left of FIG. 44.

FIG. 45 is a table showing the identifiability of the failure location based on the HOP table 74 in the third embodiment of the ring network. As shown in FIG. 45, in the third embodiment, owing to the provision of the switch 90, the node 42A can identify the location of a communication error based on the relationship between the number of relays (HOP) and the source node ID (SID) of the input packets Pe.

As described above, the switch 90 is configured to switch the packet transfer path based on the packet transfer state on the input-side communication line 82 and the output-side communication line 83 for the intermediate node 42M, and therefore, even if a communication error occurs, a situation in that no packet is transferred to the downstream thereof can be avoided. Specifically, by switching to the first switching state shown in part (B) of FIG. 33, the switch 90 can allow the relay packet Pr to be transferred to the output-side communication line 83 for the relevant intermediate node 42M (node 42B or 42D in FIG. 30) by bypassing (or without passing through) the intermediate node 42M, while allowing the transmission packet Pt output from the intermediate node 42M to be transferred to the output-side communication line 83 without being blocked. Further, by switching to the second switching state shown in part (B) of FIG. 34, the switch 90 can allow the relay packet Pr to be transferred directly to the output-side communication line 83 for the relevant intermediate node 42M by bypassing (without passing through) the intermediate node 42M. Yet further, by switching to the third switching state shown in part (B) of FIG. 35, the switch 90 can allow the transmission packet Pt and the relay packet Pr output from one associated intermediate node 42M (node 42B in FIG. 30) to be transferred to the input-side communication line 82 for the other associated intermediate node 42M (node 42D in FIG. 30) by bypassing (without passing through) any node 42 (node 42C in FIG. 30) between the one associated intermediate node 42M and the other associated intermediate node 42M, while allowing the relay packet Pr from the node 42 between the one associated intermediate node 42M and the other associated intermediate node 42M to be transferred to the input-side communication line 82 for the other associated intermediate node 42M. Yet further, by switching to the fourth switching state shown in part (B) of FIG. 36, the switch 90 can allow the transmission packet Pt and the relay packet Pr output from one associated intermediate node 42M (node 42B in FIG. 30) to be transferred to the input-side communication line 82 for the other associated intermediate node 42M (node 42D in FIG. 30) by bypassing (without passing through) any node 42 (node 42C in FIG. 30) between the one associated intermediate node 42M and the other associated intermediate node 42M.

The preferred embodiments of the present invention have been described in the foregoing, but the present invention is not limited to the foregoing embodiments and various alterations and modifications are possible without departing from the scope of the present invention. For example, For example, the concrete structure, arrangement, number, etc. of the component parts of the embodiments and the concrete processing procedures in the embodiments may be appropriately changed within the scope of the present invention. Also, not all of the structural elements shown in the above embodiments are necessarily indispensable and they may be selectively used as appropriate.

The invention claimed is:
1. A ring network comprising multiple nodes connected in a ring via communication lines and configured to send data in only one direction along the communication lines,
wherein each node comprises:
a packet send-out unit configured to generate transmission packets each containing at least a number of relays and a source node identification (ID) and send out the transmission packets according to a predetermined repeating pattern; and a packet relay unit configured to receive input packets, and when a node indicated by the source node ID of each input packet is other than an own node, send out the input packet as a relay packet after adding one unit to the number of relays, wherein at least one of the multiple nodes is provided with a communication error detector configured to detect a communication error in the ring network, the communication lines are divided into an upstream part and a downstream part such that the upstream part and the downstream part are routed next to each other, the multiple nodes include a first node provided at an upstream end of the upstream part and a downstream end of the downstream part and being provided with the communication error detector, a second node provided at a downstream end of the upstream part and an upstream end of the downstream part, and at least one third node provided on the upstream part or the downstream part and located between the first node and the second node, each third node is connected to one of the first node, the second node, and the third node on an upstream side thereof via an input-side communication line which consists of a part of a corresponding one of the upstream part and the downstream part and to another of the first node, the second node, and the third node on a downstream side thereof via an output-side communication line which consists of another part of the corresponding one of the upstream part and the downstream part, the ring network further comprises at least one switch each associated with one of the at least one third node, each switch being provided on the input-side communication line and the output-side communication line for the associated third node and a part of the other of the upstream part and the downstream part juxtaposed next to the input-side communication line and the output-side communication line, and configured to switch a packet transfer path based on a transfer state of the relay packet to be relayed by the associated third node and the transmission packet to be output from the associated third node, and the communication error detector is configured to identify a location where the communication error has occurred based on a relationship between the number of relays and the source node ID of the input packets.

2. The ring network as defined in claim 1, wherein each switch is configured to be capable of switching to a first switching state in which the switch makes a short circuit between an upstream section of the input-side communication line for the associated third node and the output-side communication line for the same, while maintaining a connection of the output-side communication line for the associated third node, and the switch is configured to switch to the first switching state when the relay packet having passed through the input-side communication line is not transferred to the output-side communication line, and the transmission packet is transferred to the output-side communication line.

3. The ring network as defined in claim 1, wherein the switch is configured to be capable of switching to a second switching state in which the switch disconnects the output-side communication line for the associated third node and makes a short circuit between an upstream section of the input-side communication line for the associated third node and the output-side communication line for the same, and the switch is configured to switch to the second switching state when neither the relay packet having passed through the input-side communication line nor the transmission packet is transmitted to the output-side communication line.

4. The ring network as defined in claim 1, wherein the switch associated with the third node provided on the upstream part of the communication lines is configured to be capable of switching to a third switching state in which the switch makes a short circuit between an upstream section of the output-side communication line for the associated third node and the juxtaposed communication line, while maintaining a connection of the juxtaposed communication line, and the switch is configured to switch to the third switching state when the relay packet passes through the input-side communication line, and the transmission packet transferred to the output-side communication line does not pass through the input-side communication line.

5. The ring network as defined in claim 1, wherein the switch associated with the third node provided on the downstream part of the communication lines is configured to be capable of switching to a fourth switching state in which the switch makes a short circuit between an upstream section of the juxtaposed communication line for the associated third node and the input-side communication line for the same, while maintaining a connection of the input-side communication line, and the switch is configured to switch to the fourth switching state when the relay packet passes through the input-side communication line, and the transmission packet transferred to the output-side communication line does not pass through the input-side communication line.

6. A ring network comprising multiple nodes connected in a ring via communication lines and configured to send data in only one direction along the communication lines, wherein each node comprises:

a packet send-out unit configured to generate transmission packets each containing at least a number of relays and a source node identification (ID) and send out the transmission packets according to a predetermined repeating pattern; and a packet relay unit configured to receive input packets, and when a node indicated by the source node ID of each input packet is other than an own node, send out the input packet as a relay packet after adding one unit to the number of relays, wherein at least one of the multiple nodes is provided with a communication error detector configured to detect a communication error in the ring network, the communication lines are divided into an upstream part and a downstream part such that the upstream part and the downstream part are routed next to each other, the multiple nodes include multiple a first node provided at an upstream end of the upstream part and a downstream end of the downstream part and being provided with the communication error detector, a second node provided at a downstream end of the upstream part and an upstream end of the downstream part, and at least one pair of third nodes provided on the upstream part and the downstream part and located between the first node and the second node, each third node is connected to one of the first node, second node, and the third nodes on an upstream side thereof via an input-side communication line which consists of a part of a corresponding one of the upstream part and the downstream part and to another of the first node, second node, and the third nodes on a downstream side thereof via an output-side communication line which consists of another part of the corresponding one of the upstream part and the downstream part, the ring network further comprises at least one switch each associated with one pair of third nodes, each switch being provided on the input-side communication line and the output-side communication line for each of the associated pair of third nodes, and configured to switch a packet transfer path based on a transfer state of the relay packet to be relayed by each of the associated pair of third nodes and the transmission packet to be output from each of the associated pair of third nodes, and the communication error detector is configured to identify a location where the communication error has occurred based on a relationship between the number of relays and the source node ID of the input packets.

7. The ring network as defined in claim 6, wherein the switch is configured to be capable of switching to a first switching state in which the switch makes a short circuit between an upstream section of the input-side communication line for one of the third nodes of the associated pair of third nodes and the output-side communication line for the same, while maintaining a connection of the output-side communication line for the one of the third nodes of the associated pair of third nodes, and the switch is configured to switch to the first switching state when the relay packet having passed through the input-side communication line for the one of the third nodes of the associated pair of third nodes is not transferred to the output-side communication line for the one of the third nodes of the associated pair of third nodes, and the transmission packet to be output from the one of the third nodes of the associated pair of third nodes is transferred to the output-side communication line.

8. The ring network as defined in claim 6, wherein the switch is configured to be capable of switching to a second switching state in which the switch disconnects the output-side communication line for one of the third nodes of the associated pair of third nodes, and makes a short circuit between an upstream section of the input-side communication line for the one of the third nodes of the associated pair of third nodes and the output-side communication line for the same, and the switch is configured to switch to the second switching state when neither the relay packet having passed through the input-side communication line for the one of the third nodes of the associated pair of third nodes nor the transmission packet to be output from the one of the associated third nodes is transmitted to the output-side communication line for the one of the associated third nodes.

9. The ring network as defined in claim 6, wherein the switch is configured to be capable of switching to a third switching state in which the switch makes a short circuit between an upstream section of the output-side communication line for one of the third nodes of the associated pair of third nodes to the input-side communication line for the other of the third nodes of the associated pair of third nodes, while maintaining a connection of the input-side communication line for the other of the third nodes of the associated pair of third nodes, and the switch is configured to switch to the third switching state when the relay packet having passed through the output-side communication line for the one of the third nodes of the associated pair of third nodes is not transferred to the input-side communication line for the other of the third nodes of the associated pair of third nodes, and the transmission packet or the relay packet output from a node downstream of the one of the third nodes of the associated pair of third nodes and upstream of the other of the third nodes of the associated pair of third nodes is transmitted to the input-side communication line for the other of the third nodes of the associated pair of third nodes.

10. The ring network as defined in claim 6, wherein the switch is configured to be capable of switching to a fourth switching state in which the switch makes a short circuit between an upstream section of the output-side communication line for one of the third nodes of the associated pair of third nodes and the input-side communication line for the other of the third nodes of the associated pair of third nodes, and disconnects the input-side communication line for the other of the third nodes of the associated pair of third nodes, and the switch is configured to switch to the fourth switching state when the relay packet having passed through the output-side communication line for the one of the third nodes of the associated pair of third nodes is not transferred to the input-side communication line for the other of the third nodes of the associated pair of third nodes, and the transmission packet or the relay packet output from a node downstream of the one of the third nodes of the associated pair of third nodes and upstream of the other of the third nodes of the associated pair of third nodes is not transmitted to the input-side communication line for the other of the third nodes of the associated pair of third nodes.

11. A robot comprising:

a ring network comprising multiple nodes connected in a ring via communication lines and configured to send data in only one direction along the communication lines, wherein each node comprises:

a packet send-out unit configured to generate transmission packets each containing at least a number of relays and a source node identification (ID) and send out the transmission packets according to a predetermined repeating pattern; and a packet relay unit configured to receive input packets, and when a node indicated by the source node ID of each input packet is other than an own node, send out the input packet as a relay packet after adding one unit to the number of relays, wherein at least one of the multiple nodes is provided with a communication error detector configured to detect a communication error in the ring network, the communication lines are divided into an upstream part and a downstream part such that the upstream part and the downstream part are routed next to each other, the multiple nodes include a first node provided at an upstream end of the upstream part and a downstream end of the downstream part and being provided with the communication error detector, a second node provided at a downstream end of the upstream part and an upstream end of the downstream part, and at least one third node provided on the upstream part or the downstream part and located between the first node and the second node, each third node is connected to one of the first node, the second node, and the third node on an upstream side thereof via an input-side communication line which consists of a part of a corresponding one of the upstream part and the downstream part and to another of the first node, the second node, and the third node on a downstream side thereof via an output-side communication line which consists of another part of the corresponding one of the upstream part and the downstream part, the ring network further comprises at least one switch each associated with one of the at least one third node, each switch being provided on the input-side communication line and the output-side communication line for the associated third node and a part of the other of the upstream part and the downstream part juxtaposed next to the input-side communication line and the output-side communication line, and configured to switch a packet transfer path based on a transfer state of the relay packet to be relayed by the associated third node and the transmission packet to be output from the associated third node, and the communication error detector is configured to identify a location where the communication error has occurred based on a relationship between the number of relays and the source node ID of the input packets;

a main body; and an arm or a leg constituted of multiple links connected in series via multiple joints each being configured to be driven by a servo-controlled motor, one end of the series-connected links being joined to the main body, wherein the nodes are distributedly arranged on the main body and the links of the arm or the leg, and are each configured to control one or more motors for driving one or more associated joints, each of the multiple nodes is provided with the communication error detector, each of the nodes provided on the links of the arm or the leg is configured to lock the associated one or more joints by servo-locking the one or more motors when the corresponding communication error detector detects a communication error on the one end side thereof on the series-connected links, and the node provided on the main body is configured such that, when the corresponding communication error detector identifies a location where the communication error has occurred, the node performs fallback control by regarding the links located on a free end side relative to the location where the communication error has occurred as a rigid unitary body.

12. A robot comprising:

a ring network comprising multiple nodes connected in a ring via communication lines and configured to send data in only one direction along the communication lines, wherein each node comprises:

a packet send-out unit configured to generate transmission packets each containing at least a number of relays and a source node identification (ID) and send out the transmission packets according to a predetermined repeating pattern; and a packet relay unit configured to receive input packets, and when a node indicated by the source node ID of each input packet is other than an own node, send out the input packet as a relay packet after adding one unit to the number of relays, wherein at least one of the multiple nodes is provided with a communication error detector configured to detect a communication error in the ring network, the communication lines are divided into an upstream part and a downstream part such that the upstream part and the downstream part are routed next to each other, the multiple nodes include a first node provided at an upstream end of the upstream part and a downstream end of the downstream part and being provided with the communication error detector, a second node provided at a downstream end of the upstream part and an upstream end of the downstream part, and at least one pair of third nodes provided on the upstream part and the downstream part and located between the first node and the second node, each third node is connected to one of the first node, second node, and the third nodes on an upstream side thereof via an input-side communication line which consists of a part of a corresponding one of the upstream part and the downstream part and to another of the first node, second node, and the third nodes on a downstream side thereof via an output-side communication line which consists of another part of the corresponding one of the upstream part and the downstream part, the ring network further comprises at least one switch each associated with one pair of third nodes, each switch being provided on the input-side communication line and the output-side communication line for each of the associated pair of third nodes, and configured to switch a packet transfer path based on a transfer state of the relay packet to be relayed by each of the associated pair of third nodes and the transmission packet to be output from each of the associated pair of third nodes, and the communication error detector is configured to identify a location where the communication error has occurred based on a relationship between the number of relays and the source node ID of the input packets;

a main body; and an arm or a leg constituted of multiple links connected in series via multiple joints each being configured to be driven by a servo-controlled motor, one end of the series-connected links being joined to the main body, wherein the nodes are distributedly arranged on the main body and the links of the arm or the leg, and are each configured to control one or more motors for driving one or more associated joints, each of the multiple nodes is provided with the communication error detector, each of the nodes provided on the links of the arm or the leg is configured to lock the associated one or more joints by servo-locking the one or more motors when the corresponding communication error detector detects a communication error on the one end side thereof on the series-connected links, and the node provided on the main body is configured such that, when the corresponding communication error detector identifies a location where the communication error has occurred, the node performs fallback control by regarding the links located on a free end side relative to the location where the communication error has occurred as a rigid unitary body.

* * * * *